United States Patent
Liu et al.

(10) Patent No.: US 8,801,931 B2
(45) Date of Patent: Aug. 12, 2014

(54) HYBRID AEROBIC AND ANAEROBIC WASTEWATER AND SLUDGE TREATMENT SYSTEMS AND METHODS

(71) Applicant: Siemens Water Technologies LLC, Alpharetta, GA (US)

(72) Inventors: Wenjun Liu, Wayne, PA (US); Edward John Jordan, Lenexa, KS (US); George W. Smith, Pewaukee, WI (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 0 days.

(21) Appl. No.: 14/032,393

(22) Filed: Sep. 20, 2013

(65) Prior Publication Data

US 2014/0027374 A1  Jan. 30, 2014

Related U.S. Application Data

(62) Division of application No. 13/034,269, filed on Feb. 24, 2011.

(60) Provisional application No. 61/308,297, filed on Feb. 25, 2010.

(51) Int. Cl.
*C02F 3/30* (2006.01)

(52) U.S. Cl.
USPC ........... 210/603; 210/605; 210/623; 210/903; 210/906

(58) Field of Classification Search
USPC ......... 210/603, 605, 621, 622, 623, 630, 903, 210/906
See application file for complete search history.

(56) References Cited

U.S. PATENT DOCUMENTS

| | | |
|---|---|---|
| 1,712,258 A | 5/1929 | Compain |
| 1,833,315 A | 11/1931 | Burhans |
| 2,259,688 A | 10/1941 | Genter |
| 2,359,004 A | 9/1944 | Schlenz et al. |
| 2,893,957 A | 7/1959 | Genter et al. |
| 2,964,194 A | 12/1960 | Oliver et al. |
| 3,047,492 A | 7/1962 | Gambrel |
| 3,163,601 A | 12/1964 | Erickson et al. |
| 3,192,155 A | 6/1965 | Bready et al. |
| 3,259,566 A | 7/1966 | Torpey |
| 3,331,512 A | 7/1967 | Vore |

(Continued)

FOREIGN PATENT DOCUMENTS

| | | |
|---|---|---|
| CA | 2149090 A1 | 11/1996 |
| CN | 1229403 A | 9/1999 |

(Continued)

OTHER PUBLICATIONS

Ra et al., "Biological nutrient removal with an internal organic carbon source in piggery wastewater treatment," Water Research, 2000, vol. 34, No. 3, pp. 965-973.

(Continued)

*Primary Examiner* — Fred Prince

(57) ABSTRACT

A hybrid method and system of treating wastewater with reduced energy usage is disclosed. The treatment system has a sorption system, an anaerobic digester that digests or converts at least a portion of the solids or sludge from the sorption system, and an aerobic treatment tank that partially reduces oxygen demand of a portion of the sludge from the sorption tank.

19 Claims, 23 Drawing Sheets

(56) References Cited

U.S. PATENT DOCUMENTS

| | | |
|---|---|---|
| 3,363,770 A | 1/1968 | Glos, II |
| 3,369,668 A | 2/1968 | Glos, II |
| 3,544,476 A | 12/1970 | Alba et al. |
| 3,595,537 A | 7/1971 | Kaelin |
| 3,610,419 A | 10/1971 | Vallee et al. |
| 3,617,540 A | 11/1971 | Bishop et al. |
| 3,643,803 A | 2/1972 | Glos, II |
| 3,756,946 A | 9/1973 | Levin et al. |
| 3,787,316 A | 1/1974 | Brink et al. |
| 3,907,672 A | 9/1975 | Milne |
| 3,948,779 A | 4/1976 | Jackson |
| 3,964,998 A | 6/1976 | Barnard |
| 4,042,493 A | 8/1977 | Matsch et al. |
| 4,056,465 A | 11/1977 | Spector |
| 4,132,638 A | 1/1979 | Carlsson |
| 4,139,472 A | 2/1979 | Simonson |
| 4,141,822 A | 2/1979 | Levin et al. |
| 4,160,724 A | 7/1979 | Laughton |
| 4,162,153 A | 7/1979 | Spector |
| 4,162,982 A | 7/1979 | Chesner |
| 4,173,531 A | 11/1979 | Matsch et al. |
| 4,180,459 A | 12/1979 | Zievers |
| 4,256,580 A | 3/1981 | Rimmele |
| 4,268,385 A | 5/1981 | Yoshikawa |
| 4,271,026 A | 6/1981 | Chen et al. |
| 4,277,342 A | 7/1981 | Hayes et al. |
| 4,279,753 A | 7/1981 | Nielson et al. |
| 4,284,510 A | 8/1981 | Savard et al. |
| 4,323,367 A | 4/1982 | Ghosh |
| 4,330,405 A | 5/1982 | Davis et al. |
| 4,346,008 A | 8/1982 | Leighton et al. |
| 4,351,729 A | 9/1982 | Witt |
| 4,370,233 A | 1/1983 | Hayes et al. |
| 4,374,730 A | 2/1983 | Braha et al. |
| 4,407,717 A | 10/1983 | Teletzke et al. |
| 4,442,005 A | 4/1984 | Breider |
| 4,491,522 A | 1/1985 | Ishida et al. |
| 4,522,722 A | 6/1985 | Nicholas |
| 4,527,947 A | 7/1985 | Elliott |
| 4,537,682 A | 8/1985 | Wong-Chong |
| 4,548,715 A | 10/1985 | Stein |
| 4,568,457 A | 2/1986 | Sullivan |
| 4,568,462 A | 2/1986 | Bohnke et al. |
| 4,599,167 A | 7/1986 | Benjes et al. |
| 4,632,758 A | 12/1986 | Whittle |
| 4,643,830 A | 2/1987 | Reid |
| 4,655,920 A | 4/1987 | Ragnegard |
| 4,664,804 A | 5/1987 | Morper et al. |
| RE32,429 E | 6/1987 | Spector |
| 4,675,114 A | 6/1987 | Zagyvai et al. |
| 4,705,633 A | 11/1987 | Bogusch |
| 4,710,301 A | 12/1987 | Geuens |
| 4,731,185 A | 3/1988 | Chen et al. |
| 4,780,198 A | 10/1988 | Crawford et al. |
| 4,790,939 A | 12/1988 | Suzuki et al. |
| 4,797,212 A | 1/1989 | von Nordenskjold |
| 4,814,093 A | 3/1989 | Frykhult |
| 4,818,391 A | 4/1989 | Love |
| 4,838,910 A | 6/1989 | Stollenwerk et al. |
| 4,842,732 A | 6/1989 | Tharp |
| 4,849,108 A | 7/1989 | de Wilde et al. |
| 4,865,732 A | 9/1989 | Garrant et al. |
| 4,867,883 A | 9/1989 | Daigger et al. |
| 4,874,519 A | 10/1989 | Williamson |
| 4,891,136 A | 1/1990 | Voyt |
| 4,915,840 A | 4/1990 | Rozich |
| 4,950,403 A | 8/1990 | Hauff et al. |
| 4,956,094 A | 9/1990 | Levin et al. |
| 4,961,854 A | 10/1990 | Wittmann et al. |
| 4,975,197 A | 12/1990 | Wittmann et al. |
| 4,999,111 A | 3/1991 | Williamson |
| 5,013,442 A | 5/1991 | Davis et al. |
| 5,019,266 A | 5/1991 | Soeder et al. |
| 5,022,993 A | 6/1991 | Williamson |
| 5,051,191 A | 9/1991 | Rasmussen et al. |
| 5,076,924 A | 12/1991 | Persson et al. |
| 5,084,174 A | 1/1992 | Perala et al. |
| 5,087,358 A | 2/1992 | Massignani |
| 5,094,752 A | 3/1992 | Davis et al. |
| 5,098,567 A | 3/1992 | Nishiguchi |
| 5,098,572 A | 3/1992 | Faup et al. |
| 5,114,587 A | 5/1992 | Hagerstedt |
| 5,126,049 A | 6/1992 | Hallberg |
| 5,128,040 A | 7/1992 | Molof et al. |
| 5,137,636 A | 8/1992 | Bundgaard |
| 5,151,187 A | 9/1992 | Behmann |
| 5,182,021 A | 1/1993 | Spector |
| 5,227,065 A | 7/1993 | Strid |
| 5,234,595 A | 8/1993 | DiGregorio et al. |
| 5,242,590 A | 9/1993 | Thomson et al. |
| 5,246,585 A | 9/1993 | Meiring |
| 5,254,253 A | 10/1993 | Behmann |
| 5,282,980 A | 2/1994 | Kew et al. |
| 5,288,405 A | 2/1994 | Lamb, III |
| 5,288,406 A | 2/1994 | Stein |
| 5,296,143 A | 3/1994 | Frykhult |
| 5,304,308 A | 4/1994 | Tsumura et al. |
| 5,316,682 A | 5/1994 | Keyser et al. |
| 5,330,645 A | 7/1994 | Geldmacher |
| 5,330,646 A | 7/1994 | Frykhult |
| 5,336,290 A | 8/1994 | Jermstad |
| 5,342,522 A | 8/1994 | Marsman et al. |
| 5,348,653 A | 9/1994 | Rovel |
| 5,348,655 A | 9/1994 | Simas et al. |
| 5,356,537 A | 10/1994 | Thurmond et al. |
| 5,376,242 A | 12/1994 | Hayakawa |
| 5,380,438 A | 1/1995 | Nungesser |
| 5,389,258 A | 2/1995 | Smis et al. |
| 5,480,548 A | 1/1996 | Daigger et al. |
| 5,482,630 A | 1/1996 | Lee et al. |
| 5,505,862 A | 4/1996 | Sonnenrein |
| 5,514,277 A | 5/1996 | Khudenko |
| 5,514,278 A | 5/1996 | Khudenko |
| 5,531,896 A | 7/1996 | Tambo et al. |
| 5,543,051 A | 8/1996 | Harris |
| 5,543,063 A | 8/1996 | Walker et al. |
| 5,578,202 A | 11/1996 | Hirane |
| 5,582,734 A | 12/1996 | Coleman et al. |
| 5,601,719 A | 2/1997 | Hawkins et al. |
| 5,611,927 A | 3/1997 | Schmid |
| 5,616,241 A * | 4/1997 | Khudenko ............... 210/151 |
| 5,624,562 A | 4/1997 | Scroggins |
| 5,624,565 A | 4/1997 | Lefevre et al. |
| 5,626,755 A | 5/1997 | Keyser et al. |
| 5,635,062 A | 6/1997 | Cameron et al. |
| 5,647,982 A | 7/1997 | Haythornthwaite |
| 5,650,069 A | 7/1997 | Hong et al. |
| 5,651,891 A | 7/1997 | Molof et al. |
| 5,658,458 A | 8/1997 | Keyser et al. |
| 5,667,680 A | 9/1997 | Haeffner |
| 5,685,983 A | 11/1997 | Frykhult |
| 5,725,772 A | 3/1998 | Shirodkar |
| 5,733,455 A | 3/1998 | Molof et al. |
| 5,733,456 A | 3/1998 | Okey et al. |
| 5,746,919 A | 5/1998 | Dague et al. |
| 5,750,041 A | 5/1998 | Hirane |
| 5,766,466 A | 6/1998 | Peterson |
| 5,773,526 A | 6/1998 | Van Dijk et al. |
| 5,783,081 A * | 7/1998 | Gaddy ..................... 210/611 |
| 5,792,352 A | 8/1998 | Scheucher et al. |
| 5,804,071 A | 9/1998 | Haeffner |
| 5,811,008 A | 9/1998 | Von Nordenskjold |
| 5,818,412 A | 10/1998 | Maekawa |
| 5,820,756 A | 10/1998 | McEwen et al. |
| 5,824,222 A | 10/1998 | Keyser et al. |
| 5,833,856 A | 11/1998 | Liu et al. |
| 5,846,424 A | 12/1998 | Khudenko |
| 5,853,588 A | 12/1998 | Molof et al. |
| 5,858,222 A | 1/1999 | Shibata et al. |
| 5,919,367 A | 7/1999 | Khudenko |
| 5,928,396 A | 7/1999 | Choi |
| 5,989,428 A | 11/1999 | Goronszy |
| 5,993,503 A | 11/1999 | Kruidhof |
| 6,004,463 A | 12/1999 | Swett |

(56) References Cited

U.S. PATENT DOCUMENTS

| | | |
|---|---|---|
| 6,015,496 A | 1/2000 | Khudenko |
| 6,036,862 A | 3/2000 | Stover |
| 6,039,874 A | 3/2000 | Teran et al. |
| 6,047,768 A | 4/2000 | Buehler, III |
| 6,054,044 A | 4/2000 | Hoffland et al. |
| 6,066,256 A | 5/2000 | Henry et al. |
| 6,077,430 A | 6/2000 | Chudoba et al. |
| 6,093,322 A | 7/2000 | Bongards |
| 6,110,389 A | 8/2000 | Horowitz |
| 6,113,788 A | 9/2000 | Molof et al. |
| 6,117,323 A | 9/2000 | Haggerty |
| 6,193,889 B1 | 2/2001 | Teran et al. |
| 6,217,768 B1 | 4/2001 | Hansen et al. |
| 6,231,761 B1 | 5/2001 | Mohlin et al. |
| 6,352,643 B1 | 3/2002 | Kwon et al. |
| 6,383,387 B2 | 5/2002 | Hasegawa et al. |
| 6,383,389 B1 | 5/2002 | Pilgram et al. |
| 6,416,668 B1 | 7/2002 | Al-Samadi |
| 6,423,229 B1 | 7/2002 | Mao |
| 6,447,617 B1 | 9/2002 | Bergmann |
| 6,454,949 B1 | 9/2002 | Sesay et al. |
| 6,527,956 B1 | 3/2003 | Lefevre et al. |
| 6,555,002 B2 | 4/2003 | Garcia et al. |
| 6,562,237 B1 | 5/2003 | Olaopa |
| 6,585,895 B2 | 7/2003 | Smith et al. |
| 6,592,762 B2 | 7/2003 | Smith |
| 6,605,220 B2 | 8/2003 | Garcia et al. |
| 6,613,238 B2 | 9/2003 | Schloss |
| 6,630,067 B2 | 10/2003 | Shieh et al. |
| 6,660,163 B2 | 12/2003 | Miklos |
| 6,666,965 B1 | 12/2003 | Timmons |
| 6,706,185 B2 | 3/2004 | Goel et al. |
| 6,712,970 B1 | 3/2004 | Trivedi |
| 6,783,679 B1 | 8/2004 | Rozich |
| 6,787,035 B2 | 9/2004 | Wang |
| D497,660 S | 10/2004 | Danielsson et al. |
| 6,805,806 B2 | 10/2004 | Arnaud |
| 6,814,868 B2 | 11/2004 | Phagoo et al. |
| 6,833,074 B2 | 12/2004 | Miklos |
| 6,863,818 B2 | 3/2005 | Daigger et al. |
| 6,884,355 B2 | 4/2005 | Kamiya et al. |
| 6,893,567 B1 | 5/2005 | Vanotti et al. |
| 7,105,091 B2 | 9/2006 | Miklos |
| 7,147,778 B1 | 12/2006 | DiMassimo et al. |
| 7,156,998 B2 | 1/2007 | Reid |
| 7,208,090 B2 | 4/2007 | Applegate et al. |
| 7,255,723 B2 | 8/2007 | Choi et al. |
| 7,258,791 B2 | 8/2007 | Matsumoto |
| 7,293,659 B2 | 11/2007 | Grace |
| 7,309,427 B2 | 12/2007 | Kruse et al. |
| 7,314,556 B2 | 1/2008 | Sheets et al. |
| 7,314,564 B2 | 1/2008 | Kruse et al. |
| 7,413,654 B2 | 8/2008 | Applegate et al. |
| 7,473,364 B2 | 1/2009 | Abu-Orf |
| 7,556,737 B2 * | 7/2009 | Zhang ............... 210/603 |
| 7,569,147 B2 | 8/2009 | Curtis et al. |
| 7,597,805 B2 | 10/2009 | Danielsson et al. |
| 2001/0045390 A1 | 11/2001 | Kim et al. |
| 2002/0030003 A1 | 3/2002 | O'Leary et al. |
| 2002/0050283 A1 | 5/2002 | Bergmann |
| 2002/0185434 A1 | 12/2002 | Mao |
| 2002/0185435 A1 | 12/2002 | Husain et al. |
| 2002/0192809 A1* | 12/2002 | Lanting et al. ............ 435/290.1 |
| 2002/0195388 A1 | 12/2002 | Sierens et al. |
| 2004/0004038 A1 | 1/2004 | Yamaguchi et al. |
| 2004/0016698 A1 | 1/2004 | Unger |
| 2004/0206699 A1 | 10/2004 | Ho et al. |
| 2004/0232076 A1 | 11/2004 | Zha et al. |
| 2005/0035059 A1 | 2/2005 | Zhang et al. |
| 2005/0040103 A1 | 2/2005 | Abu-Orf et al. |
| 2005/0045557 A1 | 3/2005 | Daigger et al. |
| 2005/0061737 A1 | 3/2005 | Linden et al. |
| 2005/0194310 A1 | 9/2005 | Yamamoto et al. |
| 2006/0113243 A1 | 6/2006 | Applegate et al. |
| 2006/0124543 A1 | 6/2006 | Pehrson et al. |
| 2006/0249448 A1 | 11/2006 | Fujishima et al. |
| 2006/0249449 A1 | 11/2006 | Nakhla et al. |
| 2007/0000836 A1 | 1/2007 | Elefritz et al. |
| 2007/0045181 A1 | 3/2007 | Brase |
| 2007/0051677 A1 | 3/2007 | Curtis et al. |
| 2007/0193949 A1 | 8/2007 | You et al. |
| 2007/0235386 A1 | 10/2007 | Barnes |
| 2008/0041783 A1 | 2/2008 | Barnes |
| 2008/0223783 A1 | 9/2008 | Sutton |
| 2009/0014387 A1 | 1/2009 | Probst |
| 2009/0078646 A1 | 3/2009 | Curtis et al. |
| 2011/0089105 A1 | 4/2011 | Liu et al. |
| 2011/0132836 A1 | 6/2011 | Olson |

FOREIGN PATENT DOCUMENTS

| | | |
|---|---|---|
| CN | 1884151 A | 12/2006 |
| CN | 1894167 A | 1/2007 |
| DE | 4238708 A1 | 5/1994 |
| DE | 4444335 A1 | 6/1996 |
| EP | 0106043 A2 | 4/1984 |
| EP | 0408878 A1 | 1/1991 |
| EP | 0440996 A1 | 8/1991 |
| EP | 0497114 A1 | 8/1992 |
| EP | 1236686 A1 | 9/2002 |
| EP | 1596958 B1 | 11/2005 |
| FR | 2595957 A1 | 9/1987 |
| FR | 2674844 A1 | 10/1992 |
| FR | 2766813 B1 | 10/1999 |
| FR | 2843106 B1 | 10/2004 |
| GB | 957991 A | 5/1964 |
| GB | 1438697 A | 6/1976 |
| GB | 1441241 A | 6/1976 |
| GB | 2006743 A | 5/1979 |
| JP | 59032999 A | 2/1984 |
| JP | 59052597 A | 3/1984 |
| JP | 61192389 A | 8/1986 |
| JP | 62138986 A | 6/1987 |
| JP | 63130197 A | 6/1988 |
| JP | 63302996 A | 12/1988 |
| JP | 03-042019 A | 2/1991 |
| JP | 4-66195 A * | 3/1992 |
| JP | 60-84199 A | 3/1994 |
| JP | 6091285 A | 4/1994 |
| JP | 07-16589 | 1/1995 |
| JP | 2659167 B2 | 9/1997 |
| JP | 09262599 | 10/1997 |
| JP | 2000199086 A | 7/2000 |
| JP | 2000210542 A | 8/2000 |
| JP | 2001347296 A | 12/2001 |
| JP | 2002035779 A | 2/2002 |
| JP | 2002126800 A | 5/2002 |
| JP | 2003033780 A | 2/2003 |
| JP | 2006082024 A | 3/2006 |
| NL | 9301791 A | 5/1995 |
| RU | 1596752 C | 9/1995 |
| WO | 9112067 A1 | 8/1991 |
| WO | 9315026 A1 | 8/1993 |
| WO | 9424055 A1 | 10/1994 |
| WO | 9735656 A1 | 10/1997 |
| WO | 9801397 A1 | 1/1998 |
| WO | 03039712 A1 | 5/2003 |
| WO | 03041837 A1 | 5/2003 |
| WO | 03051487 A1 | 6/2003 |
| WO | 03072512 A1 | 9/2003 |
| WO | 2004076026 A1 | 9/2004 |
| WO | 2009086584 A1 | 7/2009 |
| WO | 2009120384 A2 | 10/2009 |

OTHER PUBLICATIONS

Rasmussen et al., "Iron reduction in activated sludge measured with different extraction techniques," Water Research, 1996, vol. 30, No. 3, pp. 551-558, Elsevier Science Ltd.

Strand et al., "Activated-sludge yield reduction using chemical uncouplers," Water Environment Research, 1999, vol. 71, No. 4, pp. 454-458.

(56) References Cited

OTHER PUBLICATIONS

U.S. Environmental Protection Agency, "Acid digestion of sediments, sludges, and soils," U.S. EPA Method 3050B, 1996, pp. 1-12.
Urbain et al., "Bioflocculation in activated sludge: an analytic approach," Water Research, 1993, vol. 27, No. 5, pp. 829-838, Pergamon Press Ltd.
USFilter, "Aerator products aqua-lator DDM direct drive mixers," 2001, pp. 4.
USFilter, "Aerator products aqua-lator high speed surface aerators," 1999, pp. 2-15.
Van Loosdrecht et al., "Maintenance, endogeneous respiration, lysis, decay and predation," Water Science and Technology, 1999, vol. 39, No. 1, pp. 107-117, IAWQ/Elsevier Science Ltd./Pergamon.
Westgarth, et al., "Anaerobiosis in the activated-sludge process," (paper presentation and formal discussions) Department of Environmental Sciences and Engineering, School of Public Health, University of North Carolina, Chapel Hill, pp. 43-61 (neither publication information nor year provided).
Yasui et al., "A full-scale operation of a novel activated sludge process without excess sludge production," Water Science and Technology, 1996, vol. 34, No. 3-4, pp. 395-404, Elsevier Science Ltd., Pergamon.
Yasui et al., "An innovative approach to reduce excess sludge production in the activated sludge process," Water Science and Technology, 1995, vol. 30, No. 9, pp. 11-20, IAWQ/Pergamon.
Supplementary European Search Report dated Oct. 25, 2012 for Application No. EP09725233.2.
Mexican Official Action dated Jan. 25, 2013 for Application No. MX/a/2010/010532.
Chinese First Office Action in 201180020928.0, dated Jul. 15, 2013.
Chinese Third Office Action and Search Report corresponding CN200980111277.9, dated Aug. 12, 2013.
Singapore Written Opinion, corresponding Sg 201206283-2, dated Jul. 10, 2013.
"Contrashear filter solutions for waste water," for Contra ShearTM, Jul. 29, 2005, p. 1 of 1, http://www.contrashear.co.nz/.
"Efficient treatment of high strength industrial and municipal wastewater" brochure by Envirex Inc., Jan. 1990.
"GAC Fluid Bed Efficient, economical bioremediation of BTEX groundwater," brochure by Envirex Inc., Dec. 1992.
"Internally-fed Rotary Wedgewire Screens" brochure by Parkson Corporation for Hycor® Rotoshear® (year not provided).
"Rex VLR/SCC System" brochure by Envirex Inc., Bulletin No. 315-156, Oct. 1989.
"The RotoscreenTM Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.
"The Rotoshear® Internally Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149.
"Vertical loop reactors—fine bubble power efficiency without fine bubble maintenance" brochure by Envirex Inc., Jan. 1986.
Abu-Orf et al., "Adjusting Floc cations to improve effluent quality: the case of aluminum addition at Sioux City Wastewater Treatment Facility," Water Environment Federation, 2004, 16 pages.
Abu-Orf et al., "Chemical and physical pretreatment of ATAD biosolids for dewatering," Water Science Technology, 2001, vol. 44, No. 10, pp. 309-314, IWA Publishing.
Bakker, Chapter IIA, "Cell K+ and K+ Transport Systems in Prokaryotes," in Alkali Cation Transport Systems in Prokaryotes, Bakker, E.P., 1993, pp. 205-224, CRC Press.
Bishop et al., "Fate of nutrients during aerobic digestion," Journal Environ. Eng. Div. Proc. Am. Soc. Civil Eng., 1978, vol. 104, No. EE5, pp. 967-979.
Bruus et al., "On the stability of activated sludge Flocs with implications to dewatering," Water Research, 1992, vol. 26, No. 12, pp. 1597-1604, Pergamon Press Ltd.
Caulet et al., "Modulated aeration management by combined ORP and DO control: a guarantee of quality and power savings for carbon and nitrogen removal in full scale wastewater treatment plants," Center of International Research for Water Environment, France, 1999.
Charpentier et al., "ORP Regulation and Activated Sludge, 15 years of Experience," 19th Biennial Conference/AWQ of Vancouver, Jun. 1998.
Chen et al., "Effect of sludge fasting/feasting on growth of activated sludge cultures," Wat. Res., 2001, vol. 35, No. 4, pp. 1029-1037, Elsevier Science Ltd., Pergamon.
Chen et al., "Minimization of activated sludge production by chemically stimulated energy spilling," Water Science and Technology, 2000, vol. 42, No. 12, pp. 189-200, IWA Publishing.
Chudoba et al., "Pre-denitrification performance of a high-loaded anoxic sludge," Degremont Research Center, France, 1999.
Chudoba et al., "The aspect of energetic uncoupling of microbial growth in the activated sludge process-OSA system," Water Science and Technology, 1992, vol. 26, No. 9-11, pp. 2477-2480, IAWPRC.
Dignac et al., "Chemical description of extracellular polymers: implication on activated sludge Floc structure," Water Science Technology, 1998, vol. 38, No. 8-9, pp. 45-53, Elsevier Science Ltd.
Dubois et al., "Colorimetric method for determination of sugars and related substances," Analytical Chemistry, 1956, vol. 28, No. 3, pp. 350-356.
Ekama et al., "Considerations in the process design of nutrient removal activated sludge processes," Water Science and Technology, 1983, vol. 15, pp. 283-318, IAWPRC/Pergamon Press Ltd.
Euro-Matic, "Hollow plastic balls for industrial applications," Sep. 10, 2004, 7 pages, http://www.euro-matic.com/hollow.html.
Frolund et al., "Extraction of extracellular polymers from activated sludge using a cation exchange resin," Water Research, 1996, vol. 30, No. 8, pp. 1749-1758, Elsevier Science Ltd.
Harrison et al., "Transient responses of facultatively anaerobic bacteria growing in chemostat culture to a change from anaerobic to aerobic conditions," Journal of General Microbiology, 1971, vol. 68, pp. 45-52.
Hartree, "Determination of protein: a modification of the Lowry Method that gives a linear photometric response," Analytical Biochemistry, 1972, vol. 48, pp. 422-427, Academic Press, Inc.
Higgins et al., "Characterization of exocellular protein and its role in bioflocculation," Journal of Environmental Engineering, 1997, vol. 123, pp. 479-485.
Higgins et al., "The effect of cations on the settling and dewatering of activated sludges: laboratory results," Water Environment Research, 1997, vol. 69, No. 2, pp. 215-224.
Holbrook et al., "A comparison of membrane bioreactor and conventional-activated-sludge mixed liquor and biosolids characteristics," Water Environment Research, 2005, vol. 77, No. 4, pp. 323-330.
Hong et al., "Biological phosphorus and nitrogen removal via the A/O process: recent experience in the United States and United Kingdom," Water Science and Technology, 1984, vol. 16, pp. 151-172, Vienna, Austria.
Kakii et al., "Effect of calcium ion on sludge characteristics," J. Ferment. Technol., 1985, vol. 63, No. 3, pp. 263-270.
Kim et al., "pH and oxidation-reduction potential control strategy for optimization of nitrogen removal in an alternating aerobic-anoxic system," Water Environment Research, 2001, vol. 73, No. 1, pp. 95-102.
Klopping et al., "Activated sludge microbiology, filamentous and non-filamentous microbiological problems and biological nutrient removal," Water Environment Federation, Plant Operations Specialty Conference, 1999.
Low et al., "The use of chemical uncouplers for reducing biomass production during biodegradation," Water Science and Technology, 1998, vol. 37, No. 4-5, pp. 399-402, Elsevier Science Ltd./Pergamon.
Lowry et al., "Protein measurement with the folin phenol reagent," J. Bio. Chem., 1951, vol. 193, pp. 265-275.

(56) References Cited

OTHER PUBLICATIONS

Mahmoud et al., "Anaerobic stabilisation and conversion of biopolymers in primary sludge-effect of temperature and sludge retention time," Water Research, 2004, vol. 38, pp. 983-991, Elsevier Ltd.

Marais et al., "Observations supporting phosphate removal by biological excess uptake—a review," Water Science and Technology, 1983, vol. 15, pp. 15-41, IAWPRC/Pergamon Press Ltd.

Mavinic et al., "Fate of nitrogen in aerobic sludge digestion," J. Water Pollut. Control Fed., 1982, vol. 54, No. 4, pp. 352-360.

Moen et al., "Effect of solids retention time on the performance of thermophilic and vesophilic digestion of combined municipal wastewater sludges," Water Environment Research, 2003, vol. 75, No. 6, pp. 539-548.

Murthy et al., "Factors affecting Floc properties during aerobic digestion: implications for dewatering," Water Environment Research, 1999, vol. 71, No. 2, pp. 197-202.

Murthy et al., "Optimizing dewatering of biosolids from autothermal thermophilic aerobic digesters (ATAD) using inorganic conditioners," Water Environment Research, 2000, vol. 72, No. 6, pp. 714-721.

Ng et al., "Membrane bioreactor operation at short solids retention times: performance and biomass characteristics," Water Research, 2005, vol. 39, pp. 981-992.

Nielsen et al., "Changes in the composition of extracellular polymeric substances in activated sludge during anaerobic storage," Appl. Microbiol. Biotechnol., 1996, vol. 44, pp. 823-830, Springer-Verlag.

Novak et al., "Mechanisms of Floc destruction during anaerobic and aerobic digestion and the effect on conditioning and dewatering of biosolids," Water Research, 2003, vol. 37, pp. 3136-3144, Elsevier Science Ltd.

Park et al., "The digestibility of waste activated sludges," Water Environment Research, 2006, vol. 78, No. 1, pp. 59-68.

Park et al., "The effect of wastewater cations on activated sludge characteristics: effects of aluminum and iron in Floc," Water Environment Research, 2006, vol. 78, No. 1, pp. 31-40.

\* cited by examiner

HYBRID AEROBIC AND ANAEROBIC WASTEWATER AND SLUDGE TREATMENT SYSTEMS AND METHODS

CROSS-REFERENCE TO RELATED APPLICATIONS

This application claims priority under 35 U.S.C. §120 as a division of U.S. patent application Ser. No. 13/034,269, filed Feb. 24, 2011, titled HYBRID AEROBIC AND ANAEROBIC WASTEWATER AND SLUDGE TREATMENT SYSTEMS AND METHODS which claims priority under 35 U.S.C. §119 of U.S. Provisional Application Ser. No. 61/308,297, filed Feb. 25, 2010, titled RECYCLE METHANOGEN AND NITRIFICATION BACTERIA IN A BIO-SORPTION AND ANAEROBIC DIGESTION PROCESS AND NUTRIENT RECOVERY IN A BIO-SORPTION AND ANAEROBIC DIGESTION PROCESS both of which being incorporated herein by reference for all purposes.

BACKGROUND OF THE INVENTION

1. Field of the Invention

The present invention relates to systems and processes of wastewater treatment and, in particular, to systems and methods of treating wastewater utilizing biological sorption, aerobic treatment, anaerobic sludge digestion, sequencing batch reactors with membrane filtration systems.

2. Description of the Related Art

Pilgram et al., in U.S. Pat. No. 6,383,389, which is incorporated herein by reference for all purposes, including but not limited to sequences or stages that can be used in batch or continuous reactors, teach a wastewater treatment system and method of controlling the treatment system. A control system can sequence and supervise treatment steps in a batch flow mode of operation or a continuous flow mode.

Sutton, in U.S. Patent Application No. 2008/0223783, teaches a wastewater treatment system and a method of treating wastewater. The system includes an aerobic membrane bioreactor and an anaerobic digester system connected to receive wasted solids continuously from the aerobic membrane bioreactor. The system also returns effluent from the anaerobic digester system continuously to the aerobic membrane bioreactor.

SUMMARY OF THE INVENTION

One or more aspects of the present disclosure involve embodiments directed to a process for treating wastewater and sludge. The process can comprise providing a wastewater to be treated, promoting biological sorption of the wastewater to be treated to produce a first mixed liquor, producing a solids-rich sludge and a solids-lean portion from the mixed liquor, aerobically treating a first portion of the solids-rich sludge to produce an at least partially aerobically treated sludge, anaerobically digesting a second portion of the solids-rich sludge to produce an anaerobically digested sludge, combining at least a portion of the at least partially aerobically treated sludge with the wastewater to be treated, and combining at least a portion of the anaerobically digested sludge with the wastewater to be treated.

One or more further aspects of the present disclosure are directed to a process for treating wastewater comprising providing a wastewater stream to be treated, introducing the wastewater stream into a biological sorption tank to produce a first mixed liquor stream, introducing the mixed liquor stream into a separator to produce a solids-rich stream and a solids-lean stream, introducing at least a portion of the solids-rich stream into an aerobic treating tank to produce an at least partially aerobically treated sludge stream, introducing at least a portion of the solids-rich stream into an anaerobic digester to produce an anaerobically digested sludge stream, introducing at least a portion of the at least partially aerobically treated sludge stream into the biological sorption tank, and introducing at least a portion of the anaerobically digested sludge stream into the biological sorption tank.

One or more further aspects of the present disclosure are directed to a wastewater treatment system comprising a source of a wastewater to be treated, a biological sorption tank having a sorption tank inlet fluidly connected to the source of the wastewater, a separator fluidly having a separator inlet fluidly connected downstream from the biological sorption tank, a sludge outlet, and a solids-lean outlet, an aerobic treatment tank having an aerobic tank inlet fluidly connected downstream from the sludge outlet, and an at least partially aerobically treated sludge outlet fluidly connected to the sorption tank inlet, an anaerobic digester having a digester inlet fluidly connected downstream from the sludge outlet, and a digested sludge outlet fluidly connected upstream of the sorption tank inlet.

One or more further aspects of the present disclosure are directed to a wastewater treatment system comprising a source of wastewater to be treated, a sequencing batch reactor having a basin with a basin inlet fluidly connectable to the source of the wastewater, an aeration system, a sludge collection system with a sludge outlet, and a decanting system with a supernatant outlet, an anaerobic digester having a digester inlet fluidly connectable downstream from the sludge outlet, and a digested sludge outlet fluidly connectable to the basin inlet, and a controller configured to generate a first output signal that provides fluid communication between the basin inlet and the source of wastewater, and a second signal that provides fluid communication between the sludge outlet and the digester inlet.

One or more further aspects of the present disclosure are directed to a wastewater treatment system comprising a source of wastewater to be treated; a biological treatment train fluidly connected to the source of wastewater to be treated, the first treatment train comprising at least one biological reactor selected from the group consisting of an anaerobic reactor, an anoxic reactor, and an aerobic reactor; an anaerobic digester fluidly connected downstream from a solids-rich waste outlet of the biological treatment train; and a digested anaerobic sludge recycle line fluidly connecting a digested sludge outlet of the anaerobic digester and an inlet of the at least one biological reactor.

One or more aspects of the present disclosure are directed to a method of facilitating wastewater treatment in a wastewater treatment system having a biological treatment train with at least one biological reactor selected from the group consisting of an anaerobic reactor, an anoxic reactor, and an aerobic reactor. The method can comprise fluidly connecting a solids-rich outlet of the biological treatment train upstream of an inlet of an anaerobic digester, and fluidly connecting a digested sludge outlet of the anaerobic digester upstream of an inlet of the at least one biological reactor.

One or more aspects of the present disclosure are directed to a process for treating wastewater. The process can comprise providing wastewater comprising dissolved and suspended solids, promoting aggregation of at least a portion of the dissolved and suspended solids to produce a first mixed liquor, separating the first mixed liquor into a first solids-lean portion and a first solids-rich sludge, anaerobically digesting a first portion of the first solids-rich sludge to produce an anaerobically digested sludge, separating the anaerobically digested sludge into a second solids-lean portion and a second solids-rich sludge, precipitating one of a phosphorous containing compound and a nitrogen containing compound from the second solids-lean portion, and combining a portion of the second solids-rich sludge with the wastewater.

In accordance with some embodiments, the process further comprises aerobically treating a second portion of the first solids-rich sludge to produce an at least partially aerobically treated sludge.

In accordance with some embodiments, the process further comprises combining at least a portion of the at least partially aerobically treated sludge with the wastewater.

In accordance with some embodiments, the process further comprises thickening the first portion of the first solids-rich sludge prior to anaerobically digesting the first portion of the first solids-rich sludge.

In accordance with some embodiments, thickening the first portion of the first solids-rich sludge comprises producing a solids-rich sludge having a first concentration of methanogenic bacteria, and anaerobically digesting the first portion of the first solids-rich sludge comprises producing an anaerobically digested sludge having a second concentration of methanogenic bacteria, the first concentration being a significant fraction of the second concentration. The first concentration can be at least about 10% of the second concentration. The first concentration can be at least about 25% of the second concentration. The first concentration can be at least about 50% of the second concentration.

In accordance with some embodiments, the process further comprises aerobically treating the portion of the second solids-rich sludge prior to combining the portion of the second solids-rich sludge with the wastewater.

In accordance with some embodiments, the process further comprises combining a second portion of the first solids-rich sludge with the portion of the second solids-rich sludge.

In accordance with some embodiments, the process further comprises separating a solids-lean fluid from the first solids-rich sludge prior to anaerobically digesting the first portion of the first solids-rich sludge.

In accordance with some embodiments, the process further comprises combining at least a portion of the solids-lean fluid with the second portion of the first solids-rich sludge, and the portion of the second solids-rich sludge.

In accordance with some embodiments, the process further comprises aerobically treating the combination of the at least a portion of the solids-lean fluid, the second portion of the first solids-rich sludge, and the portion of the second solids-rich sludge to form an at least partially aerobically treated combination.

In accordance with some embodiments, the process further comprises combining the at least partially aerobically treated combination with the wastewater.

In accordance with some embodiments, the process further comprises anoxically treating the wastewater and the at least partially aerobically treated combination to produce an anoxically treated wastewater, and wherein promoting aggregation comprises introducing methanogenic bacteria from the anaerobically digested sludge into the first mixed liquor.

In accordance with some embodiments, precipitating one of the phosphorous containing compound and the nitrogen containing compound from the second solids-lean portion comprises adjusting a pH of the second solids-lean portion. In accordance with some embodiments, precipitating one of the phosphorous containing compound and the nitrogen containing compound from the second solids-lean portion comprises contacting the solids-lean portion with an alkali earth metal salt. The alkali earth metal salt can comprise magnesium. The alkali earth metal salt can comprise magnesium chloride.

In accordance with some embodiments, precipitating one of the phosphorous containing compound and the nitrogen containing compound from the second solids-lean portion comprises precipitating struvite from the second solids-lean portion.

One or more aspects of the present disclosure are directed to a wastewater treatment system. The wastewater treatment system comprises a first treatment unit comprising one of a biological sorption tank, an aerobic treatment tank, an anoxic treatment tank, and an anaerobic digester, the first treatment unit having a treatment unit inlet and a mixed liquor outlet, a first separator having a first separator inlet in fluid communication with the mixed liquor outlet, a first solids-lean fluid outlet, and a first sludge outlet, an anaerobic digester having a digester inlet in fluid communication with the first sludge outlet, and a first digester outlet, a second separator having a second separator inlet in fluid communication with the first digester outlet, a second solids-lean fluid outlet, and a second sludge outlet, the second sludge outlet in fluid communication with the treatment unit inlet, and a precipitation vessel in fluid communication with the second solids-lean fluid outlet.

In accordance with some embodiments, the wastewater treatment system further comprises a third separator fluidly connected downstream of the first sludge outlet and upstream of the digester inlet, and having a third solids-lean fluid outlet and a thickened sludge outlet.

In accordance with some embodiments, the wastewater treatment system further comprises an aerobic treatment unit having an aerobic inlet in fluid communication with the first sludge outlet, a second digester outlet of the anaerobic digester, and with the third solids-lean fluid outlet, and having an aerobic outlet in fluid communication with the treatment unit inlet.

In accordance with some embodiments, the first treatment unit, the first separator, and the third separator are configured to produce a thickened sludge having a first concentration of a methanogenic bacteria and the anaerobic digester is configured to produce a digested anaerobic sludge having a second concentration of the methanogenic bacteria, the first concentration being a substantial fraction of the second concentration. The first concentration can be at least about 10% of the second concentration. The first concentration can be at least about 25% of the second concentration. The first concentration can be at least about 50% of the second concentration.

In accordance with some embodiments, the third separator contains a first consortium of bacteria with a concentration of methanogenic microorganisms that is a substantial fraction of a concentration of methanogenic microorganisms in a second consortium of bacteria contained in the anaerobic digester. The substantial fraction can be at least about 10%. The substantial fraction can be at least about 25%. The substantial fraction can be at least about 50%.

One or more aspects of the present disclosure are directed to a method of increasing the capacity of a wastewater treatment system having a biological treatment train with at least one biological reactor selected from the group consisting of an anaerobic reactor, an anoxic reactor, and an aerobic reactor, a solids-rich outlet of the biological treatment train fluidly connected upstream of an inlet of an anaerobic digester, and a recycle line fluidly connecting an outlet of the anaerobic digester to an inlet of the biological treatment train. The method comprises adjusting a fraction of a solids-rich sludge produced in the biological treatment train directed to the inlet of the anaerobic digester to a level at which a concentration of methanogenic bacteria present in the solids-rich sludge produced in the biological treatment train is a substantial fraction of a concentration of methanogenic bacteria present in mixed liquor in the anaerobic digester.

In accordance with some embodiments, the method further comprises reducing a hydraulic retention time of one of the at least one biological reactor and the anaerobic digester.

In accordance with some embodiments, the method further comprises producing a biological floc in the at least one biological reactor having an aerobic outer layer and one of an anoxic and an anaerobic core.

In accordance with some embodiments, producing the biological floc in the at least one biological reactor comprises increasing the organic loading of the at least one biological reactor.

In accordance with some embodiments, producing the biological floc in the at least one biological comprises reducing an amount of oxygen supplied to the at least one biological reactor.

In accordance with some embodiments, the method further comprises increasing a rate of production of methane in the anaerobic digester.

In accordance with some embodiments, the method further comprises directing methanogenic bacteria from the outlet of the anaerobic digester, through an aerobic treatment operation, and to the inlet of the anaerobic reactor.

BRIEF DESCRIPTION OF THE DRAWINGS

The accompanying drawings are not intended to be drawn to scale. The identical or nearly identical component or feature that is illustrated in various figures is represented by a like numeral. For purposes of clarity, not every component may be labeled in every drawing, nor is every component of each embodiment of the invention shown where illustration is not necessary to allow those of ordinary skill in the art to understand the invention. In the drawings.

DETAILED DESCRIPTION OF THE INVENTION

Figure 1:
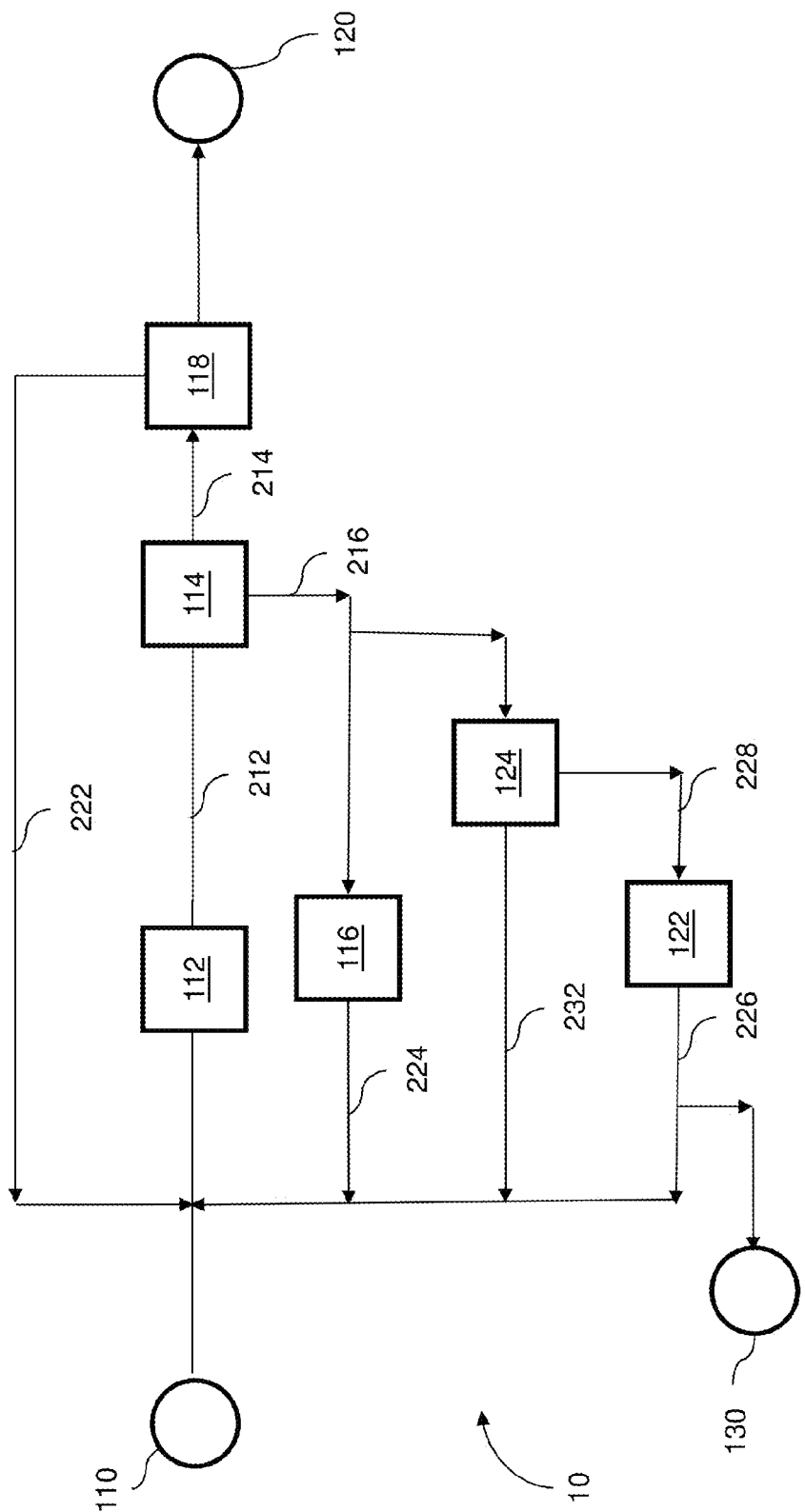
FIG. 1 is a flow diagram illustrating a representative treatment system pertinent to one or more aspects of the invention.

Aspects and embodiments of this invention are directed to systems and methods of treating water, wastewater, or sludge to, for example, reduce oxygen demand, such as the biological oxygen demand (BOD), and render the water suitable for secondary uses or discharge to the environment. One or more aspects of the invention relate to wastewater treatment systems and methods of operation and facilitating thereof. Further aspects of the invention can pertain to generating, or collecting a byproduct such as an off-gas and utilizing the byproduct as a fuel source for one or more unit operations of the treatment system. Further aspects of the invention can pertain to recovering phosphorous and/or nitrogen containing compounds from wastewater for use as, for example, fertilizer.

The invention is not limited in its application to the details of construction and the arrangement of components, systems, or subsystems set forth herein, and is capable of being practiced or of being carried out in various ways. Typically, the water to be treated, such as wastewater or a wastewater stream, contains waste matter which, in some cases, can comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water can be treated to reduce its COD, BOD, and/or other characteristic such as Giardia content to within acceptable limits.

Some aspects of the invention can involve biologically treating wastewater by promoting bacterial digestion of biodegradable material of at least a portion of at least one species in the wastewater. Further aspects of the invention can relate to effecting or at least facilitating separation of converted, digested biodegraded solid material from the entraining liquid. Still further aspects of the invention can relate to effecting or at least facilitating reducing an amount of solids from the wastewater or water to be treated.

Some aspects of the invention can involve recovering one or more desired minerals or compounds, for example, phosphorous and/or nitrogen containing compounds, from the wastewater.

As used herein, the terms "water," "wastewater," and "wastewater stream" can refer to water to be treated such as streams or bodies of water from residential, commercial, or municipal, industrial, and agricultural sources, as well as mixtures thereof, that typically contain at least one undesirable species, or pollutant, comprised of biodegradable, inorganic or organic, materials which can be decomposed or converted by biological processes into environmentally benign or at least less objectionable compounds. The water to be treated can also contain biological solids, inert materials, organic compounds, including recalcitrant or a class of compounds that are difficult to biodegrade relative to other organic compounds as well as constituents from ancillary treatment operations such as, but not limited to nitrosamines and endocrine disruptors.

A "solids-lean" or "sludge-lean" sludge, portion, stream, or fluid is typically a liquid, such as water that has been at least partially treated, having less suspended solids relative to a starting mixed liquor or sludge after one or more settling or separation operations. Conversely, a "solids-rich" or "sludge-rich" sludge, portion, stream, or fluid is typically a liquid, such as water that has been at least partially treated, having a higher solids concentration relative to the starting mixed liquor or sludge after one or more settling or separation operations. For example, a mixed liquor having suspended solids can be allowed to promote settling of at least a portion of the solids suspended therein; the resultant water body, as a consequence of artificially induced or natural gravitational forces will typically have a lower water layer and an upper water layer, wherein the lower layer has a higher concentration of solids, relative to the starting mixed liquor and to the upper, solids-lean water layer. Further, the solids-lean water layer will typically have a lower concentration of solids suspended therein relative to the starting mixed liquor. Separation operations that can be utilized to effect or promote some aspects of the invention can utilize gravitational forces produce any of the solids-rich, solids-lean, sludge-rich, and sludge-lean portions or streams. Other separation operations can involve filtration.

A "treated" portion is typically water having less undesirable species or pollutants relative to a starting "solids-lean" portion after one or more treatment stages, such as one or more biological or separation operations. A "solids-lean" portion having undesirable species such as soluble inorganic or organic compounds can be introduced to one or more separation operations, such as a membrane filtration device or a membrane bioreactor that may retain the inorganic or organic compounds on a first side of a filter as a "second mixed liquor," while allowing the "treated" portion to pass through the filter.

One or more of the inventive systems disclosed herein can comprise one or more biologically-based or non-biologically-based unit operations. The systems and techniques of the invention can be effected as, or at least as a portion, of decontamination or treatment systems that typically include one or more of pre-treatment, primary treatment, secondary treatment, and post-treatment or polishing operations. The treatment facilities that can employ one or more aspects of the invention can include at least one of the pre-treatment, primary treatment, secondary treatment, and post-treatment or polishing operations.

Pretreatment systems and operations may remove grit, sand, and gravel. Primary treatment operations or systems can involve at least partial equalization, neutralization, and/or removal of large insoluble material of the water to be treated such as, but not limited to fats, oils, and grease. The pretreatment and primary treatment operations may be combined to remove such materials as well as settleable solids and floating bodies, and insoluble objects such as rags and sticks. For example, primary clarifiers may be utilized to separate solids.

Secondary treatment unit operations or systems can involve biological treatment such as those that typically employ a biomass with bacteria or a consortium of microorganisms to at least partially hydrolyze or convert biodegradable material such as, but not limited to sugar, fat, organic molecules, and compounds that create an oxygen demand in the water. Indeed, some advantageous aspects of the invention can utilize biological processes and systems to remove or convert at least a portion of organic material in the water to be treated.

Post-treatment or polishing operations or systems can include biological treatments, chemical treatments, and separation systems. The post-treatment operations may include processes that involve biological nitrification/denitrification and phosphorus removal. Chemical treatments that can be used may include chemical oxidation and chemical precipitation. Separation systems can include dissolved inorganic solids removal by ion exchange, ultrafiltration, reverse osmosis, or electrodialysis. Further treatment processes can involve disinfection, decontamination or inactivation of at least a portion of any residual microorganisms by chemical or physical means. For example, disinfection can be effected by exposure to any one or more of oxidizing agents or to actinic radiation. Commercially available separation systems that may be utilized in some embodiments of the invention include those employing the CMF-S™ continuous membrane filtration modules as well as the MEMCOR® CMF (Pressurized) XP, CP, and XS membrane filtration systems, from Siemens Water Technologies Corp. Other separators that can be used include filter presses and centrifuges.

Some embodiments of the treatment systems of the invention can comprise a source of wastewater to be treated, a biological sorption tank having a sorption tank inlet fluidly connected to the source of the wastewater. The treatment systems of the invention can also comprise a separator fluidly having a separator inlet fluidly connected downstream from the biological sorption tank, a sludge outlet, and a solids-lean outlet. The treatment systems of the invention can further comprise an aerobic treatment tank having an aerobic tank inlet fluidly connected downstream from the sludge outlet, and an at least partially aerobically treated sludge outlet fluidly connected to the sorption tank inlet. The treatment systems of the invention can additionally comprise an anaerobic digester having a digester inlet fluidly connected downstream from the sludge outlet, and a digested sludge outlet fluidly connected upstream of the sorption tank inlet.

Non-limiting examples of clarifiers or components thereof that can be utilized in one or more configurations of the present treatment systems include, but are not limited to the ENVIREX® FLOC-CLARIFIER system, the SPIRA-CONE™ upflow sludge blanket clarifier, RIM-FLO® circular clarifier, and the TRANS-FLO® clarifier, from Siemens Water Technologies Corp.

Membrane bioreactor (MBR) systems that can be utilized in accordance with one or more configurations disclosed herein include, but are not limited to, the MEMPULSE™ membrane bioreactor system, the PETRO™ membrane bioreactor system, the Immersed Membrane Bioreactor System, and the XPRESS™ MBR Packaged Wastewater System, from Siemens Water Technologies Corp.

Non-limiting examples of components or portions of anaerobic systems that can be utilized in one or more configurations of the wastewater systems include, but are not limited to, the DYSTOR® digester gas holder system, the CROWN® disintegration system, the PEARTH® digester gas mixing system, the PFT® spiral guided digester gas holder, the PFT® vertical guided digester holder, the DUO-DECK™ floating digester cover, and the PFT® heater and heat exchanger system, from Siemens Water Technologies Corp.

One or more embodiments pertinent to some aspects of the invention can involve a wastewater treatment system comprising a source of wastewater to be treated and a sequencing batch reactor having a basin with a basin inlet fluidly connectable to the source of the wastewater, an aeration system, a sludge collection system with a sludge outlet, and a decanting system with a supernatant outlet. The wastewater treatment system can also comprise an anaerobic digester having a digester inlet fluidly connectable downstream from the sludge outlet, and a digested sludge outlet fluidly connectable to the basin inlet, and a controller configured to generate a first output signal that provides fluid communication between the basin inlet and the source of wastewater, and a second signal that provides fluid communication between the sludge outlet and the digester inlet.

In still further embodiments of the invention, the methods and techniques of the invention can comprise providing a wastewater to be treated and promoting biological sorption of the wastewater to be treated to produce a first mixed liquor. The methods and techniques of the invention can further comprise producing a solids-rich sludge and a solids-lean portion from the mixed liquor, and aerobically treating a first portion of the solids-rich sludge to produce an at least partially aerobically treated sludge. A second portion of the solids-rich sludge can be anaerobically digested to produce an anaerobically digested sludge. The methods and techniques of the invention can even further comprise combining at least a portion of the at least partially aerobically treated sludge with the wastewater to be treated, and combining at least a portion of the anaerobically digested sludge with the wastewater to be treated.

In still further embodiments of the invention, the methods and techniques of the invention can comprise providing a wastewater stream to be treated, and introducing the wastewater stream into a biological sorption tank to produce a first mixed liquor stream. The methods and techniques of the invention can also comprise introducing the mixed liquor stream into a separator to produce a solids-rich stream and a solids-lean stream. The methods and techniques of the invention may even further comprise introducing at least a portion of the solids-rich stream into an aerobic treating tank to produce an at least partially aerobically treated stream. Even further, the methods and techniques of the invention can comprise at least a portion of the solids-rich stream into an anaerobic digester to produce an anaerobically digested sludge stream. Still further, the methods and techniques of the invention can comprise introducing at least a portion of the at least partially aerobically treated sludge stream into the biological sorption tank, and introducing at least a portion of the anaerobically digested sludge stream into the biological sorption tank.

One or more embodiments pertinent to some aspects of the invention can involve a wastewater treatment system comprising a source of wastewater to be treated and a biological treatment train fluidly connected to the source of wastewater to be treated. The first treatment train can comprise at least one biological reactor selected from the group consisting of an anaerobic reactor, an anoxic reactor, and an aerobic reactor. The wastewater treatment system can also comprise an anaerobic digester fluidly connected downstream from a solids-rich outlet of the biological treatment train and a digested anaerobic sludge recycle line fluidly connecting a digested sludge outlet of the anaerobic digester and an inlet of the at least one biological reactor.

In still further embodiments of the invention, the methods and techniques of the invention can involve or be directed to facilitating wastewater treatment in a wastewater treatment system having a biological treatment train with at least one biological reactor selected from the group consisting of an anaerobic reactor, an anoxic reactor, and an aerobic reactor. The method can comprise fluidly connecting a solids-rich outlet of the biological treatment train upstream of an inlet of an anaerobic digester, and fluidly connecting a digested sludge outlet of the anaerobic digester upstream of an inlet of the at least one biological reactor.

The systems and components of the invention may also provide cost advantages relative to other wastewater treatment systems through use of biological processes in combination with anaerobic digestion. The wastewater treatment processes of the present invention can reduce sludge production through the use of various unit operations including biological processes and recycle streams. The wastewater treatment processes also overcome some of the technical difficulties associated with use of anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. The various processes can also generate methane as a product of the anaerobic digestion process, which can be used as an energy source. In certain embodiments, a large portion of the chemical oxygen demand (COD) and biological oxygen demand (BOD) can be reduced using the anaerobic digester. This can reduce the aeration and oxygen requirements, and thus, operation costs, and increase the amount of methane produced that can be used as an energy source. Additionally because anaerobic digestion can be used to reduce COD and BOD in the sludge, the sludge yield can also be reduced.

In contrast to conventional contact stabilization processes, wherein the sludge stabilization is performed in aerobic sludge stabilization tanks with retention times of a few hours such as between one and two hours, one or more of the present treatment systems can utilize a plurality of sub-trains and one or more sorption systems that facilitate assimilation or biological sorption of suspended and/or dissolved materials. For example, the various systems and techniques disclosed herein can advantageously provide wastewater treatment by utilizing a plurality of sub-trains that have varied hydraulic loadings. A first train can treat a majority of a sludge stream, preferably by anaerobic digestion, and a second can train anaerobically treat a fraction of the sludge stream, typically only partially aerobically treated by exposure to aerobic activity for less than full conversion or consumption of all oxygen demand. Various configuration of the present systems can utilize solids/liquids separators that further reduce capital requirements. Thus, in some cases, one or more separators can be utilized to separate sludge or solids-rich streams to be treated in one or more of the sub-trains.

Some other embodiments of the treatment systems of the invention can comprise collecting and/or converting various materials to produce a sludge material. For example, biological sorption processes can be employed to promote both adsorption and absorption processes that facilitate conversion of at least a portion of dissolved solids as well as suspended solids in the water or wastewater. In the adsorption process, ions and molecules of particles physically adhere or bond onto the surface of another molecule or compound. For example, the adsorption process can comprise attaching compounds or molecules to surfaces of soluble and insoluble particles in the wastewater to cause them to settle in a downstream clarifier. In absorption processes, chemical and biochemical reactions can occur in which compounds or substances in one state are converted into another compound or substance in a different state. For example, compounds in the wastewater can be converted to another compound, or can be incorporated by or into bacteria for the purpose of growing new bacteria. Aeration can be provided to the biological sorption process to mix and to provide an aerobic environment. The retention time in a biological sorption tank can be between a few minutes and a few hours, for example, between about five minutes and two hours, more preferably between thirty minutes and one hour. Aeration therein can be effected to provide mixing and maintain an aerobic environment that facilitates flocculation. Further flocculation or aggregation can be effected in the systems that utilize an aerobic treatment tank. In some cases, however, the aerobic treatment tank provides substantially all the dissolved oxygen into the biological sorption tank.

In some cases, the treatment system can involve unit operations that have various consortia of microorganisms that facilitate rapid return to steady state conditions following an upset. For example, the treatment system can circulate microorganisms that provide or facilitate anaerobic digestive activity, such as methogenic activity.

In some previously known treatment systems, anaerobic digestion process failures may result from a lack of methogenic activity to convert the biomass acid and hydrogen to methane. The hydraulic residence time or solids retention time of the anaerobic digester in these previously known treatment systems are sometimes designed to be greater than that of some embodiments of the presently disclosed treatment system. (The anaerobic digesters in these previously known systems were sometimes sized larger than in some embodiments of the presently disclosed treatment system. A larger anaerobic digester size, for a given flow rate, would result in a greater hydraulic residence time or solids retention time in the anaerobic digester.) In previously known systems, the anaerobic digester would be sized to maintain at least a steady state bacterial population, taking into account the growth rates of slower growing bacteria such as acetoclastic methanogens, with maximum specific growth rate of about 0.3 day$^{-1}$ and hydrogenotrophic methanogens with maximum specific growth rate of about 1.4 day$^{-1}$.

It was previously believed that methanogens were strict anaerobic bacteria that would die quickly in an aerobic environment. Various aspects of the invention, however, involve treatment systems and subsystems, unit operations, and components thereof that accommodate or increase the survivability of methanogenic organisms. One advantageous feature of the treatment systems of the present application involves providing a large amount of methanogens through the anaerobic recycle to the contact stabilization process through the unique internal anaerobic sludge recycle path. At least a portion of the methanogenic bacteria return to the anaerobic digester, thereby seeding the anaerobic digester with methanogenic bacteria to join the existing population of the viable methanogens in the anaerobic digester. This reduces the need for the anaerobic digester to have a size and resultant hydraulic residence time or solids retention time to maintain a stable methanogenic bacteria population in the absence of bacterial seeding, as in previously known processes.

The concentration of seeding methanogenic bacteria, on a basis of a count of microorganisms, provided at the input of the anaerobic digester may in some embodiments be at least a target percentage, such as about 10% or more, of the concentration of the methanogenic bacteria present in the anaerobically digested sludge stream exiting the anaerobic digester. In some embodiments, this percentage may be, for example, 25% or more, 33% or more, 50% or more, or 75% or more. In some embodiments, the concentration of methanogenic bacteria provided at the input of the anaerobic digester may be a substantial fraction of the concentration of the methanogenic bacteria present in the anaerobically digested sludge stream exiting the anaerobic digester, for example, about 10% or more, about 30% or more, about 40% or more, or about 50% or more.

The anaerobic digester of systems in accordance with the present may be sized smaller than those in previously known systems. The methanogenic bacterial seeding of the anaerobic digester also provides for a safety factor against disruptions of the anaerobic digestion process. In the event of anaerobic digestion process upset or failure, the anaerobic digesters of the presently disclosed systems would recover faster than that the anaerobic digesters in previously known systems because the seeding of the anaerobic digester with methanogenic bacteria would add to the rate replenishment of methanogenic bacteria in the anaerobic reactor due to the growth of these bacteria therein, reducing the time required for the anaerobic digester to achieve a desired concentration of methanogenic bacteria.

The advantage of methanogen recycle can be estimated as follow:

$$\theta_x = \frac{X_a V}{Q X_a - Q X_a^0}$$

Where
$\theta_x$=Solids retention time in anaerobic digester (days)
$X_a$=concentration of methanogens
$Q$=influent and effluent flow rate
$X_a^0$=concentration of methanogens in the inlet stream, which is normally considered zero for conventional activated sludge process.

If about 50% of methanogens survive in the short solid retention time contact stabilization process and recycled back to anaerobic digester, the solids retention time of the anaerobic digester could be doubled, or the size of the anaerobic digester decreased by half. For example, in previously known systems a hydraulic retention time in an anaerobic digester was in many instances set at between about 20 and about 30 days. With a treatment system operating in accordance some embodiments of the present application, this hydraulic retention time may be reduced by about 50% to between about 10 and about 15 days.

In some embodiments of the apparatus and methods disclosed herein, a hydraulic retention time in a treatment system contact stabilization vessel may be about one hour or less. A significant portion of methanogens can be recycled in the short solid retention time contact stabilization aerobic process, which can reduce the capital cost and operational cost of the anaerobic digesters. For example, the tank volume of the anaerobic digesters could be decreased to bring the safety factor to a range closer to those anaerobic digesters without a methanogen recycle process. With smaller volume, the capital cost of the anaerobic digesters and the mixing energy consumption of the anaerobic digestion process would both decrease, which will make apparatus and processes in accordance with the present disclosure more cost effective than previously known apparatus and processes.

In other embodiments, the seeding of the anaerobic digester with recycled methanogenic bacteria may provide for decreasing the hydraulic residence time of sludge treated in the digester. This would result in a decreased cycle time, and thus an increased treatment capacity of the treatment system. Increasing the amount of methanogens recycled to the anaerobic digester, by, for example, increasing an amount of methanogens containing sludge directed into the digester, would provide greater opportunity to decrease the hydraulic residence time in the digester and increase the treatment capacity of the system.

In some embodiments an amount of methanogenic bacteria recycled to the inlet of the anaerobic digester may be further increased by, for example, decreasing the solids retention time in the contract stabilization process by increasing the anaerobic sludge recycle percentage. The anaerobic sludge recycle may include solids-rich sludge directed from the clarifier 114 to the thickener 124, as shown in the embodiment illustrated in FIG. 1. Alternatively, or additionally, the organic loading rate of the bio-sorption unit may be increased. When the organic loading rate is high, available oxygen could be quickly used in the outer layer of the biological floc as the result of higher oxygen utilization rate in the outer layer of the floc, leaving an anoxic or anaerobic "core" in the floc to protect methanogens. Also, in some embodiments, the dissolved oxygen in the contact tank and/or stabilization tank may be reduced to decrease the oxygen transfer driving force. This may further help to create anoxic or anaerobic "core" in the floc that mat may protect methanogens.

If a significant portion of methanogens can be recycled in the aerobic contact stabilization process, the capital cost and operational cost of the anaerobic digesters (ADs) could be decreased. For example, the tank volume of the ADs could be decreased to bring the safety factor to a range closer to those ADs in systems not including a methanogen recycle process. With smaller volume, the capital cost of ADs and the mixing energy consumption of AD will both decrease, which will make the hybrid process more cost effective.

In certain embodiments, the biological sorption tank is constantly seeded with nitrification bacteria (such as ammonia oxidizing and nitrite oxidizing biomass) which can survive the anaerobic digester and which can be recycled back to the aerobic environment. For example, nitrification and denitrification can take place in the biological sorption tank. Nitrification may be carried out by two groups of slow-growing autotrophs: ammonium-oxidizing bacteria (AOB), which convert ammonia to nitrite), and nitrite-oxidizing bacteria (NOB), which oxidize nitrite to nitrate. Both are slow growers and strict aerobes. In some embodiments of treatment systems disclosed herein, the nitrification bacteria are introduced to and/or grown in a bio-sorption tank, where they are captured in the floc. Some of the nitrification bacteria will pass out from the bio-sorption tank and be sent to an anaerobic digester.

It was previously believed that the strictly anaerobic conditions of the anaerobic digester would kill the nitrification bacteria. Various aspects of the invention, however, involve treatment systems and subsystems, unit operations, and components thereof that accommodate or increase the survivability of nitrification organisms in anaerobic and anoxic conditions that may occur in some biological nutrient removal processes. Nitrification bacteria which survive the anaerobic digester and are returned to the aerobic part of the treatment process may enhance the nitrification process performance in ways that can lower capital costs, for example by providing for a reduced aerobic treatment vessel size and/or reduced aerobic treatment hydraulic retention time and/or an increased safety factor that would render the nitrification process more stable in response to disruptions to the treatment process. Disruptions to the treatment process encompass deviations from desired operating parameters which may be caused by, for example, interruptions in flow of material through the treatment system or a loss of temperature control at one or more unit operations. The survival rate of nitrification bacteria in an anaerobic digester could be increased by decreasing a hydraulic residence time in the anaerobic digester, which would be accomplished if the anaerobic digester were seeded with recycled methanogens, as described above.

In certain embodiments of the invention, sludge processed through an aerobic treatment and/or an anaerobic digester may also enter the biological sorption tank as a recycle stream to assist in the biological sorption processes. Other processed streams, such as a solids-lean portion or a sludge-lean portion exiting a thickener or clarifier, or a mixed liquor produced from a polishing unit can also be introduced as a recycle stream to the biological sorption tank to assist in the biological sorption process.

In other cases, some configurations can involve chemically facilitated sorption mechanisms.

Some embodiments of the treatment processes of the invention can comprise biologically treating at least a portion of the sludge from the wastewater to be treated. Biological treatment processes can be used to remove and/or biodegrade undesirable materials in the water to be treated, for example, organic pollutants. In certain embodiments, the biological treatment processes can be aerobic biological treatment processes. Depending on the operating conditions, at least a portion of the organic material in the water to be treated or sludge can be oxidized biologically and converted to carbon dioxide and water. In certain embodiments, the reduction in oxygen demand can be as high as about 80-90%. In some embodiments, the a portion of the organic material in the water to be treated or sludge can be reduced only partially by utilizing a less than sufficient aeration rate or a less than sufficient residence time. For example, the reduction in oxygen demand can be less than 70%, less than 50%, less than 30%, or less than 10%. In particularly preferred embodiments, the reduction in oxygen demand can be less than 8%, and more preferably between about 0.08% to about 6%. The water to be treated or sludge can be aerated and mixed for a period of time in, for example, an open tank using air diffusers or aerators. Aerobic biological treatment processes can be performed to provide a dissolved oxygen content of from about 0.2 mg/L to about 5 mg/L, or in some embodiments, from about 1.5 mg/L to about 2.5 mg/L. Retention time in the aerobic treatment tank can be several weeks, or in some embodiments, in a range of from about one to about six hours, and in some embodiments, in a range of from about one to about two hours.

Some embodiments of the treatment systems of the invention can comprise a system capable of breaking down and/or converting various materials into other, more useful, end products. In this system, microorganisms can break down biodegradable material in the absence of oxygen. In this anaerobic digestion process, many organic materials can be processed, such as waste paper, grass clippings, food, sewage, and animal waste. This process has the advantage of providing volume and mass reduction of the sludge being introduced into the system. The process can produce a methane and carbon dioxide rich biogas suitable for energy production. The anaerobic digestion process can comprise bacterial hydrolysis of the sludge being introduced into the digester which can break down insoluble organic polymers such as carbohydrates into sugars, amino acids, and fatty acids. In certain anaerobic digesters, acidogenic bacteria can then convert these intermediate materials into carbonic acids, alcohols, hydrogen, carbon dioxide, ammonia, and organic acids. The compounds converted by the acidogenic bacteria can be further digested by acetogenic microorganisms to produce acetic acid, carbon dioxide, and hydrogen. Methanogenic bacteria or methanogens can then convert the carbon dioxide, hydrogen, ammonia, and organic acids to methane and carbon dioxide. The methane produced from this anaerobic digestion process can be used as an energy source. In some embodiments, a greater concentration of methanogenic bacteria present in the anaerobic digester, or a greater amount of methanogenic bacteria recycled into the anaerobic reactor may result in a greater amount of methane produced.

In certain embodiments, the anaerobic digester is constantly seeded with a consortium of methanogens that reside in the sludge of the treatment process. Certain slow growing anaerobic bacteria such as acetoclastic methanogens and hydrogentrophic methanogens can survive in the aerobic environment of the present invention, and will return to the anaerobic digester allowing the anaerobic digester to be constantly seeded with a nontrivial level of methanogens. This allows for a more reliable treatment process, and allows for a smoother transition back to a steady state if a problem, such as a disruption in flow of material, occurs within the system. The seeding of the anaerobic digester may also, as discussed above, increase an amount of methane produced in the anaerobic digester.

The anaerobic digestion process can be operated at temperatures between 20° C. and 75° C., depending on the types of bacteria utilized during digestion. For example, use of mesophilic bacteria typically requires operating temperatures of between about 20° C. and 45° C., while thermophilic bacteria typically require operating temperatures of between about 50° C. and 75° C. In certain embodiments, the operating temperature may be between about 25° C. and about 35° C. to promote mesophilic activity rather than thermophilic activity. Depending on the other operating parameters, the retention time in an anaerobic digester can be between about seven and about fifty days retention time, and in some embodiments, between about fifteen and about thirty days retention time. In certain embodiments, the reduction in oxygen demand can be about 50%.

In certain embodiments, the sludge that is processed through the anaerobic digester may be recycled back to an inlet of a biological sorption process. Prior to recycling the anaerobically digested sludge into the biological sorption process, the anaerobic sludge may be processed through an aerobic conditioning tank to modify the characteristics of the anaerobically digested sludge. In certain embodiments, the anaerobically digested sludge may also be introduced into the inlet of the aerobic treatment tank to combine with the solids-rich sludge entering the aerobic treatment tank.

Some other embodiments of the treatment system can comprise one or more systems capable of separation processes. The separation processes may separate certain portion of water to be treated or sludge. The separation processes may be capable of removing large materials from wastewater, for example, grit, sand, and gravel. Other separations processes can remove large insoluble material of the water to be treated such as, but not limited to fats, oils, and grease. Other separation systems may take advantage of the settling characteristics of materials, such as settleable solids and floating bodies. Various separations may employ unit operations such as settling tanks, clarifiers, thickeners, and filtration systems.

Some other embodiments of the treatment system can comprise one or more recycle streams that may deliver the output of a first unit operation to the inlet of a second unit operation upstream of the first unit operation. In certain embodiments, the output from an anaerobic digester, an aerobic digester, a sludge thickener, or an aerobic polishing unit can be recycled to the input of the primary clarifier or the biological sorption tank. In other embodiments, the output of an anaerobic digester can be recycled to the input of the aerobic treatment tank.

Some other embodiments of the treatment system can comprise a sequencing batch reactor that is fluidly connected or connectable to a source of wastewater to be treated. The sequencing bioreactor may biologically treat the wastewater by promoting degradation or conversion of biodegradable material, followed by settling and/or decanting the mixed liquor comprising the converted material. The sequencing batch reactor can be fluidly connected or connectable to an anaerobic digester located downstream from the reactor.

FIG. 1 exemplarily illustrates an embodiment in accordance with some aspects of the invention. The treatment system 10 can be fluidly connected or connectable to a source 110 of water to be treated. In accordance with any one of the aforementioned aspects of the invention, treatment system 10 can comprise one or more treatment unit operations, which may include one or more biological treatment processes and one or more solids-reducing and solids-collecting systems or processes.

Source 110 of water to be treated can be a water collection system from any one or more of a municipality, a residential community, and an industrial or a commercial facility, and an upstream pre-treatment system, or combinations thereof. For example, source 110 can be a sedimentation or settling tank receiving water from a sewer system.

Treatment system 10 can comprise one or more biological sorption tanks 112 that promote aggregation of at least a portion of dissolved and suspended solids contained therein. Biological sorption tank 112 can comprise or is configured to contain a biomass of microorganisms that can metabolize biodegradable materials in the water to be treated. For example, biological sorption tank 112 can comprise or is configured to contain a biomass of microorganisms that processes biodegradable materials in the water to be treated through absorption of the biodegradable materials. Biological sorption tank 112 can also comprise or is configured to contain substances or compounds for promotion of adsorption of soluble and insoluble material, such as organic compounds, in the wastewater or water to be treated. The biological sorption process may include aeration and mixing to help maintain the aerobic environment within biological sorption tank 112.

The biological sorption tank 112 produces a first mixed liquor 212 which can be introduced into a separator such as clarifier 114 to produce a solids-lean stream 214 and a solids-rich sludge 216. The solids-lean stream 214 can be processed further, for example, to render the at least partially treated water to be suitable for discharge, in a polishing unit 118, to produce treated product 120, which can be suitable for other uses, and also a second mixed liquor 222, which can be recycled back to source of wastewater 110 or to the sorption tank 112.

Solids-rich sludge 216 can be divided allowing at least a portion of solids-rich sludge 216 to be aerobically treated in an aerobic treatment tank 116 to produce an at least partially aerobically treated stream 224. At least partially aerobically treated stream 224 can be recycled back to source of wastewater to be treated 110, combined therewith, or introduced into other unit operations of the treatment system.

At least a portion of solids-rich sludge 216 can be introduced to an anaerobic digester 122 to produce an anaerobically digested sludge 226. A portion of the anaerobically digested sludge 226 can be disposed of as a waste sludge 130. A portion of the anaerobically digested sludge 226 can also be recycled back to the source of wastewater 110, combined therewith, or introduced into other unit operations of the treatment system.

Optionally, prior to introducing at least a portion of the solids-rich sludge 216 to the anaerobic digester 122, at least a portion of the solids-rich sludge 216 can be introduced to a thickener 124 to produce a thickened sludge 228 and a sludge-lean portion 232. The thickened sludge 228 can then be introduced into the anaerobic digester 122 and the sludge-lean portion 232 can be recycled back to the source of wastewater 110, combined therewith, or introduced into other unit operations of the treatment system.

Any portion between zero and 100 percent of the solids-rich sludge 216 can be introduced into the aerobic treatment tank 116, the remainder being directed to the anaerobic digester. In certain examples, the portion introduced into the thickener 124 or the anaerobic digester 122 can be between about two and about twenty percent of the solids-rich sludge 216. In other examples, the portion of the solids-rich sludge 216 introduced into the thickener 124 or the anaerobic digester 122 can be between about four and about eight percent of the solids-rich sludge 216.

In certain examples, the treated product 120 can be monitored for dissolved solids content, COD/BOD, or other identified characteristics. If the level of any one identified characteristic is not within a desired range or at a desired level, adjustments can be made to the treatment system. For example, if the COD of the treated product deviates from a desired level or acceptable range, a greater or lesser portion of anaerobically treated sludge 226 can be discharged as waste sludge 130.

Figure 2:
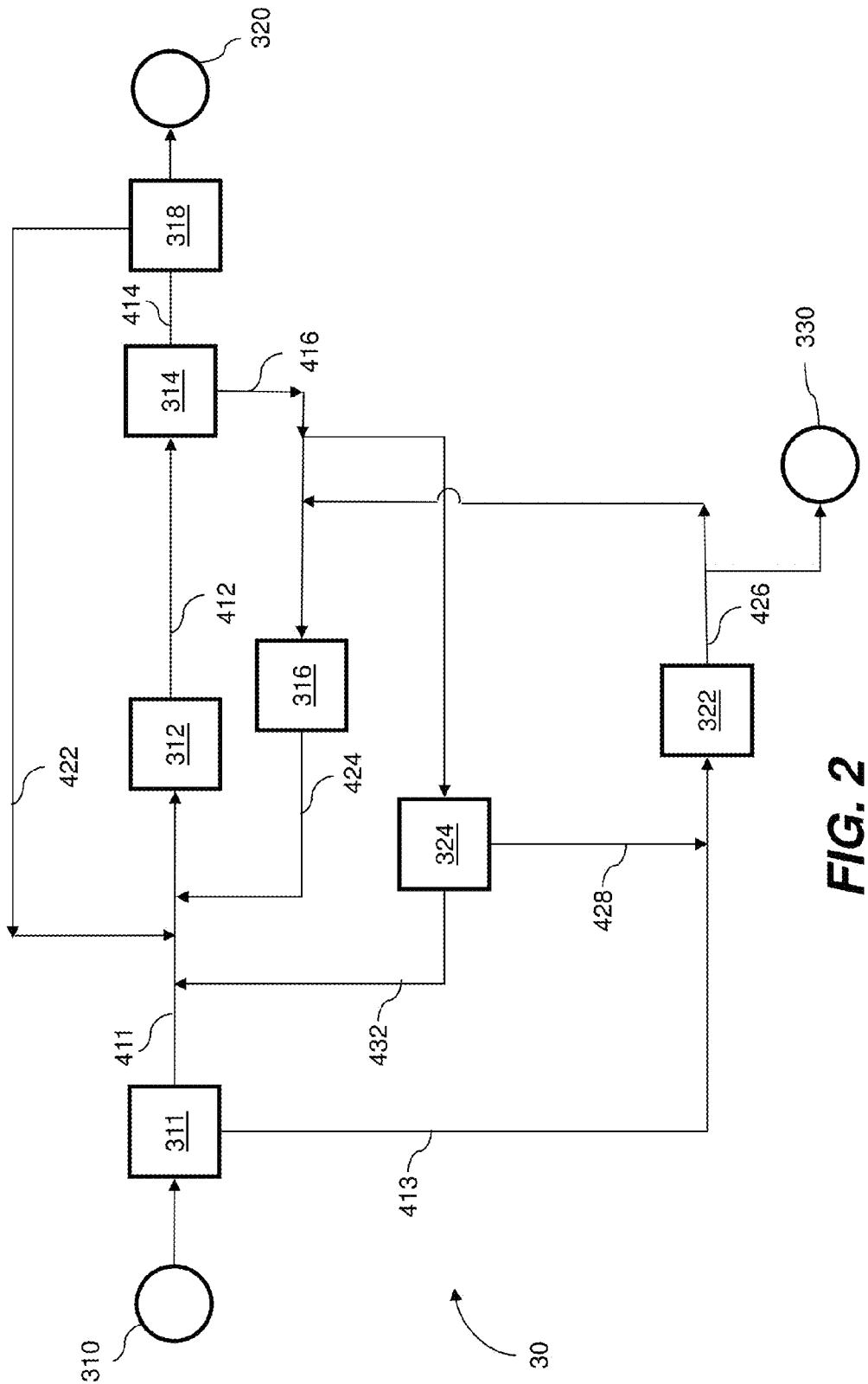
FIG. 2 is a flow diagram illustrating another representative treatment system pertinent to one or more aspects of the invention.

FIG. 2 exemplarily illustrates another embodiment in accordance with some aspects of the invention. A treatment system 30 can be fluidly connected to a source 310 of water to be treated. In accordance with any one of the aforementioned aspects of the invention, the treatment system 30 can comprise one or more treatment unit operations, which may include one or more biological treatment processes and one or more solids-reducing and solids-collecting systems or processes.

The system 30 can have one or more primary separators. For example, a primary clarifier 311 fluidly connected to a source 310 of water to be treated can be utilized to allow settling of at least a portion of components of the source 310 of water to be treated so that solids-lean wastewater 411 can be produced and introduced to a biological sorption tank 312. The primary clarifier 311 can also produce a solids-rich wastewater stream 413 which may be combined with a solids-rich sludge 416 or thickened sludge 428 to be introduced into an anaerobic digester 322, discussed in more detail below. The separators of the system that can be utilized, including but not limited to the primary separator, include filters and dissolve air flotation type units, with or without grit removal.

Solids-lean wastewater 411 is typically introduced into the biological sorption tank 312 to produce a first mixed liquor 412 which can be separated in another separator, such as a clarifier 314, to produce a solids-lean stream 414 and solids-rich sludge 416. The solids-lean stream 414 can be processed further using, for example, a tertiary or post-treatment train with, for example, a membrane bioreactor 318 to produce a treated product 320 which can be suitable for other uses. A second mixed liquor 422 produced from membrane bioreactor 318 can be recycled back to be combined with the solids-lean wastewater 411, or introduced into other unit operations of the treatment system.

The solids-rich stream 416 can be divided, allowing at least a portion of the solids-rich stream 416 to be aerobically treated in aerobic treatment tank 316 to produce an at least partially aerobically treated stream 424. The at least partially aerobically treated stream 424 can be recycled back to be combined with solids-lean wastewater 411.

At least a portion of the solids-rich sludge 416 can be introduced to the anaerobic digester 322 to produce anaerobically digested sludge 426. A portion of the anaerobically digested sludge 426 can be disposed of as waste sludge 330. A portion of the anaerobically digested sludge 426 can also be recycled back to be combined with the solids-ridge sludge 416 to be introduced to the aerobic treatment tank 316.

Prior to introducing at least a portion of the solids-rich sludge 416 to the anaerobic digester 322, at least a portion of the solids-rich sludge 416 can be introduced to a thickener 324 to produce a thickened sludge 428 and a sludge-lean portion 432. The thickened sludge 428 can then be introduced into the anaerobic digester 322 and the sludge-lean portion 432 can be recycled back to be combined with the solids-lean wastewater 411.

Any portion between zero and including 100 percent of the solids-rich sludge 416 can be introduced into the aerobic treatment tank 316, the remainder being directed to the anaerobic digester. In certain examples, the portion introduced into the thickener 324 or the anaerobic digester 322 can be between about 2 and about 20 percent of the solids-rich sludge 416. In some cases, however, a portion of the solids-rich sludge 416 can be discharged as waste sludge 330.

In certain examples, treated product 320 can be monitored for dissolved solids content, COD/BOD, or other identified characteristics. If the level of any one identified characteristic is not within a desired range or at a desired level, adjustments can be made to the treatment system. For example, if the COD of the treated product 330 differs from a desired level, a greater or lesser portion of anaerobically treated sludge 426 can be discharged as waste sludge 330.

One or more nitrification units can be utilized. For example, a biofilm nitrification unit, which can be, for example, a moving bed bioreactor, can be disposed to receive at least a portion of the solids-lean stream from the separator 314. Effluent from the nitrification unit can be mixed with sludge from a clarifier to effect at least partial de-nitrification. Re-aeration can then be performed to remove at least a portion of nitrogen as a gas. Such variations can reduce or eliminate the use of external carbon sources.

Figure 3:
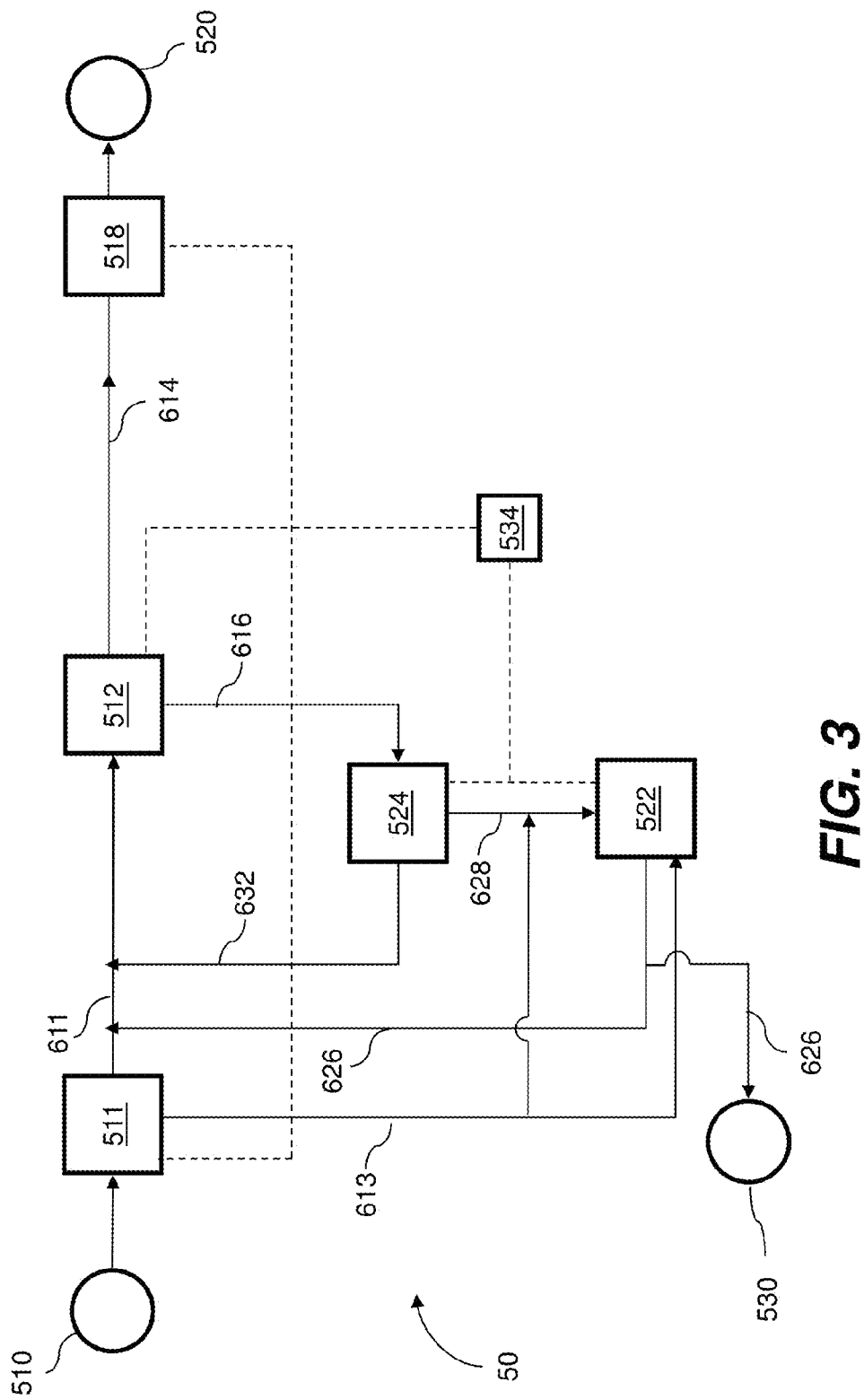
FIG. 3 is a flow diagram illustrating another representative treatment system pertinent to one or more aspects of the invention.
Figure 4:
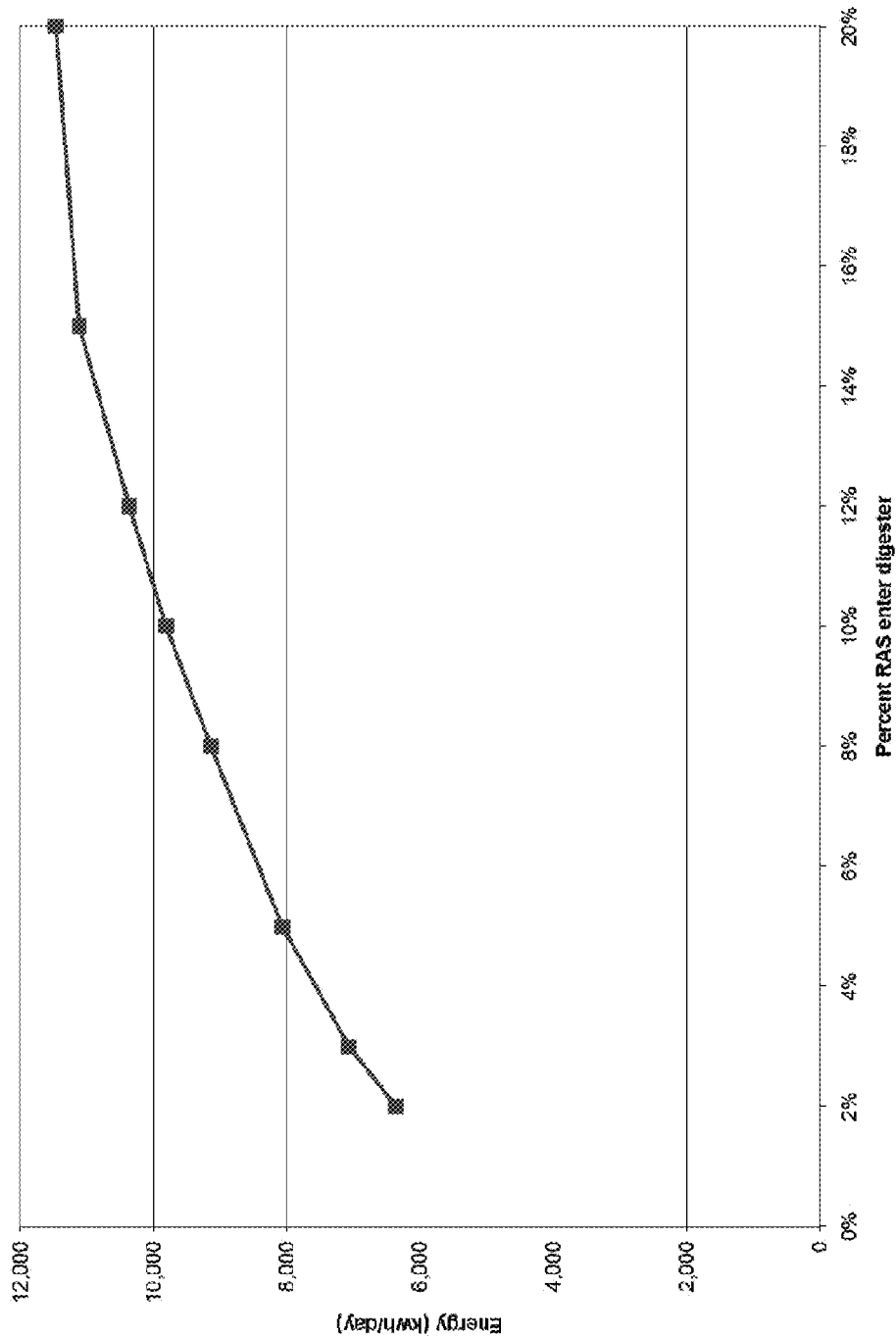
FIG. 4 is a graph of energy gain from methane production relative to the amount of activated sludge (percent) entering the anaerobic digester for a treatment system pertinent to one or more aspects of the invention.

FIG. 3 exemplarily illustrates another embodiment in accordance with some aspects of the invention. The treatment system 50 can be fluidly connected or connectable to a source 510 of water to be treated. In accordance with any one of the aforementioned aspects of the invention, the treatment system 50 can comprise one or more treatment unit operations, which may include one or more biological treatment processes and one or more solids-reducing and solids-collecting systems or processes.

An optional primary clarifier 511 can be fluidly connected or connectable to the source 510 of water to be treated. The primary clarifier 511 typically produces solids-lean wastewater 611 and solids-rich wastewater 613. At least a portion of the solids-lean wastewater 611 can be introduced into one or more sequencing batch reactors 512, wherein one or more treatment steps can be performed. For example, the sequencing batch reactor 512 can operate in one or more stages to treat the water or wastewater to be treated in a desired manner.

The sequencing batch reactor 512 can be operated or configured to receive the water to be treated from the source 510 in a first stage, which is typically referred to as a FILL stage. The FILL stage can be performed in aerated, anoxic or a combination of aerated and anoxic conditions. In some embodiments, the influent water to be treated is introduced into a basin (not shown) of the sequencing batch reactor 512 through one or more influent distribution manifolds. The basin can be sized to accommodate or provide a desired hydraulic retention time and to accommodate the volume and incoming flow rate of water to be treated.

When the basin of the sequencing batch reactor 512 is at least partially filled or thereafter, the sequencing batch reactor 512 can be operated to favor bacterial metabolic activity that converts or treats at least a portion of biodegradable material in a second stage, which is typically referred to as a REACT stage. The REACT stage, which can be performed in one or more discrete steps or stages, can also be operated to perform other processes, such as biological sorption processes. In some cases, however, biological sorption may have been or be completed in the FILL stage. The REACT stage can be performed under aerobic conditions by introducing oxygen, preferably as air, from one or more air sources (not shown) through one or more aeration manifolds that are typically submerged in the liquor. The one or more REACT stages, which can be performed, for example, after the FILL stage and/or after other stages, such as after a DECANT stage, can be performed for a period sufficient to promote at least partial biodegradation or at least conversion, such as by biological sorption, for a period sufficient to promote adsorption and absorption of suspended particles and soluble material. For example, aeration can be performed through an aeration system (not shown) in the basin to create aerobic conditions to facilitate oxidation of ammonia to nitrate by nitrification bacteria. An air source preferably further provides air released through the aeration manifold of the aeration system as air bubbles in amounts sufficient to induce mixing of the liquor within the basin of the sequencing batch reactor 512. Alternatively, or in conjunction with the aeration induced phenomena, mixing can also be effected by a mixer, such as an impeller, which may be advantageous when mixing is desired without introducing air into the liquor. The one or more REACT stages is not limited to the use of air and any source of oxygen that provides a target dissolved oxygen concentration in the liquor can be utilized for each or any of the one or more of REACT stages. The one or more REACT stages can include an aeration stage and a separate re-aeration stage that occurs at some period after the aeration stage.

A SETTLE stage typically follows the at least one aeration, biological sorption and/or mixing stages to create quiescent conditions that allow at least a portion of the biomass in the liquor to settle to form a supernatant, a solids-lean liquor, and a solids-rich or sludge layer below the supernatant. The duration of the SETTLE stage may vary and depend on several factors including, but not limited to, the temperature of the mixed liquor and the nature and composition of the biomass.

The solids-lean liquor 614 can then be withdrawn or decanted in a DECANT stage and can be further treated in, for example, a polishing unit 518. At least a portion of the settled sludge can be withdrawn through a manifold (not shown) and directed to further treatment by various biological processes or disinfection treatments. At least a portion of the sludge layers, as a solids-rich stream 616, can be withdrawn and introduced to various other biological processes, such as by aerobic treatment or anaerobic digestion in an anaerobic digester 522 (discussed below). Withdrawal or decanting of the treated effluent or solids-lean liquor 614 can be performed utilizing a decanting system (not shown) in the basin, which typically has a floating solids-excluding decanter or skimmer (not shown) that may be constructed to have apertures that do not or at least reduce the likelihood of turbulent conditions that disturb the settled solids-rich layer during withdrawal of the solids-lean supernatant.

An IDLE stage may be optionally included during instances the sequencing batch reactor 512 waits to receive influent to be treated.

In some instances, any of the functions or activities can be performed in more than one stage. For example, withdrawing solids-rich sludge stream 616 can be performed during the SETTLE stage as well as during the IDLE stage. Thus, the invention can be practiced in other than the sequence of stages presented herein. Further, any one or more stages can be omitted or combined. For example, in some cases, the REACT stage can be performed during the FILL stage thereby allowing combining or extending the duration of the REACT stage.

The OMNIFLOW® sequencing batch reactor system from Siemens Water Technologies Corp. is an example of a commercially available treatment system that can comprise the biological train used to effect biological nutrient removal in accordance with some aspects of the invention. Further aspects of the invention may utilize the systems and methods disclosed by any of Calltharp and Calltharp et al. in U.S. Pat. Nos. 4,775,467, 5,021,161, and 6,884,354, each of which is incorporated herein by reference for all purposes. Indeed, some advantageous features pertaining to constant level sequencing batch reactor systems may be utilized. Such constant level biological conversion systems may advantageously provide even further improved process control of the overall treatment system by reducing any operational fluctuations or variations during downstream filtration operations. Further advantages can, in some cases, reduce the size of any equalization tanks, or even eliminate the need for such unit operations, which reduces the overall treatment system footprint and capital requirements.

Sequencing the various stages of the treatment system may be facilitated by utilizing one or more controllers 534 operatively coupled to the one or more sequencing batch reactors 512, the primary clarifier 511, the polishing unit 518, the thickening unit 524, and the anaerobic digester 522. One or more sensors (not shown) may be utilized in or with the one or more unit operations, such as the sequencing batch reactor 512, to provide an indication or characteristic of the state or condition of processes during the treatment processes. For example, one or more level indicators (not shown) can be disposed in the basin of the sequencing batch reactor 512 and configured to transmit to one or more controllers 534 a representation of the liquid level contained within the basin. The controller 534 can, based on the signals received from the one or more sensors, generate and send control signals to any of the components of the primary clarifier 511, the polishing unit 518, the thickening unit 524, and the anaerobic digester 522, or other components or subsystems of the treatment system 50. For example, at a high liquid level condition in the basin, as measured by the one or more level indicators, the controller 534 can generate and transmit a control signal to an actuator that closes an inlet valve (not shown) fluidly isolating the source 510 and the basin of the sequencing batch reactor 512. The controller 534 may further generate control signals that initiate and terminate the stages of the one or more sequencing batch reactors 512. For example, the controller 534 can generate and transmit a control signal to energize or de-energize the air source for the sequencing batch reactor 512.

The solids-lean stream 614 decanted from the sequencing batch reactor 512 can be further treated in a polishing treatment system. For example, one or more configurations of the treatment systems as disclosed herein can comprise one or more polishing units 518 using treatment processes including, but not limited to biological nitrification/denitrification and phosphorus removal, chemical oxidation, chemical precipitation, and separation systems including dissolved inorganic solids removal by ion exchange, ultrafiltration, reverse osmosis, ultraviolet radiation, or electrodialysis. Treated product 520 from unit 518 can be delivered to storage, to a secondary use, or discharged to the environment.

The solids-rich sludge 616 can be further processed in the anaerobic digester 522 to produce an anaerobically digested stream 626.

During operation of the treatment system, one or more target characteristics can be utilized to regulate one or more operating parameters of any of the unit operations of the system.

A portion of the anaerobically digested stream 626 can be recycled to be combined with the source of wastewater to be treated 510 or the solids-lean wastewater 611. A portion of the anaerobically digested stream 626 can also be discarded from the system 50 as waste sludge 530.

Optionally, prior to introducing at least a portion of the solids-rich sludge 616 to the anaerobic digester 522, at least a portion of the solids-rich sludge 616 can be introduced to a thickener 524 to produce a thickened sludge 628 and a sludge lean portion 632. The thickened sludge 628 can then be introduced into the anaerobic digester 522 and the sludge-lean portion 632 can be recycled back to the source of wastewater 510 and/or solids-lean wastewater 611, combined therewith, or introduced into other unit operations of the treatment system.

Figure 10:
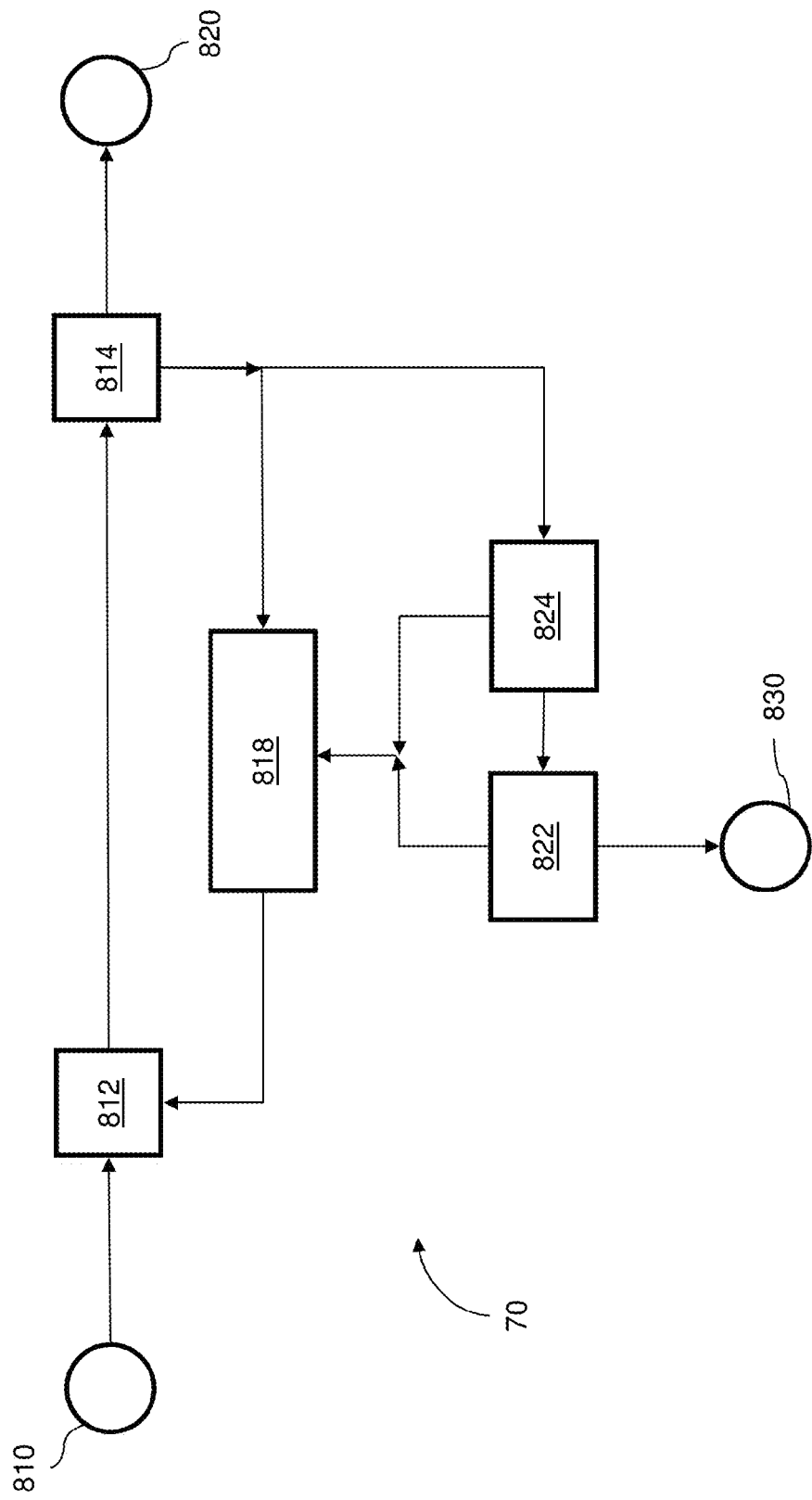
FIG. 10 is a flow diagram illustrating another representative treatment system pertinent to one or more aspects of the invention.

Another embodiment of a system configured to circulate microorganisms, for example, methanogenic bacteria and/or nitrification bacteria, is schematically illustrated in FIG. 10. The system 70 includes a wastewater inlet 810 which feeds a sequencing batch reactor 812, which may include, for example, a biological sorption tank. A clarifier 814, or other form of separator, such as a hydrocyclone or settling tank, is typically located downstream of the sequencing batch reactor 812. The clarifier 814 is typically configured to produce a solids-lean effluent to an effluent output 820, which may be further processed by, for example, one or more polishing operations to produce water that may be used for potable or non-potable purposes. A sludge thickener 824 is located downstream of a solids-rich outlet of the clarifier 814. Also fluidly connected to the solids-rich outlet of the clarifier 814 is a stabilization tank 818, which in some embodiments may comprise an aerobic treatment tank. In some embodiments, a greater amount of the solids-rich output from the clarifier 814 is directed to the stabilization tank 818 than to the sludge thickener 824. In some embodiments about 80% or more, for example greater than about 90% or greater than about 95% of the solids-rich output from the clarifier 814 is directed to the stabilization tank 818. An anaerobic digester 822 is located downstream of a solids-rich sludge output of the sludge thickener 824. A sludge-lean output of the sludge thickener 824 may direct a solids-lean fluid to the stabilization tank 818. The anaerobic digester 822 produces anaerobically digested sludge, at least a portion of which may be directed to the stabilization tank 818. A portion of the digested sludge from the anaerobic digester may also be directed to a waste sludge outlet 830 for further treatment or disposal. An outlet of the stabilization tank 818 feeds back into the sequencing batch reactor 812.

A precipitation rector may be included in any of the systems disclosed herein to precipitate out one or more desired compounds for example, phosphorous and/or nitrogen from one or more streams from the system. One example of a system utilizing a precipitation reactor is the embodiment of an activated sludge treatment system 80 illustrated in FIG. 11. Wastewater from a wastewater inlet 910 is directed to a first treatment tank 911, which may comprise, for example, an anaerobic digestion vessel. Anaerobically treated wastewater is directed from an outlet of the treatment tank 911 to an inlet of an aerobic treatment tank 912. The aerobically treated wastewater is then conveyed from the aerobic treatment tank 912 to a first clarifier 914. The clarifier 914 separates the aerobically treated wastewater into a solids-lean portion which is directed to an outlet 920 from which it may be directed to further downstream processes for further treatment. A portion of a solids-rich output from the clarifier 914 may be recycled back to the treatment tank 911, and a second portion of the solids-rich output from the clarifier 914 may be directed to a second clarifier 915. A portion of a solids-lean output stream from the second clarifier 915 may be recycled back to the treatment tank 911, while a second portion of the solids-lean output stream from the second clarifier 915 is directed to a separator 926, which may comprise a membrane filtration unit. The portion of the solids-lean output stream from the second clarifier 915 directed to the separator 926 may be utilized to help wash precipitates and/or retained sludge from the separator 926. In some embodiments, wherein the separator 926 comprises a membrane filter, at least a portion of the solids-lean output stream from the clarifier 915 may be used to backwash a membrane of the membrane filter. The backwash could be initiated based on a measurement of a transmembrane pressure across the membrane or on a time basis.

A solids-rich output stream from the clarifier 915 is directed to an anaerobic digester 922. Anaerobically digested sludge output from the anaerobic digester 922 is directed to the separator 926. The separator 926 produces a solids-rich output stream, a portion of which may be directed to a waste sludge outlet 930, and a second portion of which may be recycled back to the treatment tank 911. A solids-lean output stream from the separator 926 is directed to a mineral extraction process, for example to a reactive precipitation reactor 940 such as the CONTRAFAST® High-Rate Sludge Thickener Clarifier, available from Siemens Water Technology Corp.

The precipitation reactor may be utilized to precipitate out phosphorous and/or nitrogen containing compounds, for example struvite ($MgNH_4PO_4.6H_2O$), by the addition of precipitating agents, such as a magnesium salt (e.g., magnesium chloride) in the precipitation reactor in accordance with the reaction below.

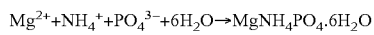

$$Mg^{2+}+NH_4^{+}+PO_4^{3-}+6H_2O \rightarrow MgNH_4PO_4.6H_2O$$

In some applications, it would be beneficial to utilize a precipitation agent such as a magnesium salt to precipitate out the phosphorous and nitrogen in the precipitation reactor rather than, for example, aluminum or iron. The precipitation agent may be supplied from a source of precipitation agent 950 which in some embodiments may be external to the precipitation reactor 940, and in other embodiments may be included within the precipitation reactor 940. Struvite may be used as a fertilizer, and thus may be an agriculturally useful precipitate. Precipitating phosphorous in the precipitation vessel using aluminum may produce an aluminum phosphate precipitate, which is unsuitable for use as a fertilizer, and thus would not be as agriculturally valuable as struvite. Similarly, precipitating phosphorous with iron may produce iron phosphate, which is also unsuitable for use as a fertilizer. In other embodiments, one or both of aluminum phosphate and/or iron phosphate may be precipitated from a solids-lean output stream from the separator 926 for use in other applications.

A pH adjuster, such as ammonium hydroxide, magnesium hydroxide, another caustic, or an acid may also be added to the solids-lean output stream in the precipitation reactor to control an $Mg^{2+}$ concentration and/or pH to within desired ranges. The pH adjuster may be supplied from a source of pH adjuster 955 which in some embodiments may be external to the precipitation reactor 940, and in other embodiments may be included within the precipitation reactor 940. In some embodiments the precipitation reaction may take place at a temperature in a range of from about 20° C. to about 40° C., or in some embodiments from about 25° C. to about 35° C. at a pH of between about 6 and about 12, in some embodiments between about 7.5 and about 11, and in some embodiments, between about 8.5 and about 10. In some embodiments, after precipitation of struvite the phosphorous-lean liquid may be recycled back to the activated sludge treatment system. In some embodiments the phosphorous-lean liquid may be pH adjusted to a pH of, for example, about 7 by the introduction of a pH adjuster, for example, an acid or a base from a source of pH adjuster 945 prior to being recycled back to the activated sludge treatment system. In other embodiments, the phosphorous-lean liquid recycled back to the activated sludge treatment system may be allowed to maintain an alkaline pH, or be pH adjusted to an alkaline pH. The alkalinity may in some embodiments assist in a nitrification process performed in the activated sludge treatment system.

The amount of precipitating agent (e.g., magnesium chloride) may be determined based on an analysis of the concentration of phosphorous and/or nitrogen in the solids-lean stream directed into the precipitation reactor. In some embodiments, the precipitating agent may be added in a stoichiometric ratio to phosphorous or nitrogen present in the solids-lean stream, e.g., one molecule of magnesium for each molecule of phosphorous or nitrogen in the solids-lean stream. In other embodiments, a slightly higher, for example about 10% higher, than stoichiometric ratio of precipitation agent to phosphorous or nitrogen in the solids-lean stream may be added. In other embodiments, less than a stoichiometric ratio may be added.

The various systems and techniques disclosed herein can significantly reduce energy consumption, or even provide energy, and also reduce the amount of sludge produced during wastewater treatment.

Further, a controller can facilitate or regulate the operating parameters of the treatment system. For example, a controller may be configured to adjust a rate of recycle of the one or more streams, a duration of one or more residence times, a temperature, and/or a dissolved oxygen concentration in a fluid in any of the unit operations of the treatment system.

The controller may respond to signals from timers (not shown) and/or sensors (not shown) positioned at any particular location within the treatment system. For example, a sensor positioned in the anaerobic reactor may indicate less than optimum conditions therein. Further, the one or more sensors may monitor one or more operational parameters such as pressure, temperature, one or more characteristics of the liquor, and/or one or more characteristics of any of the effluent streams. Similarly, a sensor disposed in or otherwise positioned with any of the recycle streams can provide an indication of a flow rate thereof at, below, or above a desired or target rate. The controller may then respond by generating a control signal causing an increase or decrease in the recycle flow rate. The target recycle flow rate of the mixed liquor from the polishing sub-train may be dependent on an operating parameter of the treatment system. For example, the target recycle flow rate may be a multiple of, e.g., at least two times, the influent flow rate of the incoming water to be treated. In some cases, the solids discharge rate may be adjusted to achieve one or more target characteristics of the treated water. Other control schemes may involve proportionally varying the relative flow rates between the anaerobic digester and the aerobic treatment tank based at least partially on the oxygen demand of the influent or water to be treated.

The system and controller of one or more embodiments of the invention provide a versatile unit having multiple modes of operation, which can respond to multiple inputs to increase the efficiency of the wastewater treatment system.

The controller may be implemented using one or more computer systems which may be, for example, a general-purpose computer such as those based on an Intel PENTIUM®-type processor, a Motorola PowerPC® processor, a Hewlett-Packard PA-RISC® processor, a Sun UltraSPARC® processor, or any other type of processor or combination thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory may be used for storing programs and data during operation of the system. For example, the memory may be used for storing historical data relating to the parameters over a period of time, as well as operating data. Software, including programming code that implements embodiments of the invention, can be stored on a computer readable and/or writeable nonvolatile recording medium, and then copied into memory wherein it can then be executed by one or more processors. Such programming code may be written in any of a plurality of programming languages, for example, Java, Visual Basic, C, C#, or C++, Fortran, Pascal, Eiffel, Basic, or any of a variety of combinations thereof.

Components of the computer system may be coupled by one or more interconnection mechanisms, which may include one or more busses, e.g., between components that are integrated within a same device, and/or a network, e.g., between components that reside on separate discrete devices. The interconnection mechanism may enable communications, e.g., data and/or instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that can connect the computer system to a communication network, in addition or as an alternative to the network that may be formed by one or more of the components of the system.

According to one or more embodiments of the invention, the one or more input devices may include sensors for measuring any one or more parameters of any of the systems disclosed herein and/or components thereof. Alternatively, the sensors, the metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller can include one or more computer storage media such as readable and/or writeable nonvolatile recording medium in which signals can be stored that define a program to be executed by one or more processors. The medium may, for example, be a disk or flash memory. In typical operation, the one or more processors can cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by the controller 534 can be performed in separate computers, which can be in communication with one another through one or more networks.

In some particular embodiments, the controller can be configured to generate a plurality of output signals that initiates or terminates one or more cycles or stages of the sequencing batch reactor. For example, the controller can generate an output signal that actuates one or more inlet valves that fluidly connects one or more basins of the at least one sequencing batch reactor to the source of water to be treated. The controller can then generate a second output signal that preferably, but not necessarily, closes the valve and, activates an aeration system of at least one sequencing batch reactor to provide an oxygen source to achieve or maintain a target dissolved oxygen level of, for example, between about 0.5 and about 2 mg/L. The controller can thus be configured to facilitate biological sorption phenomena that aggregates at least a portion of dissolved and suspended solids. The controller can then generate a third output signal that promotes quiescent conditions in at least one of the basins that provide settling of at least a portion of the settleable components. In some cases, quiescent conditions can be effected by terminating output signals and the third output signal can be generated by the controller to promote withdrawal of any of the supernatant, e.g., by decanting, or solids-rich portions in the basin, after settling. Another output signal can then be generated, e.g., a fifth output signal, that reactivates the aeration system. The controller can further generate a sixth output signal that activates, and a seventh output signal that deactivates an aeration system of at least one aerobic treatment tank to provide an oxygen source to achieve or maintain a target dissolved oxygen level of, for example, between about 0.5 and about 2 mg/L.

Figure 20:
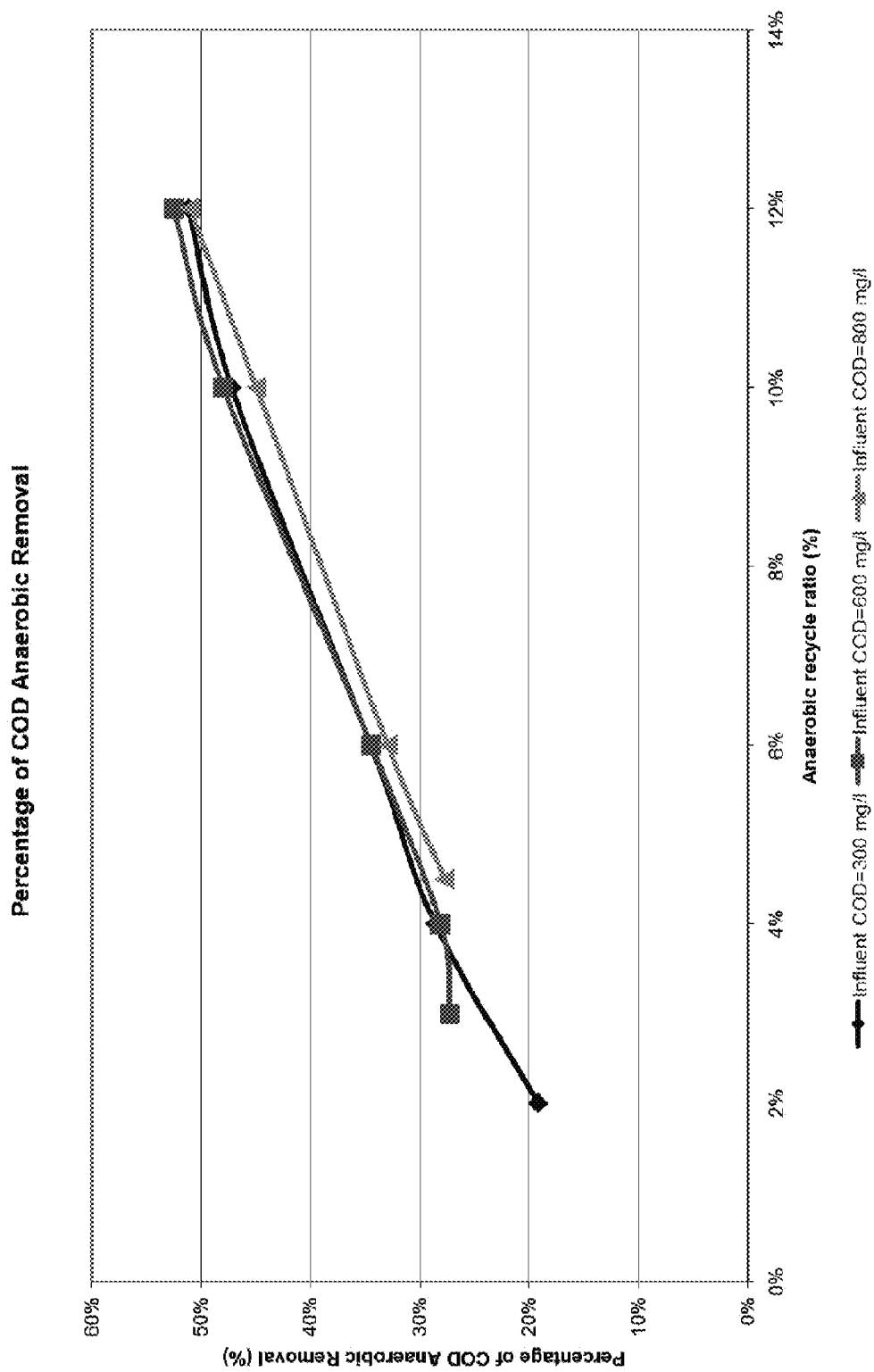
FIG. 20 illustrates a percentage of total wastewater influent chemical oxygen demand removed in an anaerobic digester in a simulation of a system in accordance with the present invention.

Many municipal wastewater treatment plants experience diurnal influent variation such as the example shown in FIG. 20. In some embodiments, a bio-sorption operation of a wastewater treatment system may become less stable, for example, capturing more or less COD in influent wastewater, as loading conditions become more dynamic. If bio-sorption fails to capture a sufficient amount of the COD, this may overload the capacity of a downstream anaerobic digester to efficiently process the COD. To facilitate enhancing the reliability of the performance of the bio-sorption process a control system that uses on-line instruments to control the bio-sorption may be utilized.

A first level of control may include controlling a ratio of wastewater flow to bio-sorption media in the bio-sorption operation. The sludge inventory in the anaerobic digester is some systems may be greater than the sludge inventory in one or more other unit operations, so matching the anaerobic sludge recycle flow rate with the wastewater flow rate may not present a great difficulty. Anaerobic sludge, however, is preferably conditioned an aerobic environment with the help of some aerobic sludge to become a re-useable bio-sorption media recycled to the bio-sorption operation. The inventory of aerobic sludge is often limited because both contact tank and stabilization tank are typically smaller than the anaerobic digester. As such, one control mechanism to facilitate stability of the operation of the treatment system may include decreasing the amount of aerobic sludge flowed from the aerobic stabilization tank 818 to the bio-sorption tank 812 prior to receiving an increased inflow of wastewater to be treated, and increasing mixed liquor suspended solids (MLSS) in the aerobic stabilization tank 818 to increase the aerobic sludge inventory. During periods of an increased influent flow of wastewater to be treated, a stand-by aerobic stabilization tank may be utilized to increase the aerobic sludge inventory. To maintain the duty and stand-by aerobic sludge stabilization tank both in good working condition (for example, to maintain a sufficient population of live aerobic bacteria to aerobically treat MLSS or sludge introduced into the tanks at a desired rate), they may be switched a few times a day. At peak COD loading conditions, both aerobic stabilization tanks could be utilized.

Feed back control may be utilized in some embodiments of the control system. An online COD or total organic carbon (TOC) meter may be utilized to measure the COD or TOC of solids-lean effluent leaving the first clarifier 814. When the effluent COD or TOC is at or above a threshold level at which the treatment system would efficiently treat the influent wastewater, the ratio of an amount of aerobically treated solids-rich sludge output from the clarifier 814 to an amount of anaerobically treated sludge output from the anaerobic digester (an "aerobic/anaerobic sludge ratio") directed into the stabilization tank 818 may be increased. This may be facilitated by for example, utilizing a controller, such as controller 534 of FIG. 3, to actuate one or more valves to adjust the relative amounts of the solids-rich output of the clarifier 814 directed to the anaerobic digester 822 and to the stabilization tank 818 to a desired ratio. Additionally or alternatively, use of aerobic sludge stored in the stand-by aerobic stabilization tank may be initiated to introduce aerobically treated sludge into the treatment system, for example into the stabilization tank 818 or the sequencing batch reactor 812. When effluent COD or TOC is at a level such that the treatment system could efficiently treat wastewater having a higher COD or TOC level, the aerobic/anaerobic sludge ratio may be decreased and the duty and stand by aerobic stabilization tanks may be switched.

Without being bound to a particular theory, it is believed that bacteria species might not be as important as floc morphology with respect to the effectiveness of a bio-sorption media in adsorbing and absorbing MLSS. The floc morphology of anaerobically digested sludge can be modified or repaired in an aerobic environment with the help of aerobic bacteria to make anaerobic sludge a more effective bio-sorption media. The repairing kinetics may have good correlation with aerobic activity of the aerobic/anaerobic sludge mixture. Aerobic activity can be measured as specific oxidation utilization rate (SOUR) or accumulation of SOUR. For continuously stirred tank reactors reactors, accumulation of SOUR is calculated as SOUR*Contact_time. SOUR may me measured by using a dissolved oxygen probe to measure a change in dissolved oxygen in a tank of interest over time.

On some systems, the bio-sorption characteristic of sludge media and the SOUR in the contact tank and stabilization tank may be correlated. For example, when anaerobically digested sludge is recycled back to the stabilization tank, there are two sludge streams entering the aerobic stabilization tank: solids-rich sludge from the clarifier 814 and anaerobically digested sludge from the anaerobic digester. If the COD of the solids-lean effluent from the clarifier 814 is low, for example less than about 100 mg/L, in accordance with the above described system, the soluble COD carried in the solids-rich sludge output from the clarifier 814 would also be low, for example less than about 100 mg/L. A stable anaerobically digested sludge COD should also give a low (less than about 100 mg/L) COD in a recycled sludge produced in the contact stabilization tank 818. In some systems, the anaerobic sludge recycle stream has a very low flow rate, typically less than 1% of the average daily flow input to the treatment system. Therefore, soluble COD of anaerobically digested sludge entering the stabilization tank should be low (less than about 100 mg/L). As such, the SOUR in the stabilization tank could become an indication of the aerobic activity of the aerobic/anaerobic sludge mixture that is not affected by a consistently low soluble COD present in the solids-rich output of the clarifier 814. If a sudden drop, for example a drop of about 30% or more within one or two hours, of SOUR in the stabilization tank is observed without a significant change of the aerobic/anaerobically digested sludge ratio, it may indicate an unhealthy aerobic activity or inefficient anaerobically digested sludge repairing, which may lead to poor bio-sorption of COD in the contact tank. Upon this occurrence, the aerobic sludge stabilization tank may be put into a repairing stand-by stage and the stand-by aerobic sludge stabilization tank may utilized to provide additional aerobic sludge.

Further aspects of the invention can involve or be directed to computer-readable media, or providing computer-readable media, that facilitates the various features of the treatment approaches described herein.

For example, the computer-readable media can comprise instructions implementable on a computer system or a controller that performs a method of treating wastewater in a wastewater treatment system, the method comprising one or more steps of providing a wastewater to be treated, promoting biological sorption of the wastewater to be treated to produce a first mixed liquor, producing a solids-rich sludge and a solids-lean portion from the mixed liquor, aerobically treating a first portion of the solids-rich sludge to produce an at least partially aerobically treated sludge, anaerobically digesting a second portion of the solids-rich sludge to produce an anaerobically digested sludge, combining at least a portion of the at least partially aerobically treated sludge with the wastewater to be treated, and combining at least a portion of the anaerobically digested sludge with the wastewater to be treated. The method can further comprise thickening the solids-rich sludge to produce a thickened sludge and a sludge-lean portion and combining at least a portion of the sludge-lean portion with the wastewater to be treated, wherein anaerobically digesting the second portion of the solids-rich sludge comprises anaerobically digesting the thickened sludge to produce at least a portion of the anaerobically digested sludge. The method can further comprise aerobically treating at least a portion of the solids-lean portion to produce a treated product and a second mixed liquor. The method can further comprise combining at least a portion of the second mixed liquor with the wastewater to be treated. The method can further comprise aerobically treating at least a portion of the anaerobically digested sludge with the first portion of the solids-rich sludge to produce the at least partially aerobically treated sludge. The method can further comprise producing a solids-rich wastewater and a solids-lean wastewater from the wastewater to be treated, and wherein promoting biological sorption of at least a portion of the wastewater to be treated comprises promoting biological sorption of the solids-lean wastewater to produce the first mixed liquor. The method can further comprise introducing the solids-lean portion into a membrane bioreactor. The method can further comprise separating the wastewater to be treated into a solids-lean wastewater and a solids-rich wastewater, promoting biological sorption of the solids-lean wastewater to produce at least a portion of the first mixed liquor; and anaerobically digesting the solids-rich wastewater with the second portion of the solids-rich sludge to produce the anaerobically digested sludge and an off-gas comprising methane.

In other configurations, the computer-readable media can comprise instructions implementable on a computer system or a controller that performs a method of treating wastewater in a wastewater treatment system, the method having one or more steps for treating wastewater comprising providing a wastewater stream to be treated, introducing the wastewater stream into a biological sorption tank to produce a first mixed liquor stream, introducing the mixed liquor stream into a separator to produce a solids-rich stream and a solids-lean stream, introducing at least a portion of the solids-rich stream into an aerobic treating tank to produce an at least partially aerobically treated sludge stream, introducing at least a portion of the solids-rich stream into an anaerobic digester to produce an anaerobically digested sludge stream, introducing at least a portion of the at least partially aerobically treated sludge stream into the biological sorption tank, and introducing at least a portion of the anaerobically digested sludge stream into the biological sorption tank. The method can further comprise, in some cases, introducing at least a portion of the solids-rich stream into a sludge thickener to produce a thickened sludge stream and a sludge-lean stream. In some cases, introducing at least a portion of the solids-rich stream into an anaerobic digester comprises introducing the thickened sludge stream into the anaerobic digester to produce the anaerobically digested sludge stream. In still further cases, introducing the wastewater stream into the biological sorption tank comprises introducing the wastewater stream to be treated into a primary separator to produce a solids-rich wastewater stream and a solids-lean wastewater stream, and introducing the solids-lean wastewater stream into the biological sorption tank to produce the first mixed liquor stream. The method can further comprise introducing the solids-rich wastewater stream into the anaerobic digester to produce at least a portion of the anaerobically digested sludge stream. The method can further comprise introducing at least a portion of the anaerobically digested sludge stream into the aerobic treating tank to produce at least a portion of the at least partially aerobically treated sludge stream. The method can further comprise introducing the solids-lean stream from the separator into a membrane bioreactor. The method can further comprise introducing at least a portion of the solids-lean stream into an aerobic polishing system to produce a treated stream and a second mixed liquor stream, and introducing at least a portion of the second mixed liquor stream into the biological sorption tank. The method can further comprise collecting an off-gas from the anaerobic digester, the off-gas comprising methane.

In other configurations, the computer-readable media can comprise instructions implementable on a computer system or a controller that performs a method of treating wastewater in a wastewater treatment system, the method having one or more steps for treating wastewater comprising providing wastewater comprising dissolved and suspended solids, promoting aggregation of at least a portion of the dissolved and suspended solids to produce a first mixed liquor, separating the first mixed liquor into a first solids-lean portion and a first solids-rich sludge, anaerobically digesting a first portion of the first solids-rich sludge to produce an anaerobically digested sludge, separating the anaerobically digested sludge into a second solids-lean portion and a second solids-rich sludge, precipitating one of a phosphorous containing compound and a nitrogen containing compound from the second solids-lean portion, and combining a portion of the second solids-rich sludge with the wastewater. The method can further comprise aerobically treating a second portion of the first solids-rich sludge to produce an at least partially aerobically treated sludge. The method can further comprise combining at least a portion of the at least partially aerobically treated sludge with the wastewater. The method can further comprise thickening the first portion of the first solids-rich sludge prior to anaerobically digesting the first portion of the first solids-rich sludge. Thickening the first portion of the first solids-rich sludge may comprise producing a solids-rich sludge having a first concentration of methanogenic bacteria, and anaerobically digesting the first portion of the first solids-rich sludge may comprise producing an anaerobically digested sludge having a second concentration of methanogenic bacteria, the first concentration being a significant fraction of the second concentration. The first concentration may be at least about 10% of the second concentration. The first concentration may be at least about 25% of the second concentration. The first concentration may be at least about 50% of the second concentration. The method can further comprise aerobically treating the portion of the second solids-rich sludge prior to combining the portion of the second solids-rich sludge with the wastewater. The method can further comprise combining a second portion of the first solids-rich sludge with the portion of the second solids-rich sludge. The method can further comprise separating a solids-lean fluid from the first solids-rich sludge prior to anaerobically digesting the first portion of the first solids-rich sludge. The method can further comprise combining at least a portion of the solids-lean fluid with the second portion of the first solids-rich sludge, and the portion of the second solids-rich sludge. The method can further comprise aerobically treating the combination of the at least a portion of the solids-lean fluid, the second portion of the first solids-rich sludge, and the portion of the second solids-rich sludge to form an at least partially aerobically treated combination. The method can further comprise combining the at least partially aerobically treated combination with the wastewater. The method can further comprise anoxically treating the wastewater and the at least partially aerobically treated combination to produce an anoxically treated wastewater, and wherein promoting aggregation comprises introducing methanogenic bacteria from the anaerobically digested sludge into the first mixed liquor. Precipitating one of the phosphorous containing compound and the nitrogen containing compound from the second solids-lean portion may comprise adjusting a pH of the second solids-lean portion. Precipitating one of the phosphorous containing compound and the nitrogen containing compound from the second solids-lean portion may comprise contacting the solids-lean portion with an alkali earth metal salt. The alkali earth metal salt may comprise magnesium. The alkali earth metal salt may comprise magnesium chloride. Precipitating one of the phosphorous containing compound and the nitrogen containing compound from the second solids-lean portion may comprise precipitating struvite from the second solids-lean portion.

In other configurations, the computer-readable media can comprise instructions implementable on a computer system or a controller that performs a method of increasing the capacity of a wastewater treatment system having a biological treatment train with at least one biological reactor selected from the group consisting of an anaerobic reactor, an anoxic reactor, and an aerobic reactor, a solids-rich outlet of the biological treatment train fluidly connected upstream of an inlet of an anaerobic digester, and a recycle line fluidly connecting an outlet of the anaerobic digester to an inlet of the biological treatment train. The method may comprise adjusting a fraction of a solids-rich sludge produced in the biological treatment train directed to the inlet of the anaerobic digester to a level at which a concentration of methanogenic bacteria present in the solids-rich sludge produced in the biological treatment train is a substantial fraction of a concentration of methanogenic bacteria present in mixed liquor in the anaerobic digester. The method may further comprise reducing a hydraulic retention time of one of the at least one biological reactor and the anaerobic digester. The method may further comprise producing a biological floc in the at least one biological reactor having an aerobic outer layer and one of an anoxic and an anaerobic core. Producing the biological floc in the at least one biological reactor may comprise increasing the organic loading of the at least one biological reactor. Producing the biological floc in the at least one biological reactor may comprise reducing an amount of oxygen supplied to the at least one biological reactor. The method may further comprise increasing a rate of production of methane in the anaerobic digester. The method may further comprise directing methanogenic bacteria from the outlet of the anaerobic bacteria, through an aerobic treatment operation, and to the inlet of the anaerobic reactor.

The function and advantage of these and other embodiments of the systems and techniques disclosed herein will be more fully understood from the example below. The following example is intended to illustrate the benefits of the disclosed treatment approach, but do not exemplify the full scope thereof.

Example 1

Figure 9:
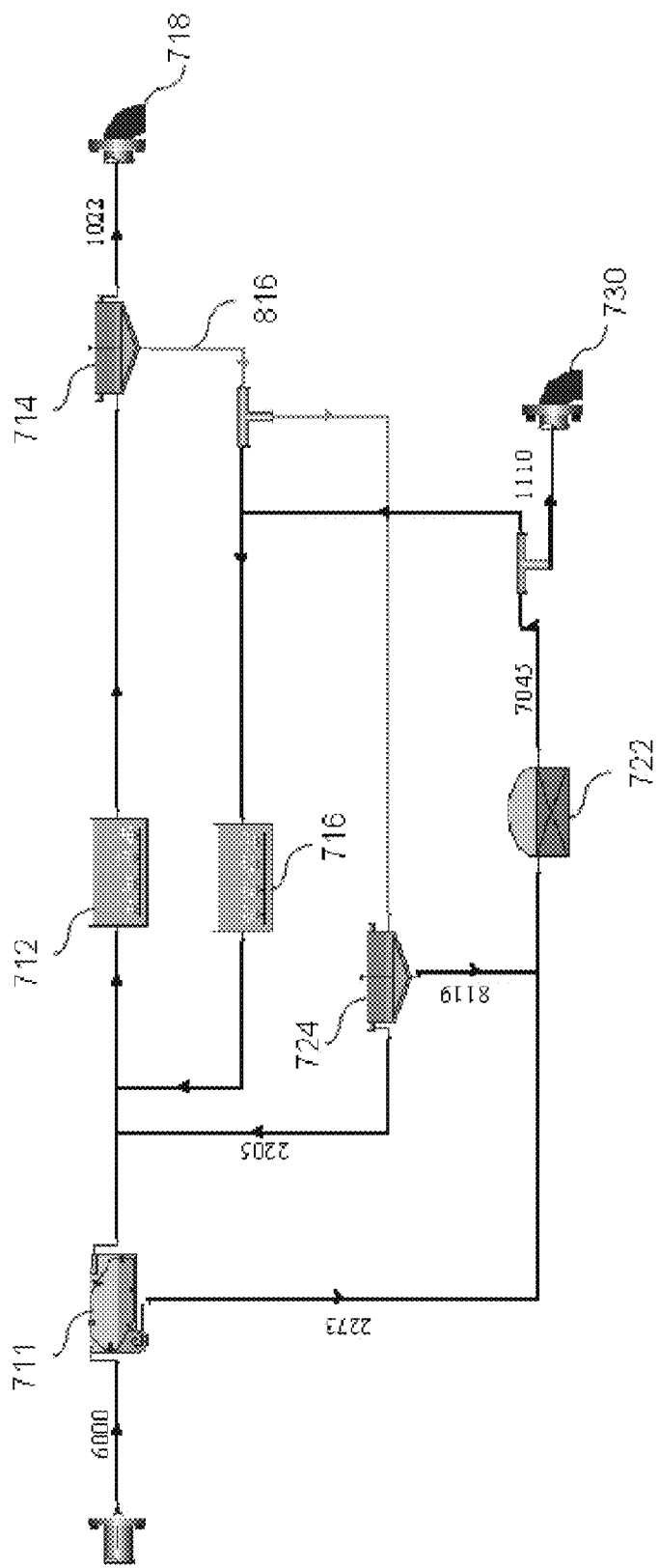
FIG. 9 is a process flow diagram illustrating another representative treatment system pertinent to one or more aspects of the invention.

Energy gain and sludge yield were estimated by numerically simulating the treatment system shown in FIG. 9. As illustrated, the proposed treatment system was considered to have a primary clarifier 711 fluidly connected to the influent or source of wastewater to be treated. The primary clarifier was considered to produce a solids-lean wastewater stream and a solids-rich wastewater stream. The solids-lean wastewater was considered to be introduced into a biological sorption tank 712 to produce a mixed liquor, and the solids-rich wastewater stream was considered to be introduced into an anaerobic digester 722. The mixed liquor from biological sorption tank 712 was considered to be introduced into a separator 714 to produce a solids-lean stream which was to be further treated in a membrane bioreactor, and a sludge stream. A portion of the sludge was to be introduced into a sludge thickener 724 to produce a thickened sludge and a solids-lean sludge. Another portion of the sludge was considered to be introduced into an aerobic treatment tank 716 to produce an at least partially aerobically treated sludge which was recycled and treated in biological sorption tank 712, with the solids lean wastewater. The thickened sludge was considered to be introduced into an anaerobic digester 722 to produce biologically digested sludge, of which a portion was recycled to be at least partially aerobically treated in treatment tank 716, and another portion of the digested sludge was discharged as solids waste 730.

The treatment system was numerically simulated using BIOWIN simulation software, EnviroSim Associates Ltd., Ontario, Canada. The simulation runs were performed such that 2 to 20 percent of the solids-rich sludge 816 exiting the separator or clarifier 714 was directed to the thickener 724 and ultimately the anaerobic digester 722.

Typical wastewater concentrations were used for the simulations; and detailed raw wastewater stoichiometry is listed in Table 1.

TABLE 1

Raw Wastewater Concentration and Stoichiometry (with corresponding parameters for the BIOWIN simulation software).

| | |
|---|---|
| Flow rate (m³/day) | 10,000 |
| Total COD (mg/L) | 600 |
| Total Kjeldahl Nitrogen (TKN) (mg/L) | 50 |
| TSS (mg/L) | 280 |
| Fbs - Readily biodegradable (including Acetate) (gCOD/g of total COD) | 0.1600 |
| Fac - Acetate (gCOD/g of readily biodegradable COD) | 0.1500 |
| Fxsp - Non-colloidal slowly biodegradable (gCOD/g of slowly degradable COD) | 0.7500 |
| Fus - Unbiodegradable soluble (gCOD/g of total COD) | 0.0500 |
| Fup - Unbiodegradable particulate (gCOD/g of total COD) | 0.1300 |
| Fna - Ammonia (gNH$_3$- N/gTKN) | 0.6600 |
| Fnox - Particulate organic nitrogen (gN/g Organic N) | 0.5000 |
| Fnus - Soluble unbiodegradable TKN (gN/gTKN) | 0.0200 |
| FupN - N:COD ratio for unbiodegradable part. COD (gN/gCOD) | 0.0350 |
| Fpo4 - Phosphate (gPO$_4$- P/gTP) | 0.5000 |

TABLE 1-continued

Raw Wastewater Concentration and Stoichiometry (with corresponding parameters for the BIOWIN simulation software).

| | |
|---|---|
| FupP - P:COD ratio for influent unbiodegradable part. COD (gP/gCOD) | 0.0110 |
| FZbh - Non-poly-P heterotrophs (gCOD/g of total COD) | 0.0001 |
| FZbm - Anoxic methanol utilizers (gCOD/g of total COD) | 0.0001 |
| Fzaob - Ammonia oxidizers (gCOD/g of total COD) | 0.0001 |
| Fznob - Nitrite oxidizers (gCOD/g of total COD) | 0.0001 |
| Fzamob - Anaerobic ammonia oxidizers (gCOD/g of total COD) | 0.0001 |
| FZbp - PAOs (gCOD/g of total COD) | 0.0001 |
| FZbpa - Propionic acetogens (gCOD/g of total COD) | 0.0001 |
| Fzbam - Acetoclastic methanogens (gCOD/g of total COD) | 0.0001 |
| FZbhm - H$_2$-utilizing methanogens (gCOD/g of total COD) | 0.0001 |

The following operating parameters of the main unit processes were assumed.

| | |
|---|---|
| Primary clarifier | 60% TSS removal |
| Sludge thickener | 80% TSS removal |
| Total Return Activated Sludge (RAS) flow | 100% of influent flow |
| Biological sorption tank | 500 m³ with DO set point of 2 mg/L |
| Aerobic stabilization tank | 600 m³ with DO set point of 2 mg/L |
| Anaerobic digester: | 2900 m³ |

The following assumptions were made for the energy balance calculations.

The energy content of CH$_4$ is 35846 kJ/m³ (at 0° C. and 1 atm) (Tchobanoglous et al., Wastewater Engineering Treatment and Reuse, Metcalf & Eddy 2004)

Aeration energy efficiency in the biological sorption tank and aerobic treatment tank would be 1.52 kg O$_2$/KWh (Tchobanoglous et al., Wastewater Engineering Treatment and Reuse, Metcalf & Eddy 2004)

Mixing energy for the anaerobic digester would be 0.008 KW/m³ when the TSS concentration in anaerobic digester is less than 40 gram/L (Tchobanoglous et al., Wastewater Engineering Treatment and Reuse, Metcalf & Eddy 2004)

Downstream membrane filtration air scouring and filtration energy would be 0.2 kwh/m³ of effluent, and the O$_2$ transfer from the MBR air scoring would be enough for nitrification The mixed liquor entering the anaerobic digester will be heated from 20° C. to 35° C., without heat exchange to recover energy.

When 2% of the RAS enters the anaerobic digester 722, all the digester effluent is to be wasted out of the system as waste activated sludge 730, and no anaerobic sludge is to be recycled back to biological sorption tank 712. The minimum RAS entering anaerobic digester 722 appears to be about 2%.

The predicted energy gain from methane production, aeration energy reduction, net energy gain, percentage of the COD removal by the anaerobic digester and sludge yield are shown in FIGS. 4 to 8.

When 20% of RAS enters anaerobic digester 722, the simulation software generated the following data:
  influent into primary clarifier 711: 6,000 kg COD/day
  settled materials of out primary clarifier 711: 2,273 kg COD/day
  effluent 718 out of secondary clarifier 714 to MBR: 1022 kg COD/day
  solids-lean portion out of sludge thickener 724: 2,205 kg COD/day thickened portion into anaerobic digester 722: 8,119 kg COD/day effluent out of anaerobic digester 722: 7,045 kg COD/day effluent out of anaerobic digester 722 to waste activated sludge (WAS) outlet 730: 1,110 kg COD/day The sludge retention time in the anaerobic digester 722 would be about 16.1 days and the TSS concentration in the anaerobic digester 722 would be 40,763 mg/L.

The aerobic sludge retention time, or MLSS inventory in biological sorption tank 712 and aerobic treatment tank 716 relative to a 20% RAS mass flow rate would be 0.7 days.

The total COD removal would be 3,868 kg COD/day (6,000−1,110−1,022).

COD removal through the anaerobic digester 722 would be 3,347 kg COD per day (2,273+8,119−7,045), or a predicted removal rate of 87% (3,347/3,868).

Aerobic COD removal would be 13% so the aeration energy consumption is low, but probably still enough to mix the tanks.

About 87% of the COD removal would occur when 20% of RAS enters the anaerobic digester. Thus, about 20%, or less, of the RAS can be introduced into the anaerobic digester to provide significant COD removal.

Figure 5:
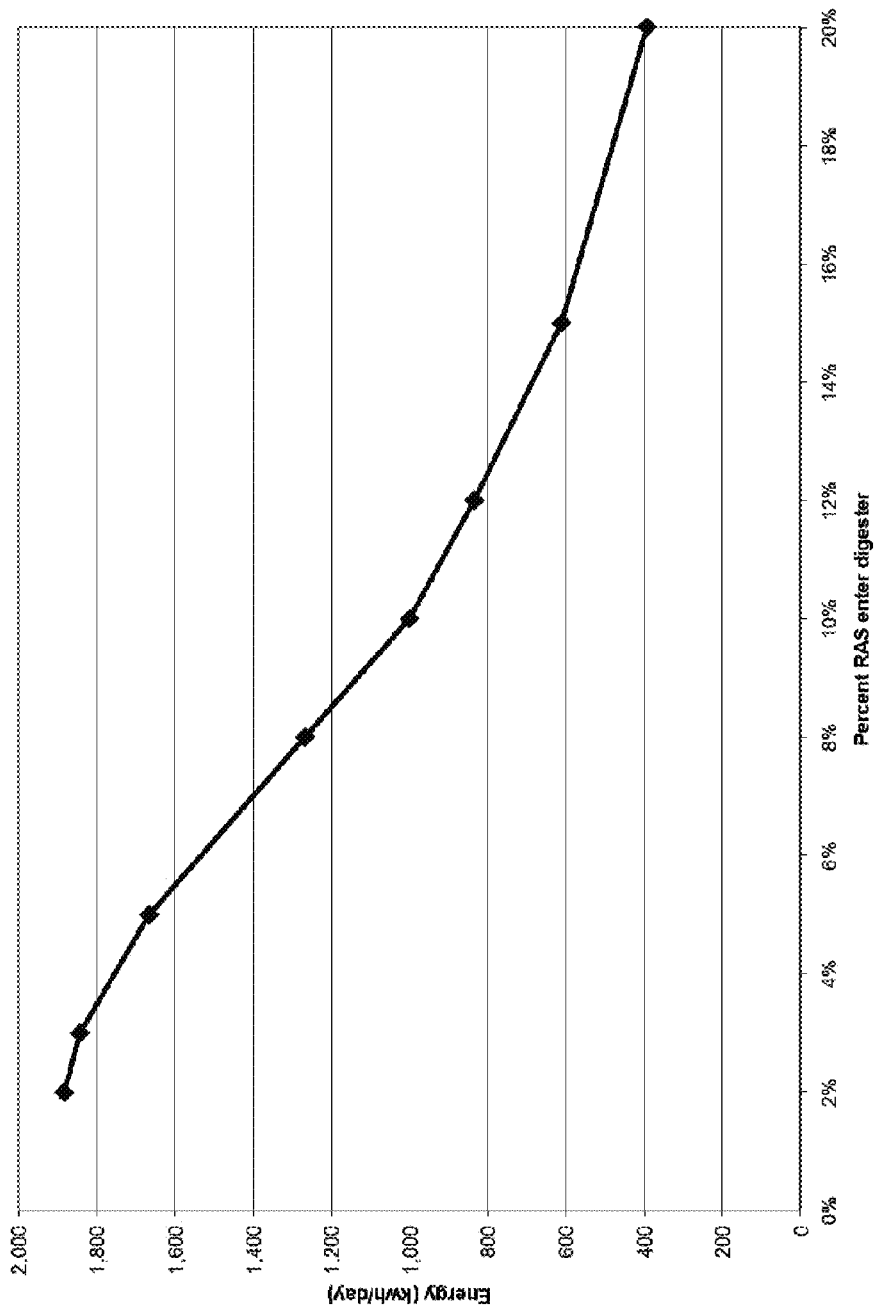
FIG. 5 is a graph of aeration energy reduction versus percent activated sludge entering the anaerobic digester for a treatment system pertinent to one or more aspects of the invention.
Figure 6:
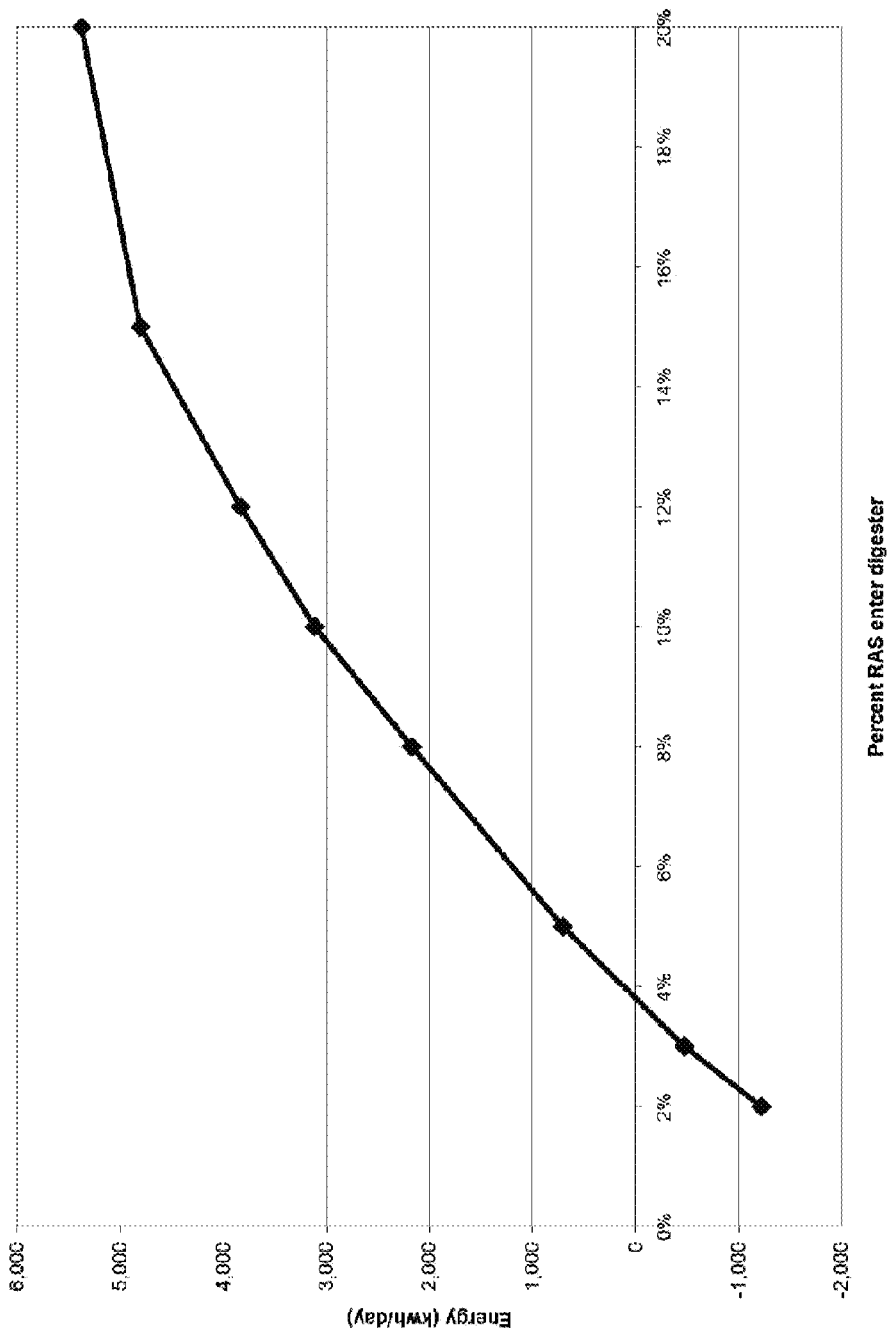
FIG. 6 is a graph of net energy gain versus percent activated sludge entering the anaerobic digester for a treatment system pertinent to one or more aspects of the invention.
Figure 7:
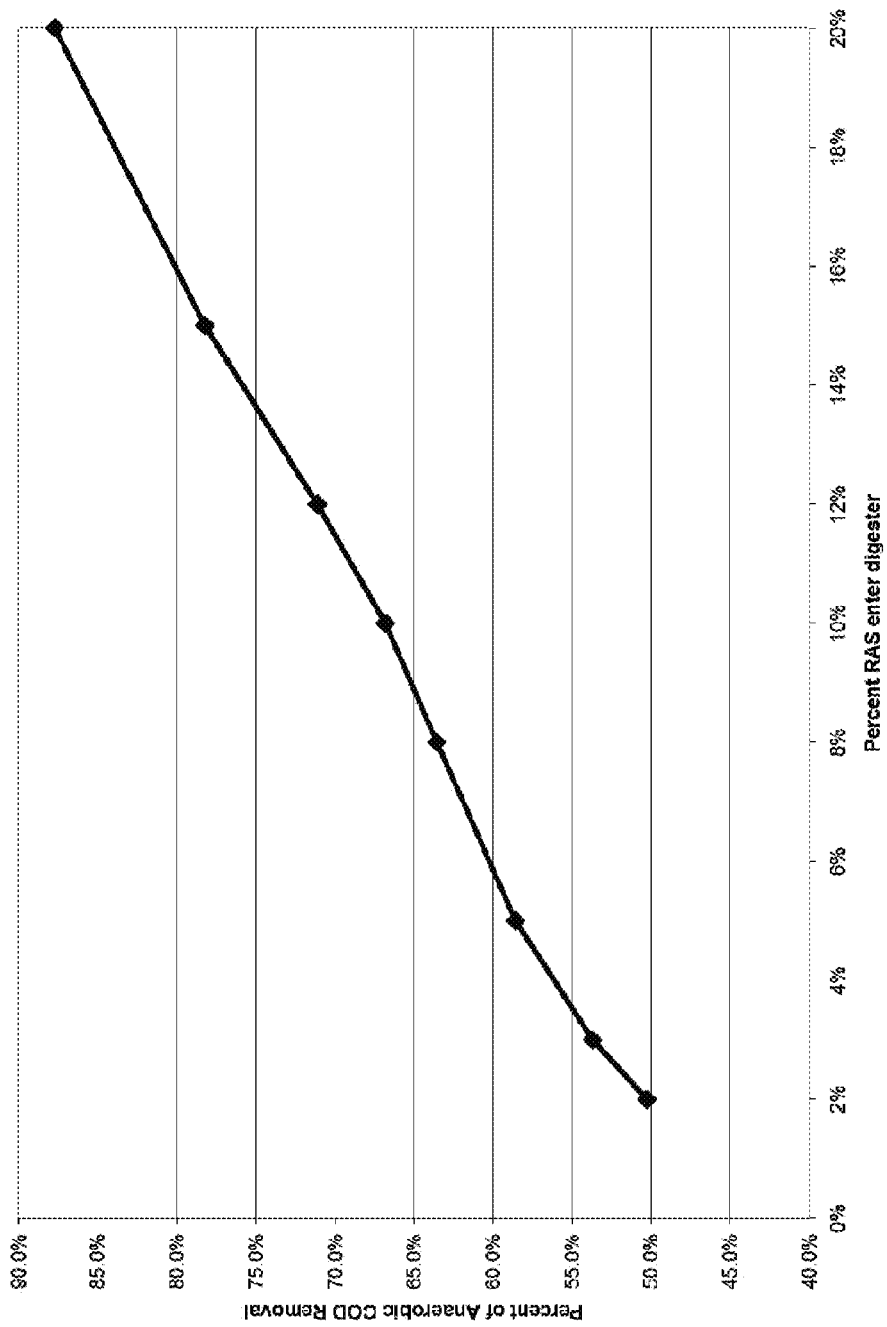
FIG. 7 is a graph of percentage of the COD removal by anaerobic digester energy versus percent activated sludge entering the anaerobic digester for a treatment system pertinent to one or more aspects of the invention.
Figure 8:
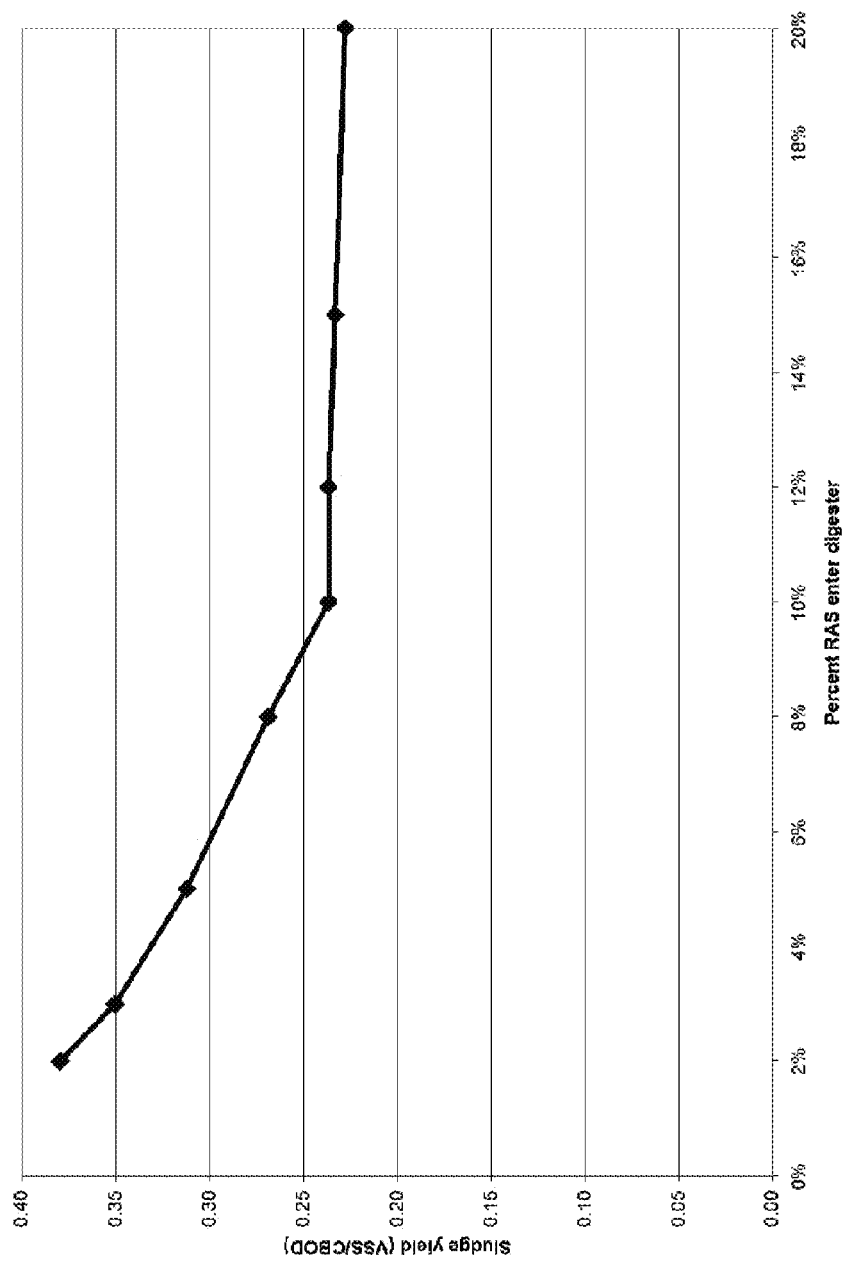
FIG. 8 is a graph of sludge yield versus percent return activated sludge entering the anaerobic digester for a treatment system pertinent to one or more aspects of the invention.

When more sludge goes through anaerobic digester 722, the aerobic activity decreases (see FIG. 5). When about 20% RAS enters the anaerobic digester 722, the oxygen utilization rate (OUR) in the biological sorption tank 712 and the aerobic treatment tank 716 would be 21 mgO$_2$/L per hour and 22 mgO$_2$/L per hour, respectively. Although 80% of the RAS goes through the aerobic treatment tank, the COD reduction rate in that tank appears to be low. The COD mass flow diagram at the condition of 20% of return activated sludge entering the anaerobic digester is shown in FIG. 9, with COD mass flow rate in kgCOD/day.

Further, potential benefits may be realized in terms of increased methane and reduced sludge production with between about 5% to about 8% RAS anaerobically digested, which can avoid capital expenditures associated with large anaerobic digestion processes.

The results also show that existing wastewater treatment facilities can be modified or retrofitted to incorporate one or more various aspects of the systems and techniques disclosed herein to treat water at a reduced energy rate and reduced amount of sludge.

Example 2

A simulation was performed to calculate the amount of methanogenic bacteria that would survive during recycling from an output of an anaerobic digester and back to the inlet of the anaerobic digester in accordance with an embodiment of the apparatus 70 as is illustrated in FIG. 10. The simulated apparatus included a 14 liter aerobic biosorption contact tank 812, a 100 liter clarifier 814, a 50 liter stabilization tank 818, a 100 liter sludge thickener 824, a 650 liter anaerobic digester 822, an outlet 820 for treated water, and an outlet 830 for waste sludge.

The simulation assumed an influent chemical oxygen demand (COD) at the inlet 810 of 600 mg/L and 6% anaerobic recycling (i.e., valving downstream of the solids-rich outlet of the clarifier 814 was configured such that 6% of the solids-rich stream exiting the clarifier 814 was directed to the thickener 824, with the remaining 94% directed to the stabilization tank.) The sludge inventory in the aerobic contact tank 812 was 25,484 kg and in the stabilization tank 818 was 194,436 kg. With a total suspended solids mass flow rate to the sludge thickener of 146,195 kg/day, the solids retention time in the contact stabilization process was 1.5 days. The simulation also shows that there was 441 kg COD/day of acetoclastic methanogens and 283 kg COD/day of hydrogenotrophic methanogens to be recycled back to the contact stabilization process from the anaerobic digester 822 to the stabilization tank 818 and aerobic biosorption contact tank 812.

If 236 kg COD/day acetoclastic methanogens and 155 kg COD/day hydrogenotrophic methanogens are recycled back to the anaerobic digester, about 55% of the methanogens could survive in the contact stabilization process with a solids retention time of 1.5 days. This simulation result is based on default parameters in BIOWIN simulation software including an acetoclastic methanogen aerobic cell decay rate of 0.6 day$^{-1}$ and a hydrogenotrophic methanogen aerobic cell decay rate of 0.6 day$^{-1}$.

This simulation indicates that because of the anaerobic sludge recycle in this process, a significant portion of the slow growing acetoclastic methanogens and hydrogenotrophic methanogens may be recycled through the short solids retention time contact stabilization process and back to the anaerobic digester. As a result, the anaerobic digestion process in this system would be more stable relative to systems not including a methanogenic bacteria recycle.

Example 3

Figure 12:
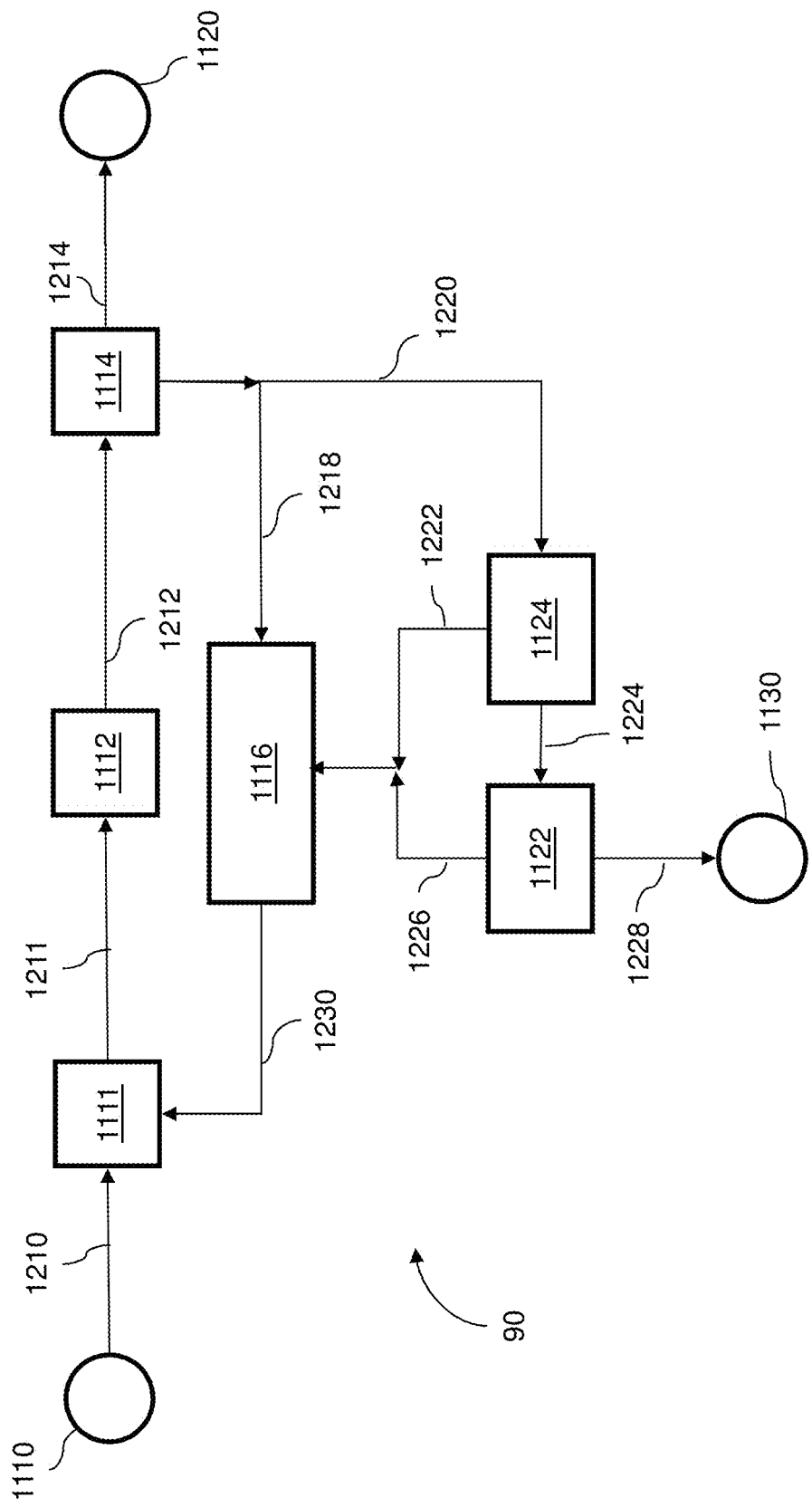
FIG. 12 is a flow diagram illustrating another representative treatment system pertinent to one or more aspects of the invention.
Figure 13:
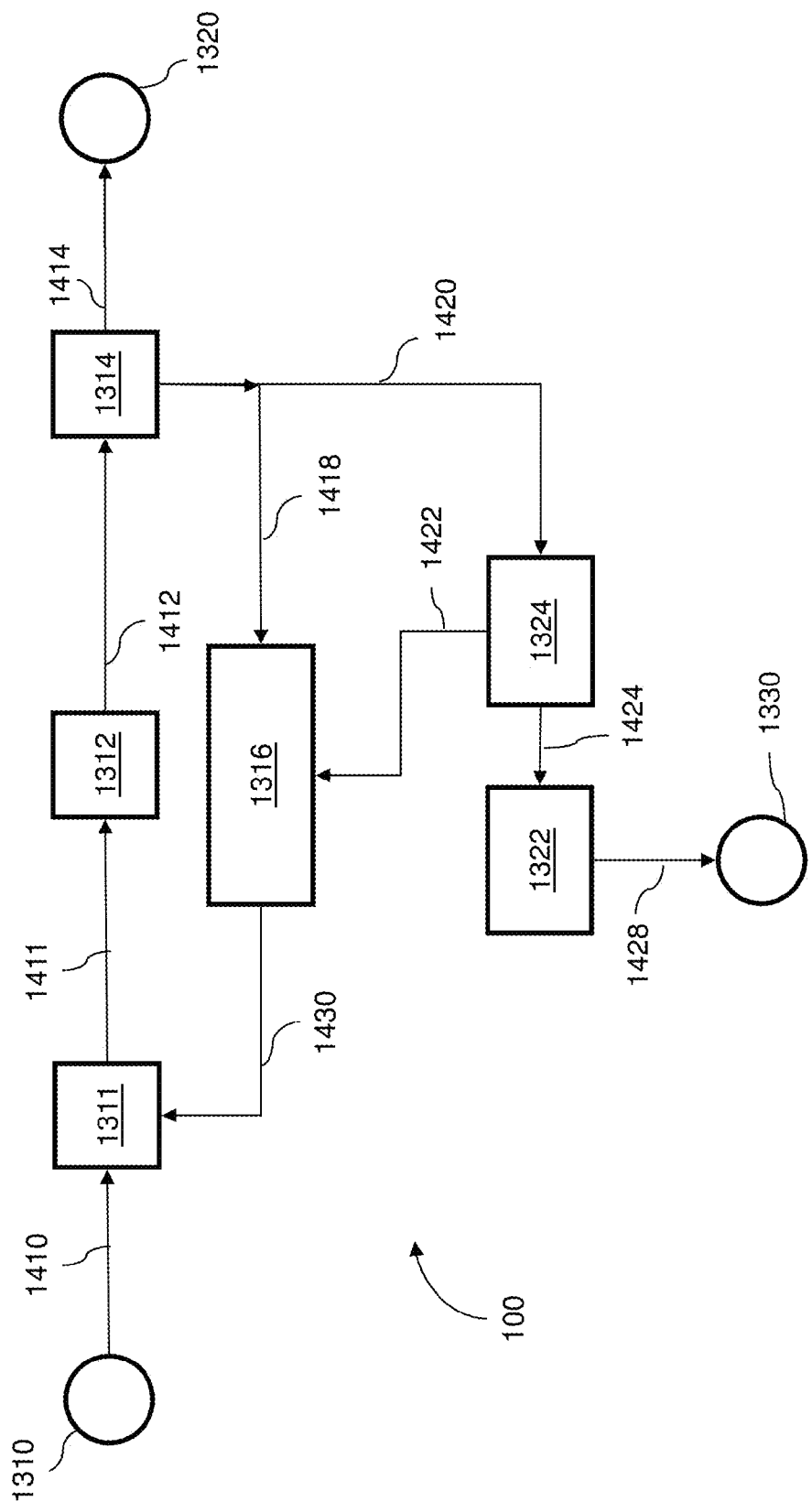
FIG. 13 is a flow diagram illustrating another representative treatment system pertinent to one or more aspects of the invention.

Two treatment systems configured as illustrated in FIG. 12 (the test systems 90) and one treatment system configured as in FIG. 13 (the control system 100) were assembled with the following vessel sizes:

TABLE 2

| Description | FIG. 12, FIG. 13 Indicators | Volume (liters) |
| --- | --- | --- |
| Anoxic Tank | 1111, 1311 | 25 |
| Contact Tank | 1112, 1312 | 14 |
| Clarifier | 1114, 1314 | 100 |
| Stabilization Tank | 1116, 1316 | 50 |
| Sludge Thickener | 1124, 1324 | 100 |
| Anaerobic Digester | 1122, 1322 | 650 |

The systems also included wastewater inlets 1110, 1310, clarified liquid outlets 1120, 1320, and waste sludge outlets 1130, 1330.

The systems were operated by introducing a wastewater into the inlets 1110, 1310 of the systems and flowing solid-rich and solid-lean streams through the various portions of the systems in accordance with the following tables.

TABLE 3

Test Systems

| Description | FIG. 12 Indicator | Flow Rate (ml/min) |
| --- | --- | --- |
| Input to Anoxic Tank | 1210 | 420 |
| Anoxic tank to Contact Tank | 1211 | 874 |
| Contact Tank to Clarifier | 1212 | 874 |
| Clarifier to clarified liquid outlet | 1214 | 416 |
| Clarifier to Stabilization Tank | 1218 | 420 |
| Clarifier to Sludge Thickener | 1220 | 38 |
| Sludge Thickener to Stabilization Tank | 1222 | 23 |
| Sludge Thickener to Anaerobic Digester | 1224 | 15 |
| Anaerobic Digester to Stabilization Tank | 1226 | 11 |
| Anaerobic Digester to Waste Sludge Outlet | 1228 | 4 |
| Stabilization Tank to Anoxic Tank | 1230 | 454 |

TABLE 4

Control System

| Description | FIG. 13 Indicator | Flow Rate (ml/min) |
| --- | --- | --- |
| Input to Anoxic Tank | 1410 | 420 |
| Anoxic tank to Contact Tank | 1411 | 844 |
| Contact Tank to Clarifier | 1412 | 844 |
| Clarifier to clarified liquid outlet | 1414 | 405 |
| Clarifier to Stabilization Tank | 1418 | 420 |
| Clarifier to Sludge Thickener | 1420 | 19 |
| Sludge Thickener to Stabilization Tank | 1422 | 4 |
| Sludge Thickener to Anaerobic Digester | 1424 | 15 |
| Anaerobic Digester to Waste Sludge Outlet | 1428 | 15 |
| Stabilization Tank to Anoxic Tank | 1430 | 424 |

The amount of acetoclastic methanogens and hydrogenotrophic methanogens in the anaerobic digestion effluents and the anaerobic digestion feed streams with and without anaerobic sludge recycle was quantified using qPCR (quantitative real time polymerase chain reaction, a laboratory technique which is used to amplify and simultaneously quantify a targeted DNA molecule. It enables both detection and quantification of one or more specific sequences in a DNA sample.) During stable operation of both the test processes and control process, samples were taken from the biosorption tanks, clarifier underflow, stabilization tanks, and anaerobic digesters for community analysis. DNA in each of the sludge samples was rapidly extracted by using a PowerSoil® DNA extraction kit, available from MO BIO Laboratories, Inc., Carlsbad, Calif. The quantity and quality of the extracted DNA was checked by measuring absorbance at 260 and 280 nm using a NanoDrop™ ND-1000 spectrophotometer, available from NanoDrop Products, Wilmington, Del. DNA samples were shipped to a laboratory at Arizona State University, where the concentrations of acetoclastic methanogens, hydrogenotrophic methanogens and some general bacteria were measured using qPCR. Based on the data obtained, the cell decay rate of acetoclastic methanogens and hydrogenotrophic methanogens in an aerobic environment was calculated.

Figure 14:
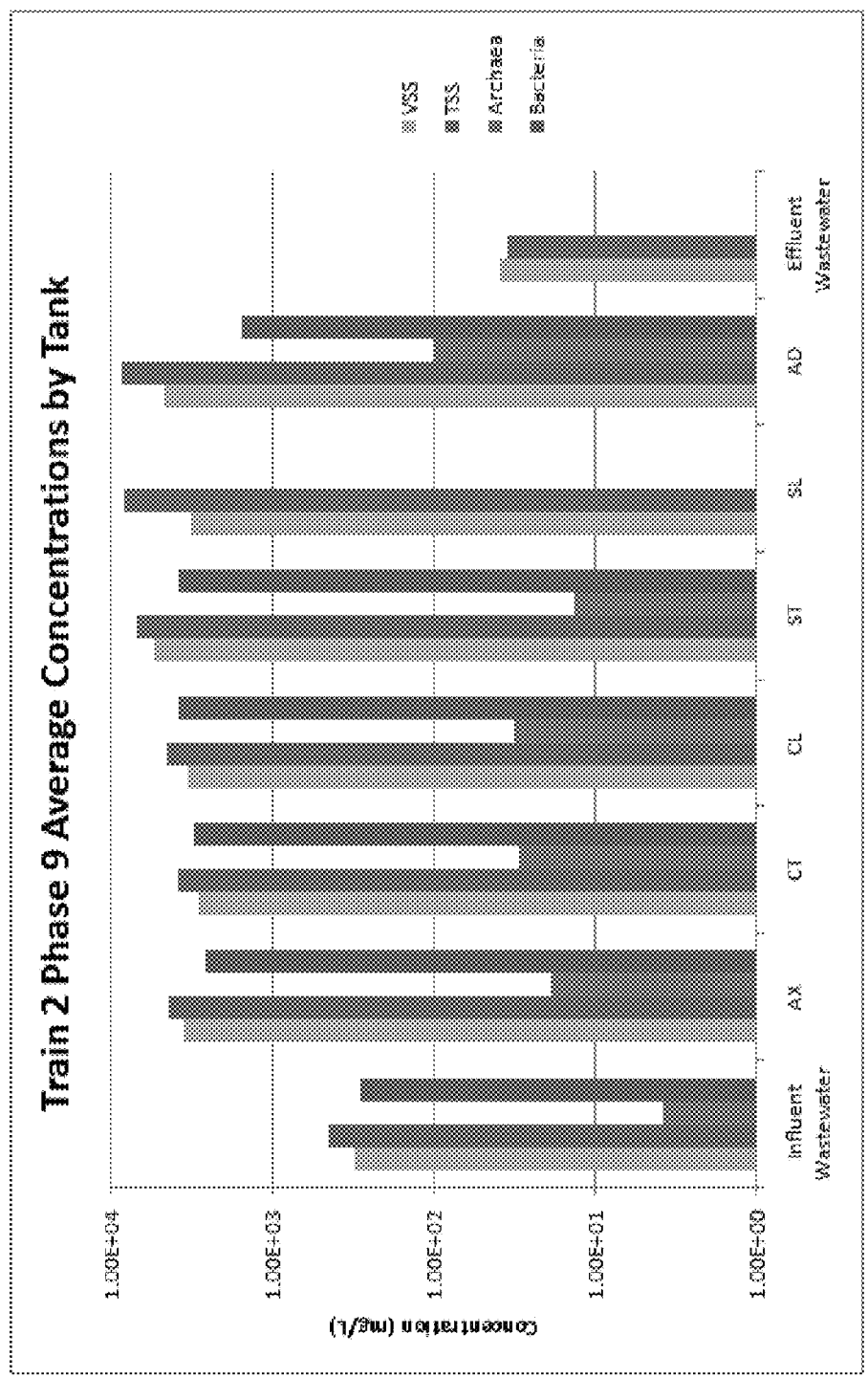
FIG. 14 is a chart illustrating the concentration of various substances in a comparative treatment system.
Figure 15:
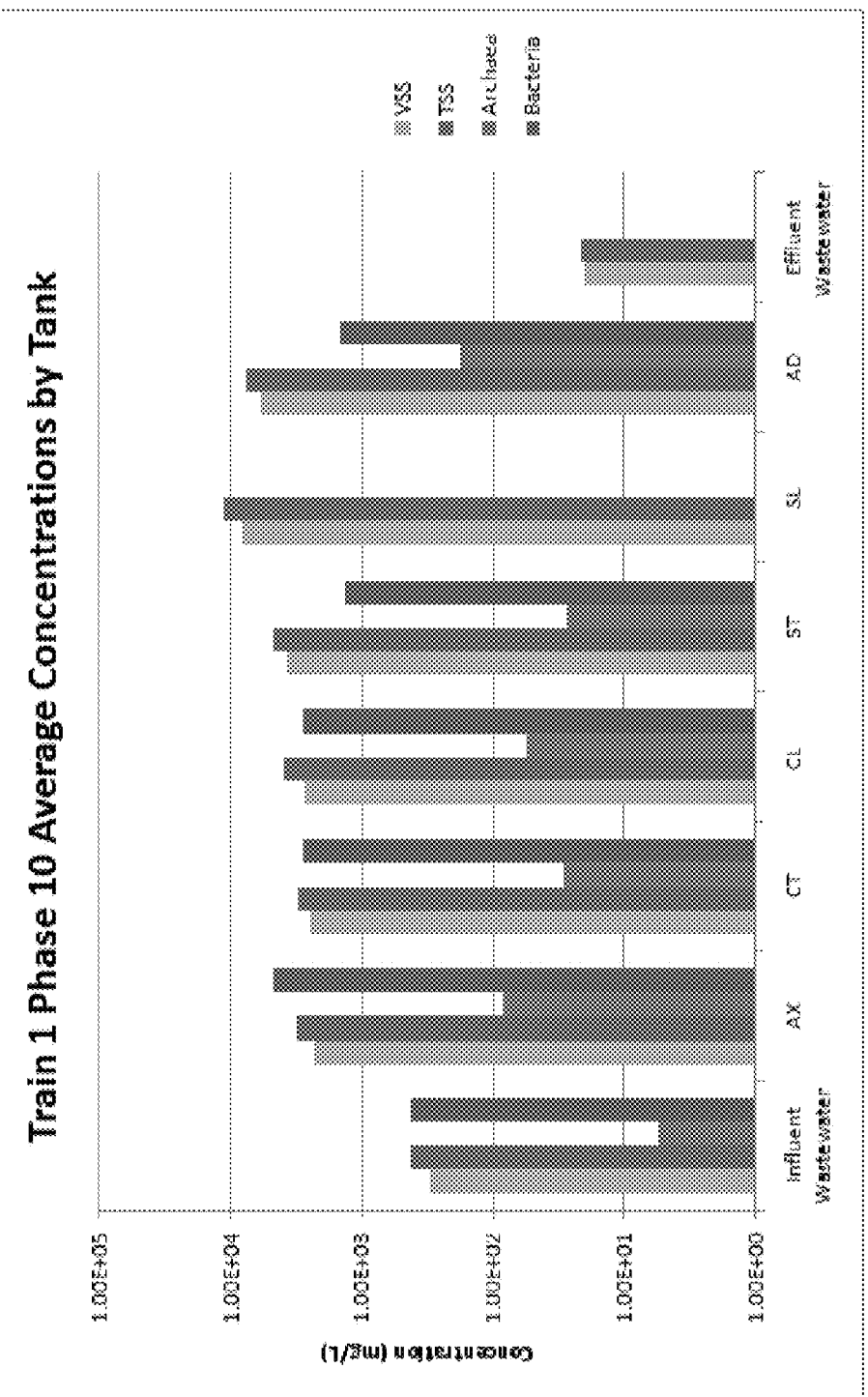
FIG. 15 is a chart illustrating the concentration of various substances in a representative treatment system.
Figure 16:
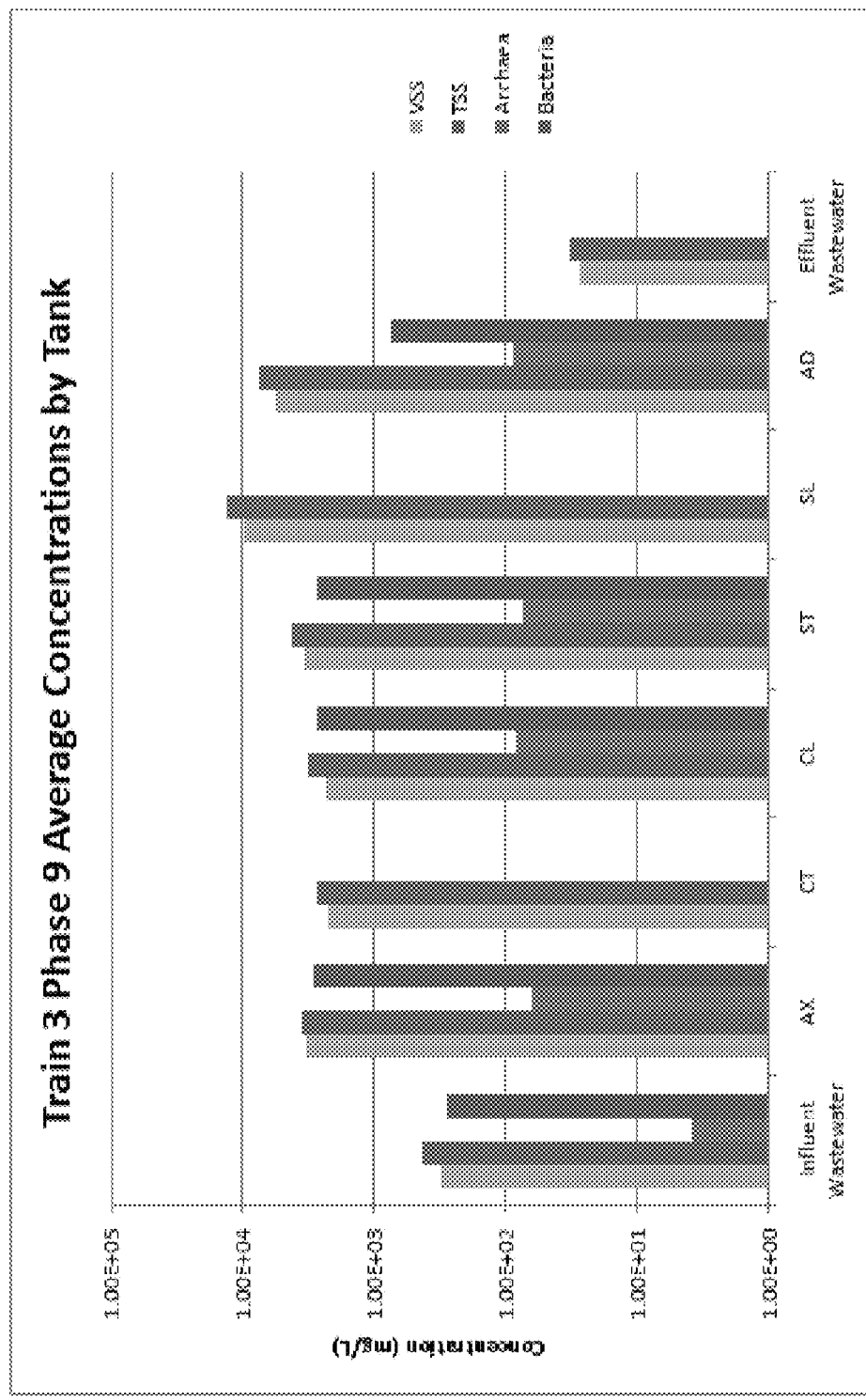
FIG. 16 is a chart illustrating the concentration of various substances in another representative treatment.

The results of the DNA analysis are illustrated in the charts of FIGS. 14-16. FIGS. 14-16 illustrate the concentration of non-methanogenic bacteria (Bacteria) and methanogenic archaea (Archaea) in the influent wastewater, anoxic tanks 1111, 1311 (AX), the contact tanks 1112, 1312 (CT), clarifiers 1114, 1314 (CL), sludge thickeners 1124, 1324 (SL), and anaerobic digesters 1122, 1322 (AD), as well as concentrations of volatile suspended solids (VSS) and total suspended solids (TSS) in these tanks and in the sludge thickener (SL) and effluent wastewater in the control system (Train 2), the first test system (Train 1) and the second test system (Train 3)

These results indicate that in general, Bacteria numbers correlate to VSS and TSS. The concentrations of Archaea are one to two orders of magnitude lower than Bacteria, but Archaea was observed in all tanks from which samples were taken. It appears that methanogens are surviving, although qPCR does not assay viability or activity.

Figure 17:
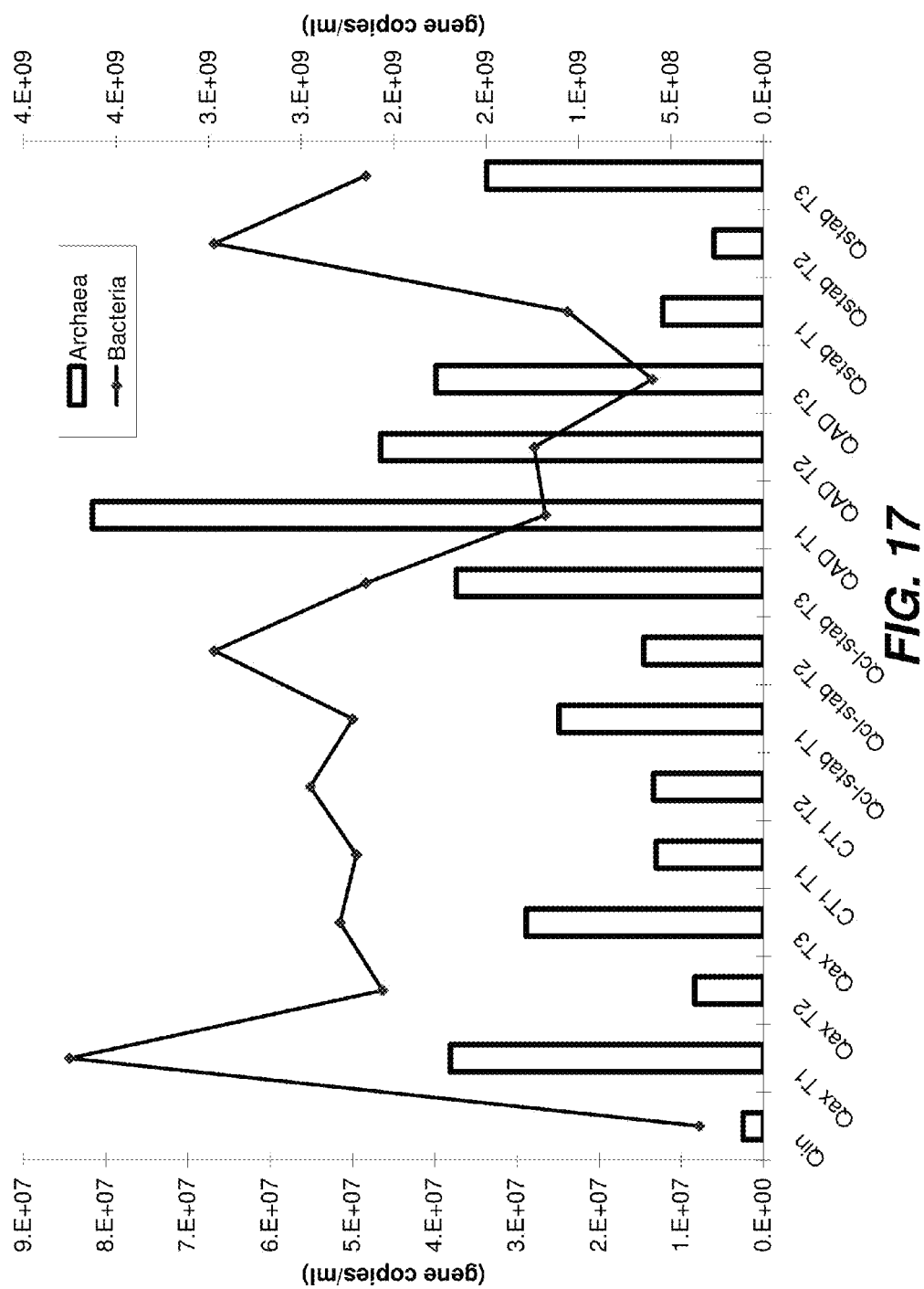
FIG. 17 is a chart illustrating the concentration of various substances in a comparative and two representative treatment systems.

FIG. 17 illustrates how Archaea and Bacteria concentrations correlate in the various tanks of each of the test and control systems. In this chart, the units of the Y axes are concentration of gene copies/mL. The Y axis on the left of the chart is for the Archaea data, while the Y axis on the right of the chart is for the Bacteria data.

In this chart data was obtained from the various streams indicated by the abbreviations on the X-axis of the chart as follows:

Qin=Influent
Qax T1=Stream leaving anoxic tank of Train 1
Qax T2=Stream leaving anoxic tank of Train 2
Qax T3=Stream leaving anoxic tank of Train 3
CT 1 T1=Stream leaving contact tank of Train 1
CT 1 T2=Stream leaving contact tank of Train 2
Qcl-stab T1=Solids-rich stream directed from the clarifier to the stabilization tank of train 1
Qcl-stab T2=Solids-rich stream directed from the clarifier to the stabilization tank of train 2
Qcl-stab T3=Solids-rich stream directed from the clarifier to the stabilization tank of train 3
QAD T1=Stream leaving anaerobic digester of Train 1
QAD T2=Stream leaving anaerobic digester of Train 2
QAD T3=Stream leaving anaerobic digester of Train 3
Qstab T1=Stream leaving stabilization tank of Train 1
Qstab T2=Stream leaving stabilization tank of Train 2
Qstab T3=Stream leaving stabilization tank of Train 3

In general, Bacteria and Archaea have an inverse relationship within the treatment processes. This makes sense in that the conditions conducive to the best bacterial growth (plenty of oxygen and nitrate) are inimical to methanogens.

The Train 1 (the first test system, configured as illustrated in FIG. 12) anaerobic digester was observed to have a greater concentration of methanogens than the anaerobic digester of both Train 2 (the control system, configured as illustrated in FIG. 13) and Train 3 (the second test system, configured as illustrated in FIG. 12). Perhaps this is a sign that Train 1 was operating better, for example, having a greater survival rate of methanogenic bacteria in the aerobic portions of the treatment system, than Train 3.

Within the liquid-treatment processes, the test systems generally have higher Archaea concentrations than the control system. This pattern does not hold for Bacteria.

These results indicate that a recycle of the anaerobiacally digested sludge from the anaerobic digester into the stabilization tank and back to the anoxic tank of the treatment systems results in a significant increase in the amount of methanogenic bacteria that is recycled back to the inlet of the anaerobic digester.

Figure 18:
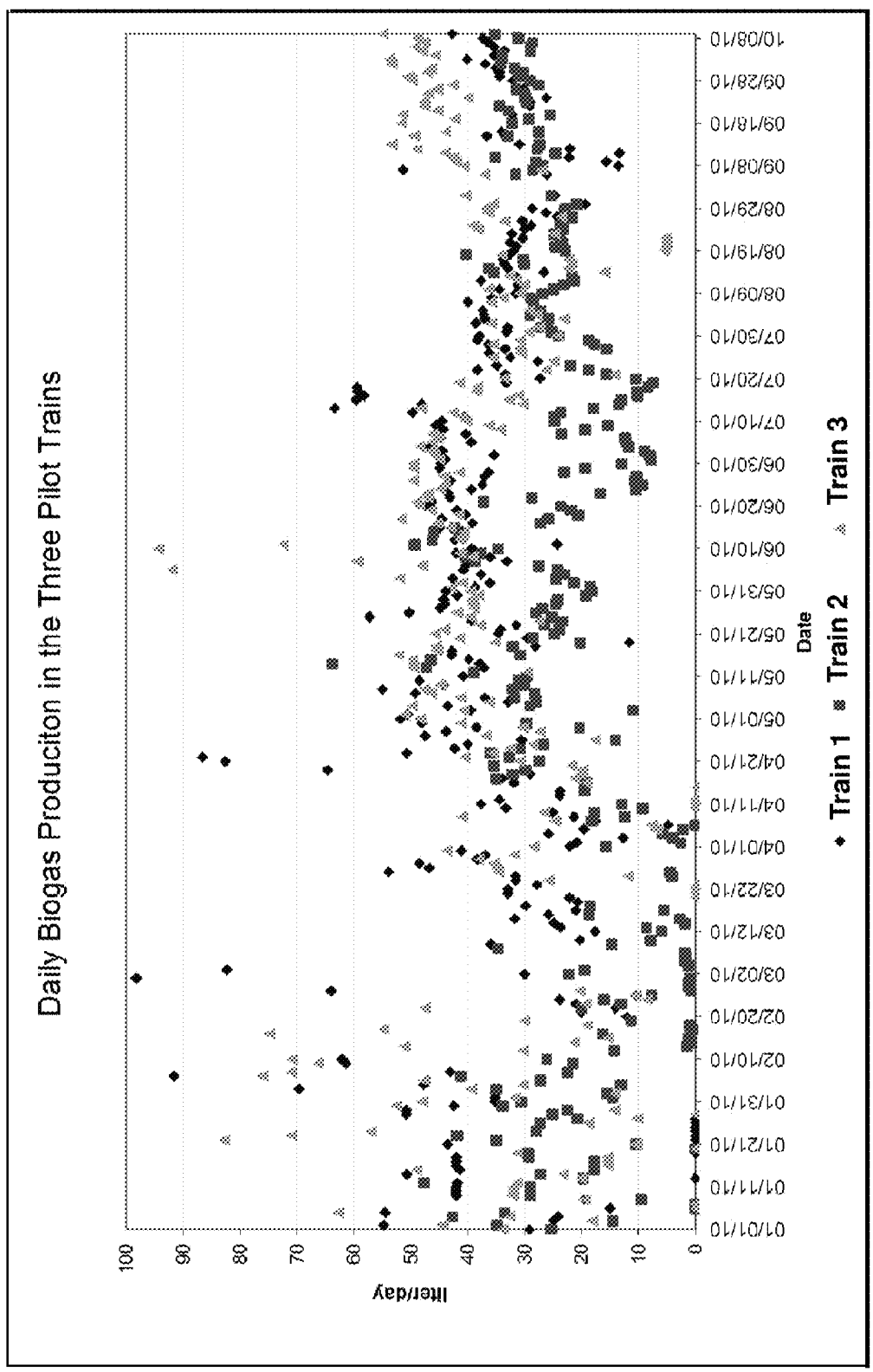
FIG. 18 illustrates daily biogas production during a test of two representative test systems and a comparative system.
Figure 19:
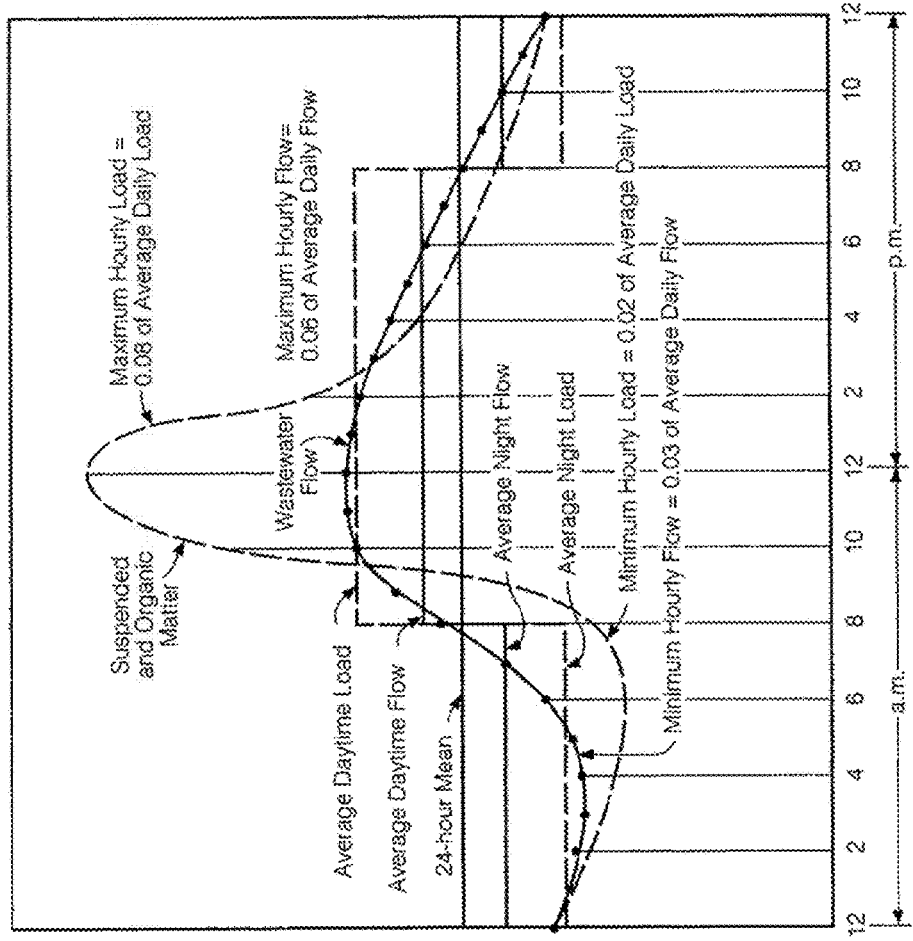
FIG. 19 illustrates a hypothetical variation in wastewater influent with time of day at a hypothetical municipal wastewater treatment plant.

FIG. 18 illustrates the daily biogas production from the two test systems and the control system over a ten month period. As can be seen, the biogas production of the two test systems exceeded that of the control system. This is likely due to an increased quantity of methanogenic bacteria in the anaerobic digester of the test systems as compared to the control system The two test systems had an average daily biogas production of 37.1±19.3 liter/day and 37.9±17.4 liter/day while the control system had an average daily biogas production of 23.8±11.3 liter/day. These results indicate that systems operating with an anaerobic sludge recycle in accordance with the present invention may consistently produce more energy (in the form of methane gas) than similar systems without an anaerobic sludge recycle.

Example 4

A system such as that illustrated in FIG. 12 was utilized to study the potential for recycling nitrification bacteria through the treatment system. During the testing, an anaerobic sludge recycle percentage of 6% of the solids rich stream exiting the clarifier 1114 was directed to the thickener 1124, with the remaining 94% directed to the stabilization tank 1116. The hydraulic retention time in the anoxic tank 1111 was one hour. The tank volumes and flow rates were the same as those indicated in Tables two and three above.

Including the anoxic tank 1111 to perform de-nitrification upstream of the contact tank 1112 helped to reduce aerobic energy consumption as the result of the de-nitrification oxygen credit, for example about 2.7 mg $O_2$/mg $NO_3$—N, and also reduce the likelihood of de-nitrification sludge that could have floated in the clarifier 1114.

The feed stream from the thickener 1124 to the anaerobic digester supplied 530 kg COD/day of Ammonia Oxidation Bacteria (AOB) and 57 kg Nitrite Oxidation bacteria (NOB) to the inlet of the anaerobic digester 1124.

The amount of AOB and NOB in the anaerobic digester influent and effluent stream was analyzed using qPCR technology with primers relevant to AOB and NOB.

The specific nitrate production rate of a sample of aerobically treated sludge taken from the inlet of the anaerobic digester and of a sample of anaerobically digested sludge taken from the outlet of the anaerobic digester were measured to quantify the specific nitrification activity of the anaerobically digested sludge. At time zero, the $NO_3$—N concentrations of the sludge samples were measured and 10 mg/L $NH_3$—N was added to each sample to ensure sufficient $NH_3$ was present to continue to react throughout the time period of the test. Both sludge samples were then aerated to achieve and maintain a dissolved oxygen level of 2 mg/L. After two hours of aeration, the $NO_3$—N concentrations of the sludge samples was measured again and the specific nitrification rate (SNR) of each was calculated as: SNR=($NO_3$—$N_{time=2\,hr}$—$NO_3$—$N_{time=0}$)/(Mixed Liquor Volatile Suspended Solids).

The results of this test are illustrated in table 5 below.

TABLE 5

Nitrification Bacteria Recycle Test Results

| Parameter | Original Digester Inlet* | Original Digester Outlet* | Sample from Anaerobic Digester Inlet T0 | Sample from Anaerobic Digester Inlet T 2 hr | Sample from Anaerobic Digester Outlet T0 | Sample from Anaerobic Digester Outlet T 2 hr |
|---|---|---|---|---|---|---|
| $NO_2$—N (ppm) | — | — | 0.013 | 1.668 | 0.009 | 0.482 |
| $NO_3$—N (ppm) | 0.07 | 0.115 | 0.049 | 4.645 | 0.079 | 1.325 |
| $NH_3$—N (ppm) | 14.97 | 129.1 | 8.93 | 4.84 | 31.05 | 29.82 |
| pH | 7.06 | 7.32 | 7.21 | 6.16 | 7.38 | 7.75 |
| TSS (mg/l) | 17.9 | 15.16 | 5.62 | 5.7 | 4.86 | 5.22 |
| VSS (mg/l) | 10.2 | 8.1 | 2.72 | 2.76 | 2.26 | 2.16 |

*The "Original Digester Inlet" and "Original Digester Outlet" columns refer to measurements performed at the anaerobic digester inlet and outlet, respectively, prior to initiating a recycle of anaerobically digested sludge from the anaerobic digester to the stabilization tank 1116.

From the data for the $NO_3$—N in the samples from the anaerobic digester inlet and outlet, it was calculated that the nitrification activity of the sludge entering the anaerobic digester (the aerobically treated sludge) was 4.645-0.049=4.596 mg/l in 2 hours. The nitrification activity of the sludge leaving the anaerobic digester (the anaerobically digested sludge) was 1.325-0.079=1.246 mg/l in 2 hours. Therefore 1.246/4.596=27% of the nitrification activity survived and was available for recycling back from anaerobic digester to the inlet of the wastewater treatment system.

Accordingly, the recycling of anaerobically digested sludge to the inlet and/or contact tank 1111 of the treatment system may provide NOB and AOB which may assist in the nitrification process in the aerobic portions of the treatment system, and potentially provide for a reduced volume of aerobic treatment vessels and thus a reduced hydraulic residence time in these vessels, or an increase in a safety factor which would render the nitrification process more resistant to failure due to disruptions in the operation of the treatment system. It is expected that decreasing the solids retention time in the anaerobic digester would further increase the AOB and NOB survival percentage.

Example 5

Figure 11:
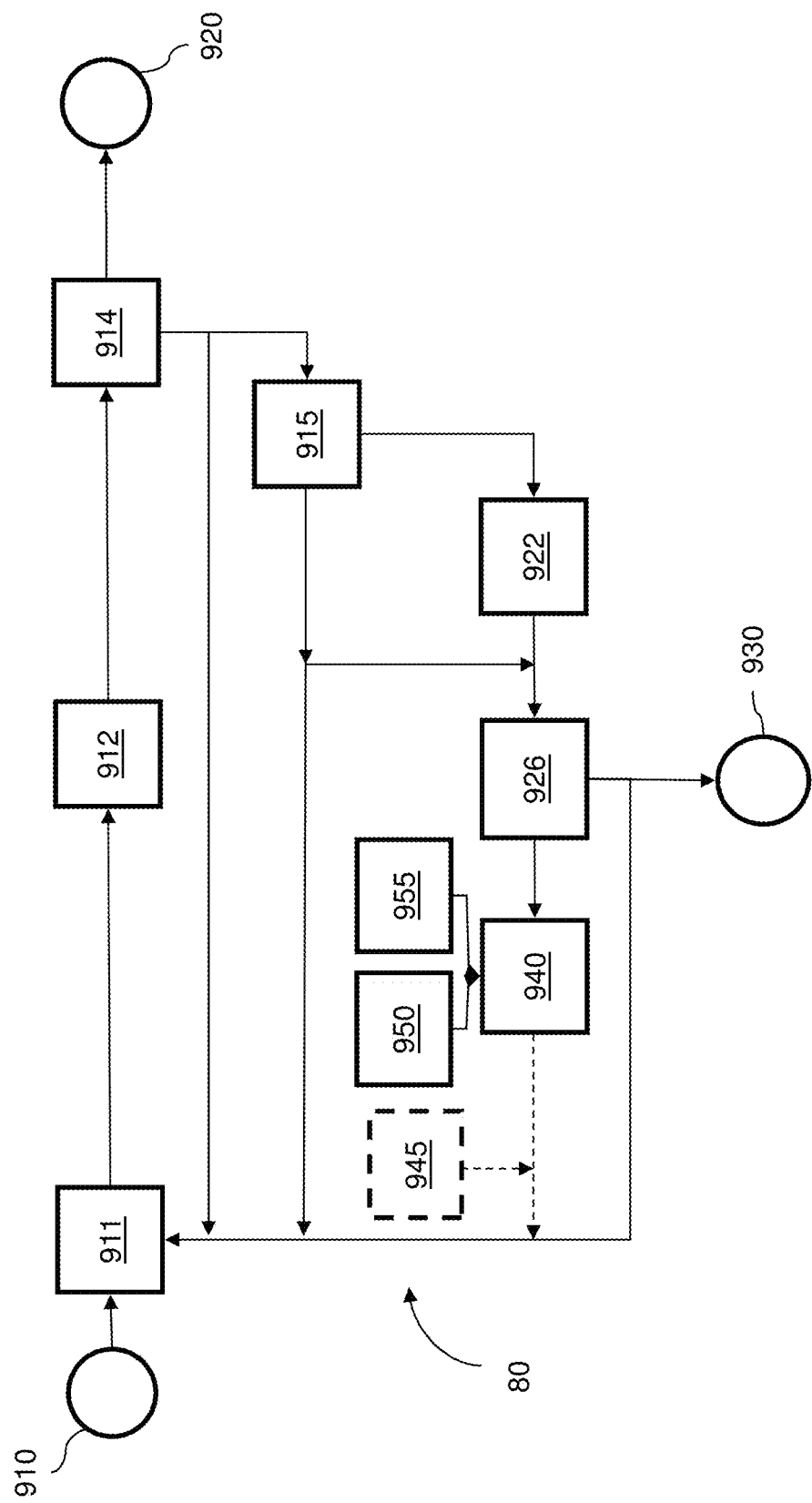
FIG. 11 is a flow diagram illustrating another representative treatment system pertinent to one or more aspects of the invention.

A phosphorous and nitrogen recovery simulation was performed utilizing BIOWIN simulation software for a hypothetical activated sludge treatment system configured as illustrated in FIG. 11. The simulation assumed an average daily wastewater input flow (ADF) of 350,000 $m^3$/day, an influent COD of 600 mg/L, a total influent phosphorous concentration (TP) of 10 mg/L, an anaerobic recycle fraction (the volume fraction of the solids-rich output from the clarifier 914 directed into the anaerobic reactor 922) of 6%, a hydraulic residence time in the anaerobic treatment tank 911 of one hour, and a hydraulic residence time in the aerobic treatment tank 912 of four hours.

The simulation assumed 3,500 $m^3$/day of anaerobically digested sludge was mixed with 3,500 $m^3$/day of a solids-lean stream output from the clarifier 915 at an inlet of the separator 926. A solids-lean effluent flow from the separator 926 flow was set at 3,500 $m^3$/day, 1% of the ADF. 1,554 kg/day of phosphorus and 1,925 kg/day of nitrogen was calculated to be present in the effluent from the separator 926. With a total phosphorus load to the plant of 3,500 kg/day, about 44% of the total phosphorous in the wastewater could be recovered, 10% carried out in the effluent and 46% still contained in the WAS. Because of the phosphorus recovery, the total phosphorous (TP) present in the effluent to output 920 also decreased from 1.7 mg/L to 1.08 mg/L.

The amount of nitrogen that could be removed from the effluent flow from the separator 926 was calculated to be 1,925 kg/day, which is 8% of the total nitrogen in the influent wastewater (22,750 kg N/day). As the result of precipitation in a precipitation vessel 940 (for example, by precipitating struvite from the effluent flow from the separator 926 by introduction of, for example, magnesium chloride into the effluent), 702 kg N/day could be removed. The remaining nitrogen in the stream introduced into the precipitation vessel after precipitation of the nitrogen would be about 1,223 kg/day or 5% of the total nitrogen load. Further treatment, for example utilizing an anaerobic ammonium oxidation process could remove additional nitrogen from the stream introduced into the precipitation vessel after precipitation of the nitrogen.

Example 7

A simulation was performed using BIOWIN simulation software to determine potential energy generation rates for a system such as illustrated in FIG. 10 under different conditions of influent wastewater COD levels and different percentages of solids-rich sludge generated in the clarifier 814 directed to the sludge thickener 824 and anaerobic digester 822. The characteristics of hypothetical representative wastewater with three different COD levels used in the simulation were set as follows:

TABLE 6

Influent characteristics for the process simulations

|  | Low COD | Medium COD | High COD |
|---|---|---|---|
| COD (mg/l) | 300 | 600 | 800 |
| TSS (mg/l) | 150 | 258 | 330 |
| VSS (mg/l) | 117 | 234 | 312 |
| TKN (mg/l) | 38 | 65 | 83 |

TABLE 6-continued

Influent characteristics for the process simulations

| | Low COD | Medium COD | High COD |
|---|---|---|---|
| $NH_3$—N (mg/l) | 25 | 43 | 55 |
| TP (mg/l) | 10 | 10 | 10 |
| Temperature (degrees C.) | 20 | 20 | 20 |

Because the COD/TSS ratio given are not a constant, the VSS/TSS ratio was set at different values so that the BIOWIN simulation software default typical influent COD, TN, and TP factions could be used. The COD, TN, and TP fractions are listed in Table 7 below.

TABLE 7

COD, TN and TP fraction used for the process simulations

| | |
|---|---|
| Readily biodegradable (including Acetate) (gCOD/g of total COD) | 0.1600 |
| Acetate (gCOD/g of readily biodegradable COD) | 0.1500 |
| Non-colloidal slowly biodegradable (gCOD/g of slowly degradable COD) | 0.7500 |
| Unbiodegradable soluble (gCOD/g of total COD) | 0.0500 |
| Unbiodegradable particulate (gCOD/g of total COD) | 0.1300 |
| Ammonia (gNH$_3$—N/gTKN) | 0.6600 |
| Particulate organic nitrogen (gN/g Organic N) | 0.5000 |
| Soluble unbiodegradable TKN (gN/gTKN) | 0.0200 |
| N:COD ratio for unbiodegradable part. COD (gN/gCOD) | 0.0350 |
| Phosphate (gPO$_4$—P/gTP) | 0.5000 |
| P:COD ratio for unbiodegradable part. COD (gP/gCOD) | 0.0110 |
| Non-poly-P heterotrophs (gCOD/g of total COD) | 0.0001 |
| Anoxic methanol utilizers (gCOD/g of total COD) | 0.0001 |
| Ammonia oxidizers (gCOD/g of total COD) | 0.0001 |
| Nitrite oxidizers (gCOD/g of total COD) | 0.0001 |
| Anaerobic ammonia oxidizers (gCOD/g of total COD) | 0.0001 |
| PAOs (gCOD/g of total COD) | 0.0001 |

TABLE 7-continued

COD, TN and TP fraction used for the process simulations

| | |
|---|---|
| Propionic acetogens (gCOD/g of total COD) | 0.0001 |
| Acetoclastic methanogens (gCOD/g of total COD) | 0.0001 |
| H$_2$-utilizing methanogens (gCOD/g of total COD) | 0.0001 |

The DO of the contact tank 812 and the stabilization tank 818 were set at 2 mg/l. The HRT in the stabilization tank 818 was set at 2 hours. The HRT/SRT in the anaerobic digester was set at 30 days at a temperature of 35° C. The HRT in the contact tank 812 was set at 0.5 hours for the influent COD=300 mg/l and 600 mg/l scenarios. For the influent COD=800 mg/l scenarios, the HRT in the contact tank 812 was increased to one hour.

The energy consumption of the simulated system was calculated based on the following assumptions: The energy content of methane is 35,846 kJ/m³ (at 0° C. and 1 atm.) 35% of the energy in the methane will be converted to electricity and 65% converted to heat. The heat will be used to heat the sludge from 20° C. to 35° C. The surplus heat energy will not be considered in the flowing electric energy calculations. Actual Oxygen Requirement (AOR) of in the contact tank and stabilization tank was calculated based on OUR, HRT and ADF. Because the effluent $NH_3$—N is higher than 5 mg/l, further nitrification AOR is calculated based on 4.57 gram of oxygen per gram of $NH_3$—N to be nitrified. Aeration electric energy efficiency in the contact tank 812 and aerobic stabilization tank 818 is 1.52 kg. oxygen/kwh. Total pumping energy was estimated based on an ADF of 350,000 m³/day, Total Dynamic Head (TDH)=2. Meter and pump and motor total efficiency was assumed to be 50%. Mixing electric energy for anaerobic digester was assumed to be 0.008 kw/m³ when the TSS concentration in AD is less than 40 gram/liter.

The process was simulated at multiple influent COD concentrations at different AN sludge recycle percentage up to 12%. The main results of electric and heat energy gain from methane, total and specific electricity consumption, fractions of AE and AN COD biodegradation, sludge yield and effluent water quality are shown in Tables 8-10 below.

TABLE 8

Calculation results for influent COD = 300 mg/l scenarios

| | | | | | |
|---|---|---|---|---|---|
| Anaerobic sludge recycle percentage | n/a | 4% | 6% | 10% | 12% |
| Influent wastewater flow rate (m³/day) | 350,000 | 350,000 | 350,000 | 350,000 | 350,000 |
| COD (mg/l) | 300 | 300 | 300 | 300 | 300 |
| TKN (mg/l) | 38 | 38 | 38 | 38 | 38 |
| TSS (mg/l) | 150 | 150 | 150 | 150 | 150 |
| CH$_4$ produced (m³/day) @ 0° C. 1 atm.)* | 6,813 | 10,241 | 12,380 | 16,996 | 18,408 |
| Energy in CH$_4$ (kwh/day) | 67,839 | 101,976 | 123,266 | 169,234 | 183,291 |
| Electricity from CH$_4$ (kwh/day) | 23,744 | 35,691 | 43,143 | 59,232 | 64,152 |
| Heat from CH$_4$ (kwh/day) | 44,095 | 66,284 | 80,123 | 110,002 | 119,139 |
| Sludge temp. (° C.) | 20 | 20 | 20 | 20 | 20 |
| Anaerobic digester temp (° C.) | 35 | 35 | 35 | 35 | 35 |
| Heat required (kwh/day) | 61,058 | 61,058 | 61,058 | 61,058 | 61,058 |
| Is heat enough? | no | yes | yes | yes | yes |
| OUR in contact tank (g/m³/hr)* | 83 | 63 | 47 | 21 | 14 |
| HRT in contact tank (hr) | 0.5 | 0.5 | 0.5 | 0.5 | 0.5 |
| AOR in contact tank (kg/day) | 14,506 | 10,978 | 8,285 | 3,714 | 2,405 |
| OUR in stabilization tank (g/m³/hr)* | 79 | 65 | 51 | 22 | 14 |
| HRT in stabilization tank (hr) | 2 | 2 | 2 | 2 | 2 |
| AOR in stabilization tank (kg/day) | 55,307 | 45,689 | 35,420 | 15,078 | 9,961 |
| Effluent $NH_3$—N (mg/l)* | 11.5 | 15.7 | 21.8 | 29.2 | 29.6 |
| Further nitrification AOR (kg · O$_2$/day) | 10,317 | 17,051 | 26,904 | 38,644 | 39,300 |
| Total AOR (kg · O$_2$/day) | 80,130 | 73,717 | 70,608 | 57,435 | 51,665 |
| Energy consumption for O$_2$ transfer (kwh/day) | 52,717 | 48,498 | 46,453 | 37,786 | 33,990 |
| Volume of AD (m³) | 105,000 | 105,000 | 105,000 | 105,000 | 105,000 |
| Mixing energy for Anaerobic Digester (kwh/day) | 20,160 | 20,160 | 20,160 | 20,160 | 20,160 |
| Estimated TDH (m) | 2.00 | 2.00 | 2.00 | 2.00 | 2.00 |
| Total pumping energy (kwh/day) | 3,811 | 3,811 | 3,811 | 3,811 | 3,811 |

TABLE 8-continued

| Calculation results for influent COD = 300 mg/l scenarios | | | | | |
|---|---|---|---|---|---|
| Total electricity consumption (kwh/day) | 76,688 | 72,469 | 70,424 | 61,758 | 57,961 |
| Electricity usage w/o $CH_4$ generated electricity (kwh/day) | 52,944 | 36,778 | 27,281 | 2,526 | −6,191 |
| Specific energy consumption (khw/m³) | 0.15 | 0.11 | 0.08 | 0.01 | −0.02 |
| Effluent COD (kg/day)* | 12,175 | 13,368 | 14,800 | 20,646 | 23,751 |
| Percentage of total COD load | 11.60% | 12.73% | 14.10% | 19.66% | 22.62% |
| WAS COD (kg · COD/day)* | 25,081 | 20,831 | 18,862 | 16,348 | 15,416 |
| Percentage of total COD load | 23.89% | 19.84% | 17.96% | 15.57% | 14.68% |
| Anaerobic digester COD removal (kg · COD/day)* | 20,144 | 30,055 | 36,228 | 49,606 | 53,703 |
| Percentage of total COD load | 19.19% | 28.62% | 34.50% | 47.24% | 51.15% |
| Aerobic tank COD removal (kg · COD/day)* | 47,600 | 40,747 | 35,110 | 18,400 | 12,130 |
| Percentage of total COD load | 45.33% | 38.81% | 33.44% | 17.52% | 11.55% |
| VSS in WAS (kg/day)* | 16,166 | 13,513 | 12,223 | 10,477 | 9,830 |
| Sludge yield (VSS/COD) | 0.15 | 0.13 | 0.12 | 0.10 | 0.09 |
| Sludge yield (VSS/BOD) | 0.08 | 0.06 | 0.06 | 0.05 | 0.05 |

*Data obtained from process simulation

TABLE 9

| Calculation results for influent COD = 600 mg/l scenarios | | | | | |
|---|---|---|---|---|---|
| Anaerobic sludge recycle percentage | n/a | 4% | 6% | 10% | 12% |
| Influent wastewater flow rate (m³/day) | 350,000 | 350,000 | 350,000 | 350,000 | 350,000 |
| COD (mg/l) | 600 | 600 | 600 | 600 | 600 |
| TKN (mg/l) | 65 | 65 | 65 | 65 | 65 |
| TSS (mg/l) | 258 | 258 | 258 | 258 | 258 |
| $CH_4$ produced (m³/day) @ 0° C. 1 atm.)* | 19,593 | 20,207 | 24,816 | 34,627 | 37,886 |
| Energy in $CH_4$ (kwh/day) | 195,088 | 201,210 | 247,096 | 344,785 | 377,236 |
| Electricity from $CH_4$ (kwh/day) | 68,281 | 70,424 | 86,484 | 120,675 | 132,033 |
| Heat from $CH_4$ (kwh/day) | 126,807 | 130,787 | 160,612 | 224,110 | 245,203 |
| Sludge temp. (° C.) | 20 | 20 | 20 | 20 | 20 |
| Anaerobic digester temp (° C.) | 35 | 35 | 35 | 35 | 35 |
| Heat required (kwh/day) | 61,058 | 61,058 | 61,058 | 61,058 | 61,058 |
| Is heat enough? | Yes | Yes | Yes | Yes | Yes |
| OUR in contact tank (g/m³/hr)* | 120 | 100 | 100 | 49 | 33 |
| HRT in contact tank (hr) | 0.5 | 0.5 | 0.5 | 0.5 | 0.5 |
| AOR in contact tank (kg/day) | 20,988 | 17,434 | 17,434 | 8,645 | 5,815 |
| OUR in stabilization tank (g/m³/hr)* | 113 | 95 | 95 | 44 | 30 |
| HRT in stabilization tank (hr) | 2 | 2 | 2 | 2 | 2 |
| AOR in stabilization tank (kg/day) | 78,771 | 66,535 | 66,535 | 30,996 | 20,930 |
| Effluent $NH_3$—N (mg/l)* | 24.6 | 25.4 | 35.3 | 47.9 | 49.7 |
| Further nitrification AOR (kg · $O_2$/day) | 31,366 | 32,582 | 48,417 | 68,667 | 71,418 |
| Total AOR (kg · $O_2$/day) | 131,125 | 116,550 | 132,385 | 108,308 | 98,163 |
| Energy consumption for $O_2$ transfer (kwh/day) | 86,266 | 76,678 | 87,096 | 71,255 | 64,581 |
| Volume of AD (m³) | 105,000 | 105,000 | 105,000 | 105,000 | 105,000 |
| Mixing energy for Anaerobic Digester (kwh/day) | 20,160 | 20,160 | 20,160 | 20,160 | 20,160 |
| Estimated TDH (m) | 2 | 2 | 2 | 2 | 2 |
| Total pumping energy (kwh/day) | 3,811 | 3,811 | 3,811 | 3,811 | 3,811 |
| Total electricity consumption (kwh/day) | 110,238 | 100,649 | 111,067 | 95,226 | 88,552 |
| Electricity usage w/o $CH_4$ generated electricity (kwh/day) | 41,957 | 30,225 | 24,583 | −25,449 | −43,481 |
| Specific energy consumption (khw/m³) | 0.12 | 0.09 | 0.07 | −0.07 | −0.12 |
| Effluent COD (kg/day)* | 20,296 | 21,109 | 23,005 | 33,592 | 41,020 |
| Percentage of total COD load | 9.66% | 10.05% | 10.95% | 16 | 19.53% |
| WAS COD (kg · COD/day)* | 52,864 | 48,613 | 43,708 | 36,652 | 32,372 |
| Percentage of total COD load | 25.17% | 23.15% | 20.81% | 17.45% | 15.42% |
| Anaerobic digester COD removal (kg · COD/day)* | 57,254 | 59,064 | 72,403 | 100,865 | 110,330 |
| Percentage of total COD load | 27.26% | 28.13% | 34.48% | 48.03% | 52.54% |
| Aerobic tank COD removal (kg · COD/day)* | 79,585 | 81,214 | 70,884 | 38,891 | 26,278 |
| Percentage of total COD load | 37.90% | 38.67% | 33.75% | 18.52% | 12.51% |
| VSS in WAS (kg/day)* | 34,225 | 31,549 | 28,340 | 23,523 | 20,682 |
| Sludge yield (VSS/COD) | 0.16 | 0.15 | 0.13 | 0.11 | 0.10 |
| Sludge yield (VSS/BOD) | 0.08 | 0.08 | 0.07 | 0.06 | 0.05 |

*Data obtained from process simulation

TABLE 10

Calculation results for influent COD = 800 mg/l scenarios

| | | | | |
|---|---|---|---|---|
| Anaerobic sludge recycle percentage | n/a | 6% | 10% | 12% |
| Influent wastewater flow rate (m³/day) | 350,000 | 350,000 | 350,000 | 350,000 |
| COD (mg/l) | 800 | 800 | 800 | 800 |
| TKN (mg/l) | 83 | 83 | 83 | 83 |
| TSS (mg/l) | 330 | 330 | 330 | 330 |
| $CH_4$ produced (m³/day) @ 0° C. 1 atm.)* | 26,631 | 31,656 | 43,260 | 49,093 |
| Energy in $CH_4$ (kwh/day) | 265,170 | 315,201 | 430,753 | 488,827 |
| Electricity from $CH_4$ (kwh/day) | 92,809 | 110,320 | 150,764 | 171,089 |
| Heat from $CH_4$ (kwh/day) | 172,360 | 204,881 | 279,990 | 317,737 |
| Sludge temp. (° C.) | 20 | 20 | 20 | 20 |
| Anaerobic digester temp (° C.) | 35 | 35 | 35 | 35 |
| Heat required (kwh/day) | 61,058 | 61,058 | 61,058 | 61,058 |
| Is heat enough? | yes | yes | yes | yes |
| OUR in contact tank (g/m³/hr)* | 112 | 105 | 69 | 50 |
| HRT in contact tank (hr) | 1 | 1 | 1 | 1 |
| AOR in contact tank (kg/day) | 39,057 | 36,873 | 24,077 | 17,406 |
| OUR in stabilization tank (g/m³/hr)* | 120 | 118 | 68 | 46 |
| HRT in stabilization tank (hr) | 2 | 2 | 2 | 2 |
| AOR in stabilization tank (kg/day) | 84,308 | 82,488 | 47,453 | 32,368 |
| Effluent $NH_3$—N (mg/l)* | 39.9 | 41.5 | 58.9 | 60.5 |
| Further nitrification AOR (kg · $O_2$/day) | 55,887 | 58,446 | 86,149 | 88,740 |
| Total AOR (kg · $O_2$/day) | 179,251 | 119,361 | 71,530 | 49,774 |
| Energy consumption for $O_2$ transfer (kwh/day) | 117,928 | 78,527 | 47,059 | 32,746 |
| Volume of AD (m³) | 105,000 | 105,000 | 105,000 | 105,000 |
| Mixing energy for Anaerobic Digester (kwh/day) | 20,160 | 20,160 | 20,160 | 20,160 |
| Estimated TDH (m) | 2 | 2 | 2 | 2 |
| Total pumping energy (kwh/day) | 3,811 | 3,811 | 3,811 | 3,811 |
| Total electricity consumption (kwh/day) | 141,899 | 102,498 | 71,030 | 56,717 |
| Electricity usage w/o $CH_4$ generated electricity (kwh/day) | 49,090 | −7,823 | −79,734 | −114,373 |
| Specific energy consumption (khw/m³) | 0.14 | −0.02 | −0.23 | −0.33 |
| Effluent COD (kg/day)* | 23,120 | 24,171 | 28,398 | 34,760 |
| Percentage of total COD load | 8.26% | 8.63% | 10.14% | 12.41% |
| WAS COD (kg · COD/day)* | 71,057 | 62,991 | 55,294 | 53,118 |
| Percentage of total COD load | 25.38% | 22.50% | 19.75% | 18.97% |
| Anaerobic digester COD removal (kg · COD/day)* | 77,691 | 92,317 | 125,958 | 142,920 |
| Percentage of total COD load | 27.75% | 32.97% | 44.99% | 51.04% |
| Aerobic tank COD removal (kg · COD/day)* | 108,132 | 100,521 | 70,350 | 49,202 |
| Percentage of total COD load | 38.62% | 35.90% | 25.12% | 17.57% |
| VSS in WAS (kg/day)* | 46,098 | 40,903 | 35,676 | 34,068 |
| Sludge yield (VSS/COD) | 0.16 | 0.15 | 0.13 | 0.12 |
| Sludge yield (VSS/BOD) | 0.08 | 0.07 | 0.06 | 0.06 |

*Data obtained from process simulation

Figure 21:
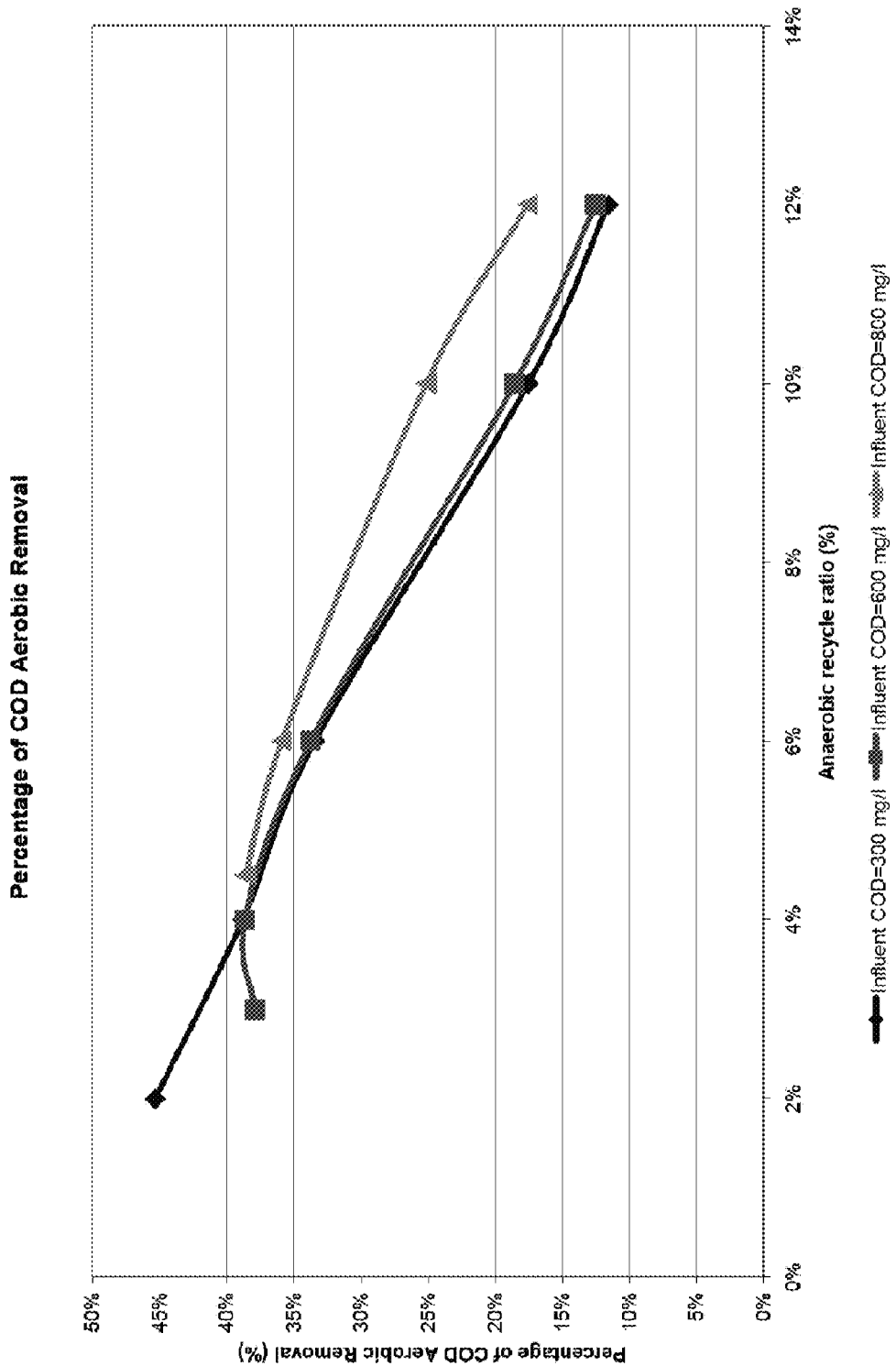
FIG. 21 illustrates a percentage of total wastewater influent chemical oxygen demand removed in an aerobic digester in a simulation of a system in accordance with the present invention.

FIG. 20 illustrates anaerobic COD removal at the various anaerobic sludge recycle percentages at the different wastewater COD loadings. As is shown in FIG. 21, more and more COD was biodegraded in the anaerobic digester when the anaerobic sludge recycle percentage increased. As the result, the methane production also increased with increasing anaerobic sludge recycle percentage. Take the influent COD=600 mg/l scenarios as an example. For example, in the COD=600 mg/l scenario, methane production increased from 19,593 m³/day to 18,408 m³/day. The electricity and heat recovery from methane increased from 68,281 kWh/day to 132,033 kWh/day and from 126,807 kWh/day to 245,203 kWh/day, respectively. For the majority of the simulated scenarios, the heat recovery from the methane was more than enough to heat the sludge from 20° C. to 35° C.

Figure 22:
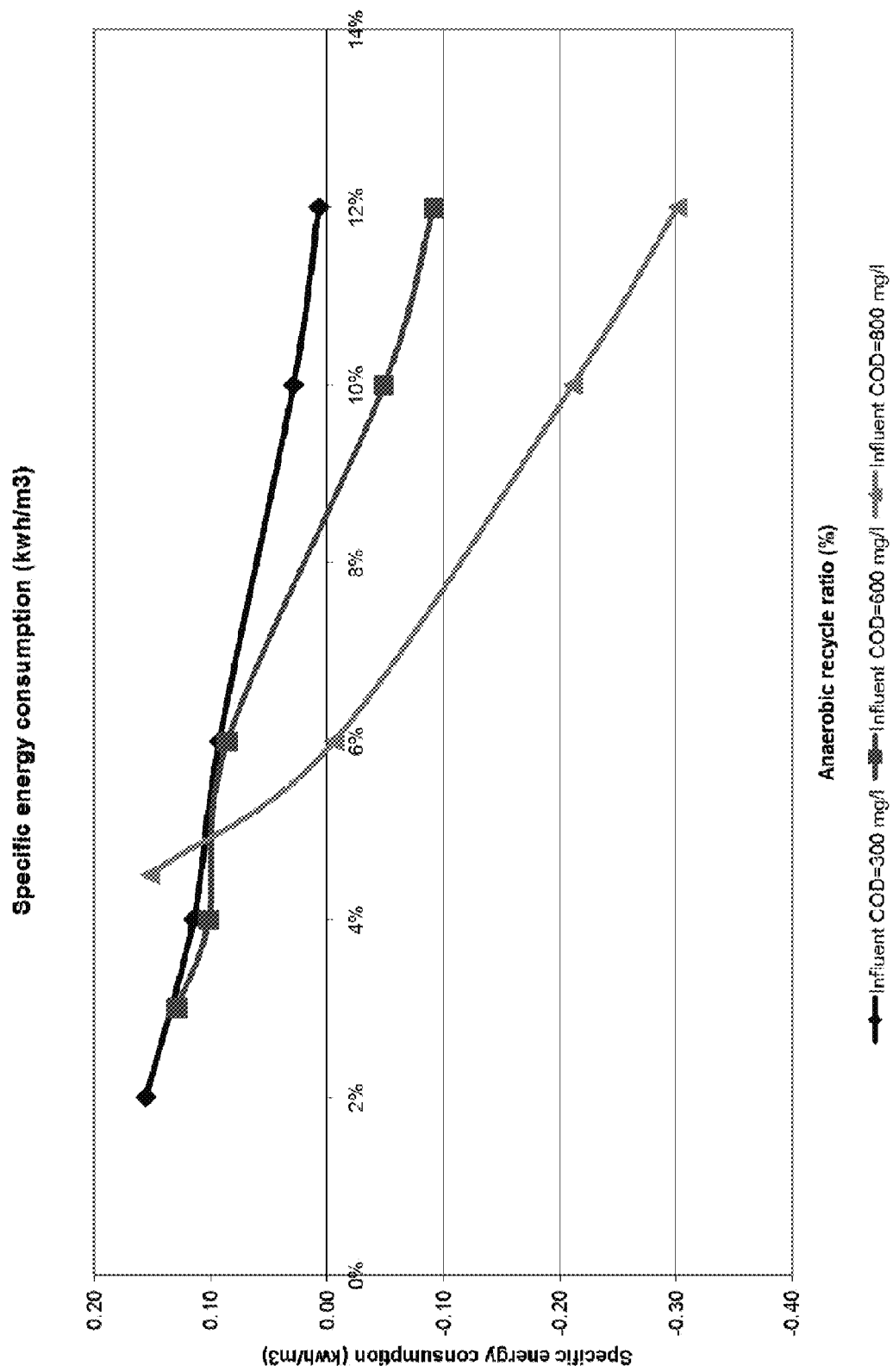
FIG. 22 illustrates specific energy consumption used to treat wastewater in a simulation of a system in accordance with the present invention.

FIG. 21 illustrates aerobic COD removal at the various anaerobic sludge recycle percentages at the different wastewater COD loadings. As is shown in FIG. 22, less COD was aerobically removed when the anaerobic sludge recycle percentage increased. When increasing amounts of anaerobic sludge recycles into the activated sludge system, it gradually changed the ecology of activated sludge system, making aerobic bacteria less dominant and the sludge more like an inert bio-sorption media. For example, in the wastewater COD=600 mg/l scenario, the oxygen utilization rate in the contact tank and in the stabilization tank decreased from 120 mg/l/hr to 33 mg/l/hr and from 113 mg/l/hr to 30 mg/l/hr, respectively. Because of the OUR or the AE activity decrease, the AOR decreased from 13,125 kg. oxygen/day to 98,163 kg. oxygen/day and oxygen transfer electric energy consumption decreased from 86,266 kWh/day to 64,581 kWh/day.

As illustrated in FIG. 22, because of more anaerobic COD biodegradation to recover energy and less aerobic COD biodegradation to consume energy, the specific energy consumption to treat the wastewater decreased significantly with the anaerobic recycle ratio. For example, as shown in Table 10 above, as the anaerobic recycle ratio increased from 0 to 12%, the anaerobic energy recovery, measured as energy in $CH_4$ produced, increased from 265,170 kwh/day to 488,827 khw/day, while the energy consumed in the aerobic biodegradation process, measured as energy consumption for $O_2$ transfer, decreased from 117,928 kwh/day to 32,746 kwh/day, resulting in a change in specific energy consumption of from 0.14 kwh/m³ to −0.33 kwh/m³. These results indicate that specific energy consumption of less than about 0.1 kwh/m³ is achievable by using the process disclosed in the present disclosure. With the anaerobic sludge recycle set at about 6%, the process results in a specific energy consumption very close to 0.1 kWh/m³ for wastewater with a COD of between about 300 mg/L and about 600 mg/L. With a higher anaerobic sludge recycle percentage, such as about 12%, it is also possible to achieve zero energy consumption when the influent COD=300 mg/l and the energy recovery potential may be net positive when influent COD=600 mg/l or 800 mg/l.

Figure 23:
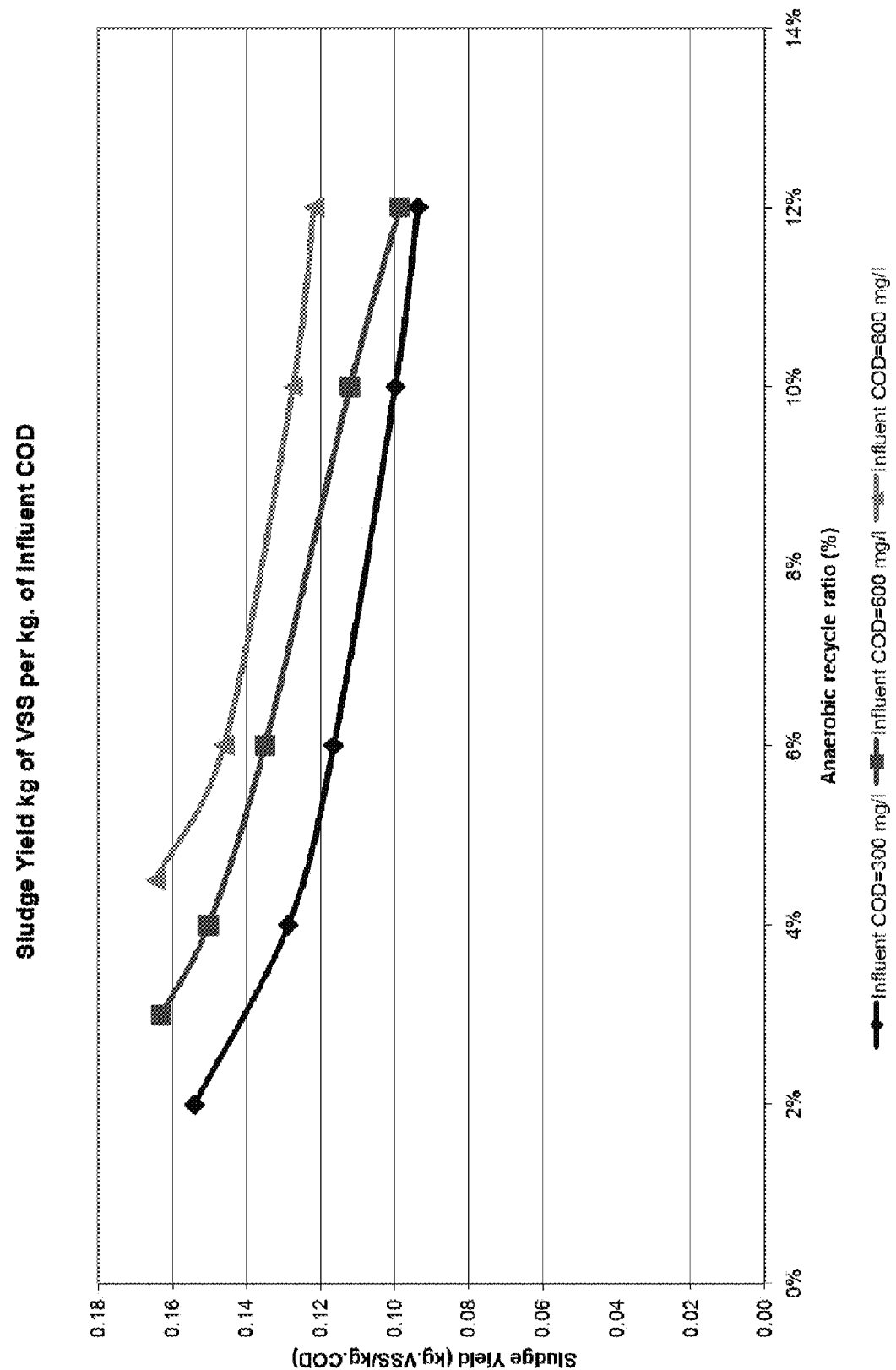
FIG. 23 illustrates waste sludge production in a simulation of a system in accordance with the present invention.

Further, as illustrated in FIG. 23, because more COD is biodegraded by following the anaerobic bio-pathway which has a lower sludge yield than an aerobic process, the system total sludge production was also decreased with increasing anaerobic sludge recycle percentage. Less sludge production will decrease the sludge handling cost and also potentially offer opportunities for nutrient recovery.

Those skilled in the art would readily appreciate that the various parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments described herein. For example, those skilled in the art may recognize that the system, and components thereof, according to the present invention may further comprise a network of systems or be a component of treatment system. It is, therefore, to be understood that the foregoing embodiments are presented by way of example only and that, within the scope of the appended claims and equivalents thereto, the disclosed treatment systems and techniques may be practiced otherwise than as specifically described. For example, although the term "supernatant" has been used herein to refer to separation product, the term has been used only for illustrative purposes and its use does not limit the scope of the claims to a particular separation technique. The present treatment systems and techniques are directed to each individual feature, system, or method described herein. In addition, any combination of two or more such features, systems or methods, if such features, systems or methods are not mutually inconsistent, is included within the scope of the present invention.

Further, it is to be appreciated various alterations, modifications, and improvements will readily occur to those skilled in the art. Such alterations, modifications, and improvements are intended to be part of this disclosure, and are intended to be within the spirit and scope of the invention. For example, a portion of solids-rich stream or the sludge stream can be introduced to an upstream unit operation, such as a primary clarifier, or a biological sorption tank, or both. In other cases, the solids-leans portion or the sludge-lean portion can be directed to another separator and/or to a polishing unit. In other instances, an existing treatment facility may be modified to utilize or incorporate any one or more aspects of the invention. Thus, in some cases, the treatment systems can involve connecting or configuring an existing facility to comprise an aerobic digester, optionally with a biological sorption tank, and an aerobic treatment tank. Accordingly, the foregoing description and drawings are by way of example only. Further, the depictions in the drawings do not limit the inventions to the particularly illustrated representations. For example, one or more biological reactors may be utilized in one or more trains of the treatment system.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. A method of increasing the capacity of a wastewater treatment system having a biological treatment train with at least one biological reactor selected from the group consisting of an anaerobic reactor, an anoxic reactor, a contact tank, a sequencing batch reactor, and an aerobic reactor, a solids-rich outlet of the biological treatment train fluidly connected upstream of an inlet of an anaerobic digester distinct from the at least one biological reactor, the method comprising:
   directing a first fraction of a solids-rich sludge produced in the biological treatment train into an inlet of the anaerobic digester in an amount resulting in a concentration of methanogenic bacteria present in the solids-rich sludge produced in the biological treatment train being at least 10% of a concentration of methanogenic bacteria present in mixed liquor in the anaerobic digester;
   directing anaerobically digested sludge from an outlet of the anaerobic digester into an aerobic stabilization tank through a conduit fluidly connecting the outlet of the anaerobic digester to a first inlet of the aerobic stabilization tank; and
   directing sludge from an outlet of the aerobic stabilization tank to an inlet of the at least one biological reactor through a conduit fluidly connecting the outlet of the aerobic stabilization tank to the inlet of the at least one biological reactor.

2. The method of claim 1, further comprising reducing a hydraulic retention time of one of the at least one biological reactor and the anaerobic digester by adjusting the amount of the first fraction of the solids-rich sludge produced in the biological treatment train directed into the inlet of the anaerobic digester.

3. The method of claim 1, further comprising producing a biological floc in the at least one biological reactor having an aerobic outer layer and one of an anoxic and an anaerobic core.

4. The method of claim 3, wherein producing the biological floc in the at least one biological reactor comprises increasing the organic loading of the at least one biological reactor.

5. The method of claim 3, wherein producing the biological floc in the at least one biological reactor comprises reducing an amount of oxygen supplied to the at least one biological reactor.

6. The method of claim 1, further comprising increasing a rate of production of methane in the anaerobic digester by adjusting the amount of the first fraction of the solids-rich sludge produced in the biological treatment train directed into the inlet of the anaerobic digester.

7. The method of claim 1, further comprising directing a second fraction of the solids-rich sludge produced in the biological treatment train into a second inlet of the aerobic stabilization tank through a conduit fluidly connecting an outlet of a separator in the biological treatment train and the second inlet of the aerobic stabilization tank.

8. The method of claim 7, wherein the second fraction is greater than the first fraction.

9. The method of claim 1, further comprising producing the first fraction of the solids-rich sludge by thickening a portion of a solids-rich sludge output from the solids-rich outlet of the biological treatment train in a sludge thickener, the first fraction of the solids-rich sludge comprising a thickened solids-rich sludge output from the sludge thickener.

10. The method of claim 9, further comprising directing a solids-lean output of the sludge thickener into the aerobic stabilization tank.

11. The method of claim 1, wherein the concentration of methanogenic bacteria present in the solids-rich sludge produced in the biological treatment train is at least 25% of the concentration of methanogenic bacteria present in mixed liquor in the anaerobic digester.

12. The method of claim 11, wherein the concentration of methanogenic bacteria present in the solids-rich sludge produced in the biological treatment train is at least 50% of the concentration of methanogenic bacteria present in mixed liquor in the anaerobic digester.

13. The method of claim 1, further comprising:
directing anaerobically digested sludge from an outlet of the anaerobic digester into a separator;
separating the anaerobically digested sludge directed into the separator into a separated solids-lean fluid and a separated solids-rich sludge; and
directing the separated solids-lean fluid from the separator into a precipitation vessel.

14. The method of claim 13, further comprising directing the separated solids-rich sludge into the at least one biological reactor.

15. The method of claim 13, further comprising precipitating one of a nitrogen containing compound and a phosphorous containing compound from the separated solids-lean fluid in the precipitation vessel.

16. The method of claim 13, further comprising:
separating a second solids-lean fluid from the solids-rich sludge produced in the biological treatment train; and
directing the second solids-lean fluid into the separator.

17. The method of claim 16, further comprising washing precipitates and/or retained solids from the separator with the second solids-lean fluid.

18. The method of claim 17, wherein the separator comprises a membrane filter and washing precipitates and/or retained solids from the separator with the second solids-lean fluid comprises backwashing a membrane of the membrane filter with the second solids-lean fluid.

19. The method of claim 1, further comprising maintaining a solids retention time in the anaerobic reactor sufficient for a fraction of nitrification bacteria in sludge entering the anaerobic reactor to survive an anaerobic digestion process in the anaerobic reactor and cause sludge exiting the anaerobic digester to exhibit at least about 25% of a nitrification activity of the sludge entering the anaerobic digester.

* * * * *